United States Patent
Safwat et al.

(10) Patent No.: US 6,374,531 B1
(45) Date of Patent: Apr. 23, 2002

(54) TRAWL SYSTEM CELL DESIGN AND METHODS

(75) Inventors: Sherif Safwat, Davis, CA (US); Valentin G. Perevoshchikov, Kaliningrad (RU)

(73) Assignee: OTTR Ultra-Low Drag, Ltd. (KY)

(*) Notice: Subject to any disclaimer, the term of this patent is extended or adjusted under 35 U.S.C. 154(b) by 0 days.

(21) Appl. No.: 09/051,326

(22) PCT Filed: Oct. 11, 1996

(86) PCT No.: PCT/US96/16419

§ 371 Date: Jan. 11, 1999

§ 102(e) Date: Jan. 11, 1999

(87) PCT Pub. No.: WO97/13407

PCT Pub. Date: Apr. 17, 1997

Related U.S. Application Data

(60) Provisional application No. 60/005,287, filed on Oct. 13, 1995, provisional application No. 60/013,509, filed on Mar. 15, 1996, and provisional application No. 60/018,069, filed on May 21, 1996.

(51) Int. Cl.[7] .................. A01K 73/02; A01K 73/04
(52) U.S. Cl. ................... 43/4.5; 43/9.1; 43/9.8; 43/9.95
(58) Field of Search ................... 43/4.5, 7, 9.1, 43/9.95, 9.8; 87/12

(56) References Cited

U.S. PATENT DOCUMENTS

| | | |
|---|---|---|
| 2,792,617 A | 5/1957 | Haller |
| 3,041,915 A | 7/1962 | Ryffel |
| 3,102,357 A | 9/1963 | Luketa |
| 3,131,501 A | 5/1964 | Luketa |
| 3,308,567 A | 3/1967 | Luketa |
| 4,521,986 A | 6/1985 | Koga |

FOREIGN PATENT DOCUMENTS

| | | |
|---|---|---|
| DE | 3543253 A1 | 6/1987 |
| FR | 002521065 A | 8/1983 |
| JP | 57-13660 | 3/1982 |
| JP | 60-39782 | 9/1985 |
| JP | 61-386 | 8/1986 |
| RU | 1444981 | 12/1986 |
| RU | 1480792 A1 | 5/1989 |

OTHER PUBLICATIONS

Batill, S.M., et al., "Flow Field Studies on Yawed, Stranded Cables," in *Flow Visualization V*, R. Řezníček ed., Hemispher Publishing Corp., pp 391–396 (1990).

Mehta Rabindra D., "Aerodynamics of Sports Balls," *Ann. Rev. Fluid Mech.* 17:151–189 (1985).

"Knuckleballs," *Scientific American*, p. 22 (1987).

(List continued on next page.)

*Primary Examiner*—Kurt Rowan
(74) *Attorney, Agent, or Firm*—D. E. Schreiber, Esq.

(57) ABSTRACT

A mesh cell construction which is systemized wherein opposite mesh bars of the rectangularly shaped mesh cell have a common lay direction when viewed in an axially receding direction (either right-handed or left-handed lay) that is opposite to that associated with the remaining opposite mesh bars of such mesh cell. In another aspect, when incorporated in a trawl (13), such cell construction of the invention provides for improved shaping and performance of the trawl (13) wherein the mesh cells of different geometrical locations positioned relative to and about the longitudinal axis of the trawl can be controlled such that resulting trawl panels wings (25) act analogous to a series of mini-wings capable of acting in concert in operation. Such concerted action provides, when the trawl is in motion, outwardly directed force vectors which significantly increase the trawl volume and hence mouth (26) volume while simultaneously decreasing drag.

69 Claims, 32 Drawing Sheets

OTHER PUBLICATIONS

Breidenthal, Robert E., article on bluff body aerodynamics of sports balls, *Trawl System Cell Design and Methods* (1998).

Diggs, Jesse S., "Hydrodynamic Characterization of Various Towed Array Towcables," Towed Systems Branch, Naval Ship Research and Development Center, Bethesda, Maryland (1974).

Endeco, Inc., "Haired Faired™ Cable," *Endeco Towed Systems* (date unknown).

The Zippertubing Co. product data sheets and bulletins for DVH–20 and DVH–40 cable fairings, specifications, and installation (date unknown).

Flugwiss, Z., Weltraumforsch 14, p. 40 (date unknown).

Breidenthal, R., *Phys Fluids,* vol. 23, No. 10, p. 1931 (1980).

"On the Persistence of Transition in the Near–Wake," pp. 607 and 609. *Problems of Hydrodynamics and Continum Mechanics, Soc. Industrial and Appl. Math,* Philadelphia (1969).

Williamson, C.H.K., "Oblique and Parallel Modes of Vortex Shedding in the Wake of a Circular Cylinder at Low Reynolds Numbers," *Journal of Fluid Mechanics 206*:595 and 597, 1989.

Hunt, J.C.R., "Industrial and Environmental Fluid Mechanics," *Annual Review of Fluid Mechanics 23,* pp. 10–12 (1991).

Lisoski graph, FIG. 7, Experimental Lift and Drag histories for bluff plate (thickness=10%), p. 95 (1993).

Roshko, A., "Perspectives on Bluff Body Aerodynamics," *Second International Colloquium on Bluff Body Aerodynamics and Applications Melbourne,* 7–10, pp. 81 (1992).

Cermak, J.E., "Aerodynamics of Buildings," *Annual Review of Mechanics 8* p. 99 (1976).

Hoerner, S.F., "Fluid–Dynamic Drag," published by author, pp. 3–2 and 4–4 (1965).

Hoerner, S.F., "III—Pressure Drag," published by author, pp. 3–7, 3–9, 3–11, and 3–27 (1965).

Hoerner, S.F., "IV—Structures," published by author, p. 4–5 (1965).

Examples of Spectrum products, specific projects and end–users, Spectrum Ocean Systems Limited, Peterborough, Ontario (date unknown).

"Fairing and Anti–Stacking Ring Assemblies for Tow Cables," Spectrum Ocean Systems Limited, Peterborough, Ontario (date unknown).

Oceanographic Ribbon Fairing Cable, The Rochester Corporation, Cat–82 (date unknown).

Nebres, Jose V., "Wake Similarity and Vortex Formation for Two–Dimensional Bluff Bodies," Doctoral Dissertation, University of Notre Dame, Indiana (1992).

Batill, S.M., et al., "Detailed Near Surface Flow About Yawed, Stranded Cables," Coastal Systems Station, Dehlgren Division, Naval Surface Warfare Center, Panama City, Florida (1992).

Nebres, Jose V., "Flow Around Yawed Stranded Cables," Master's Thesis, University of Notre Dame, Indiana (1989).

Batill, S.M.. et al., "An Experimental Investigation of the Flow Field Around Yawed Stranded Cables," Naval Coastal Systems Center, Panama City, Florida (1989).

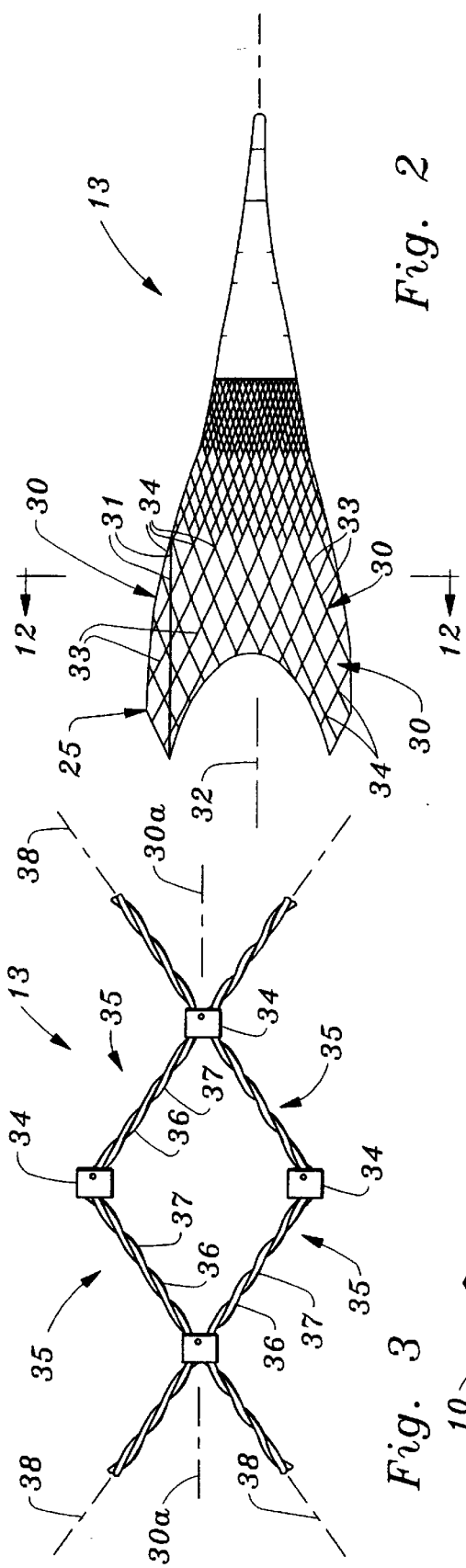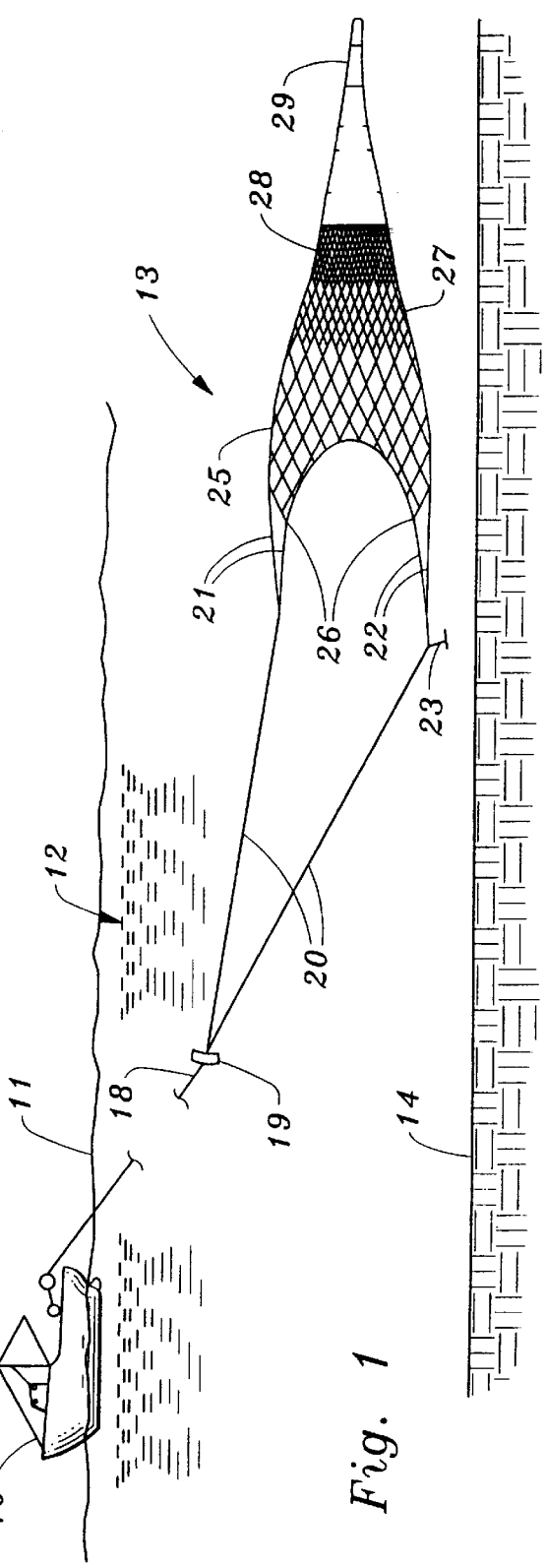

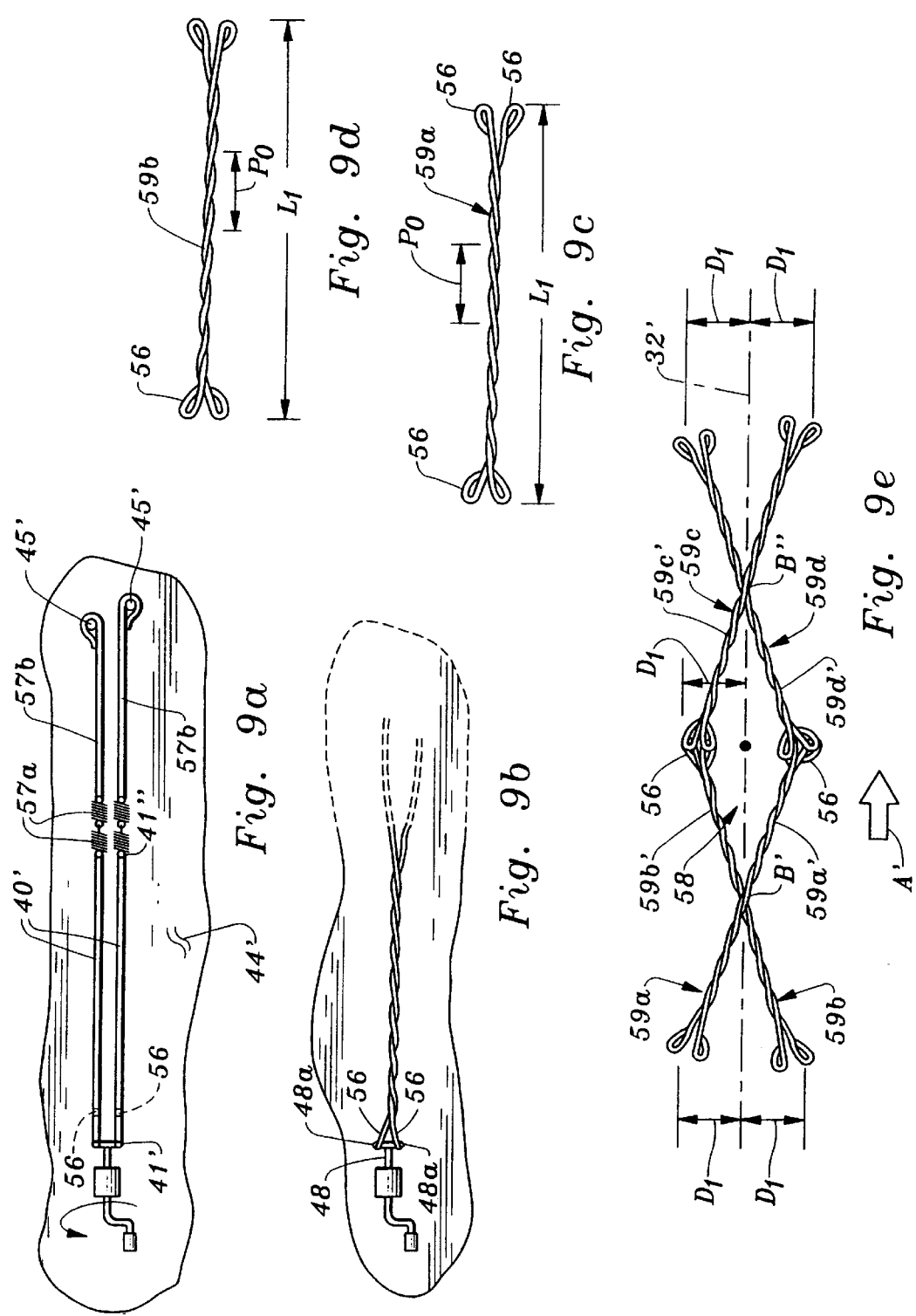

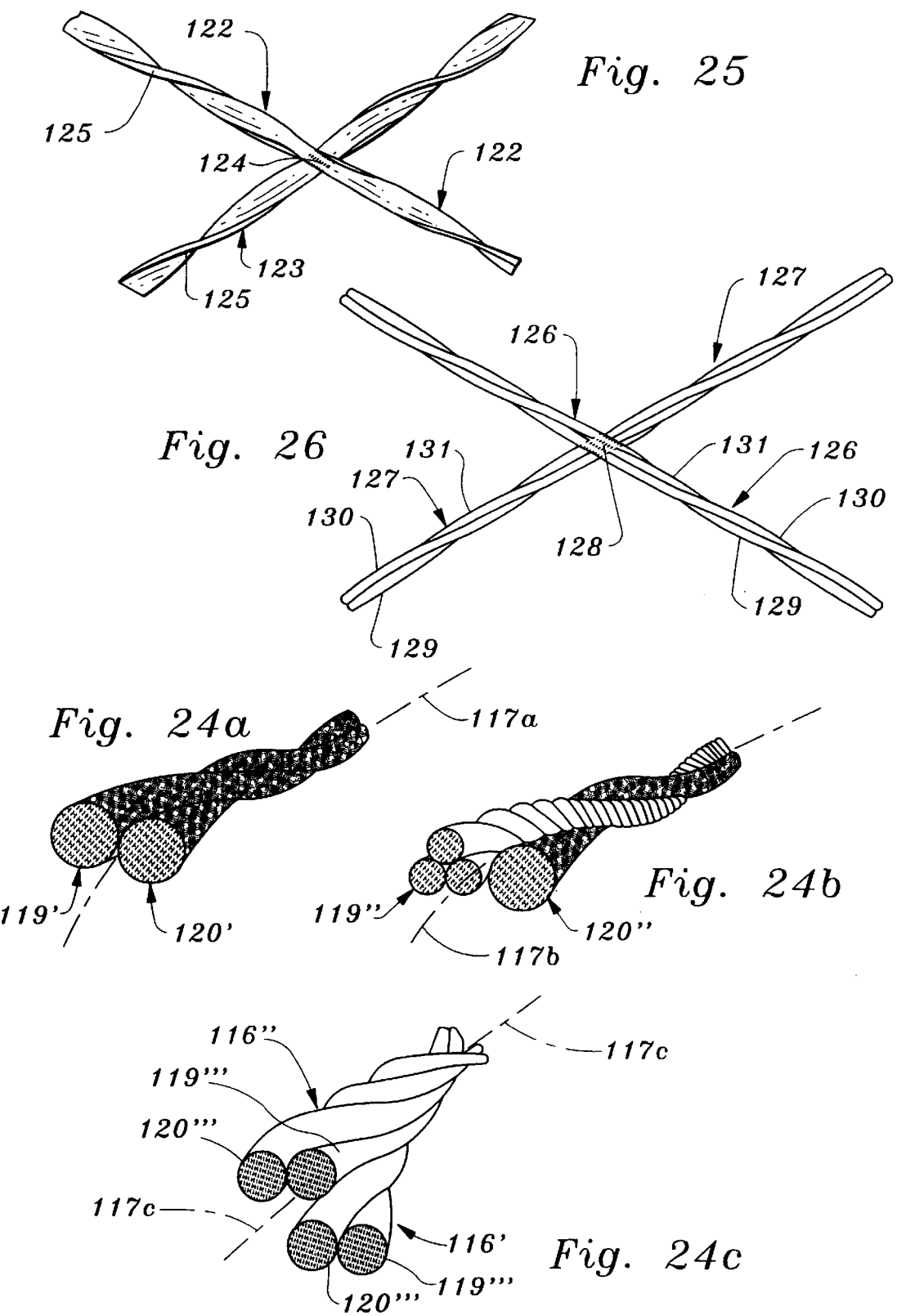

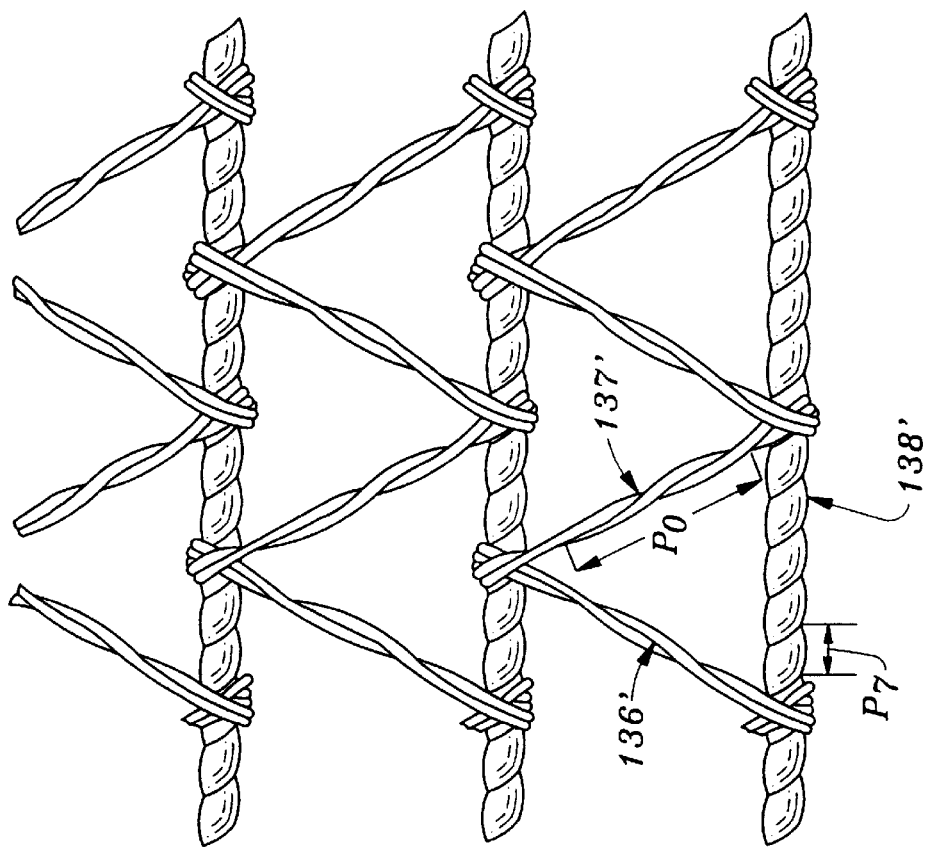
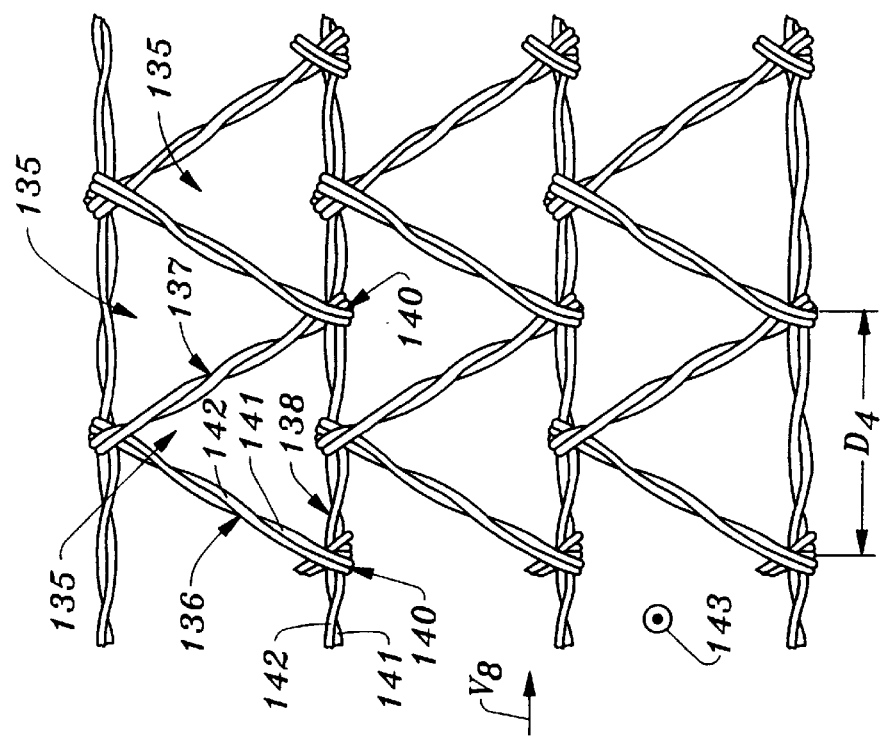

*Fig. 29*
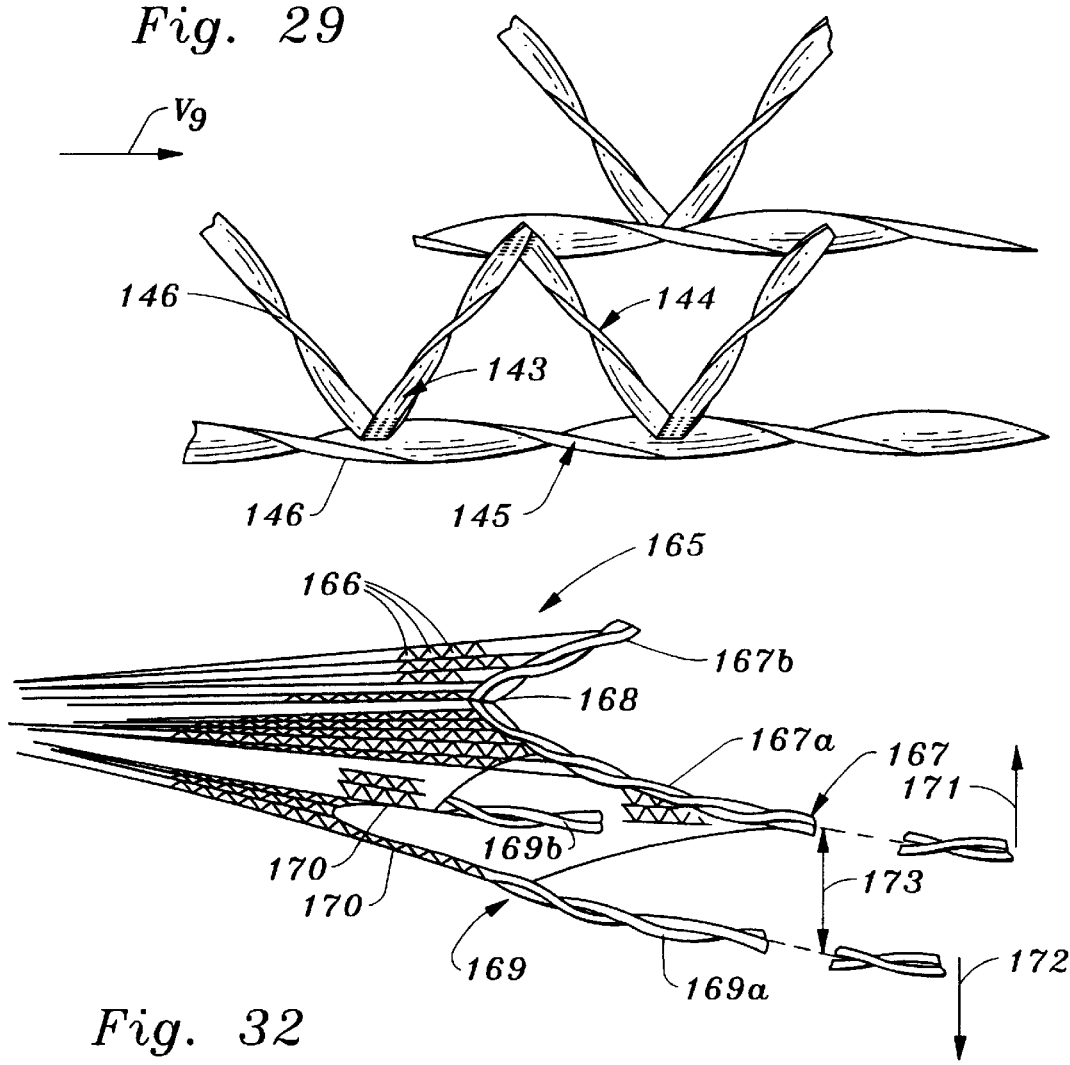
*Fig. 32*
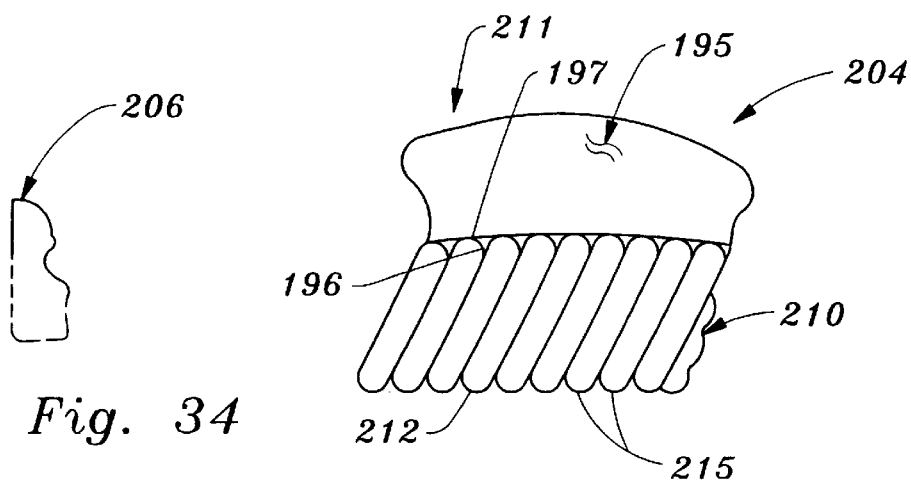
*Fig. 34*

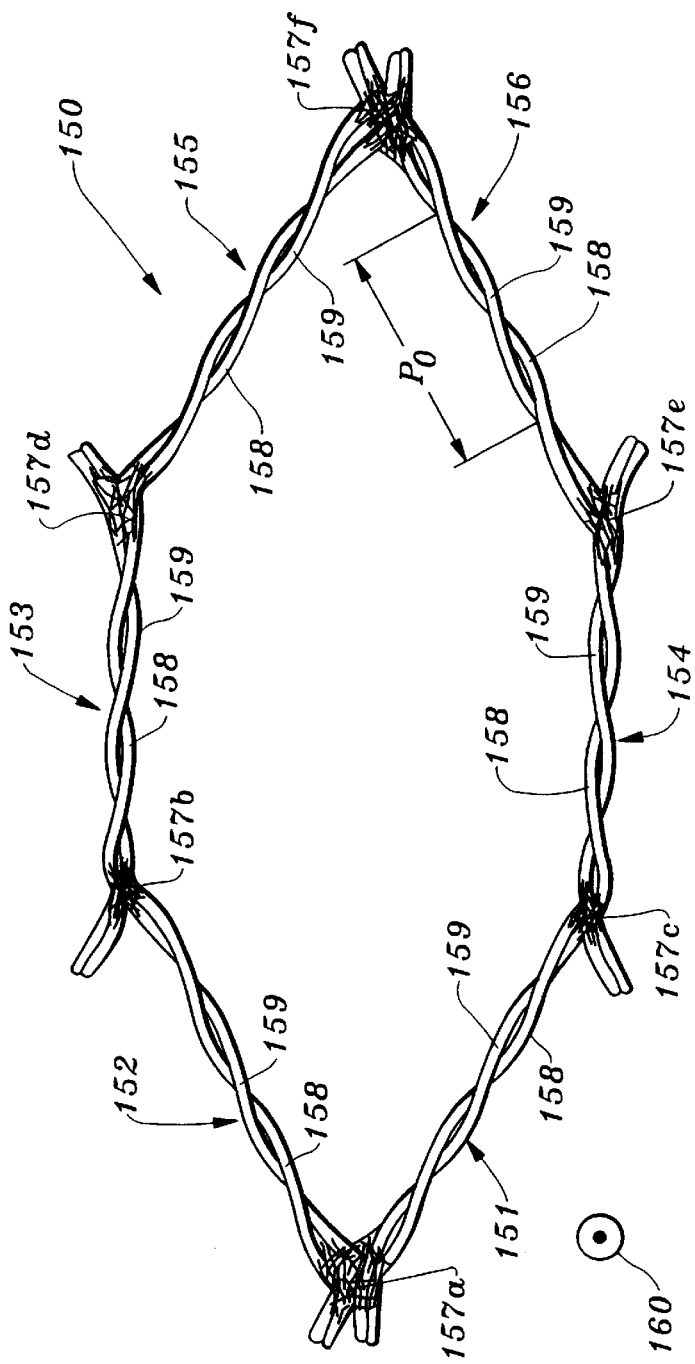
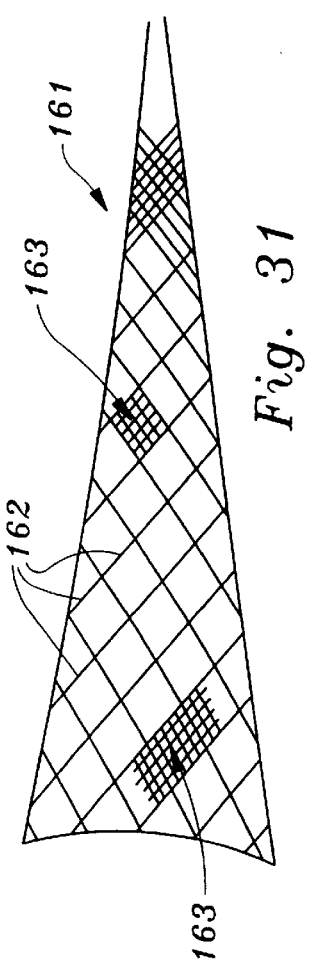

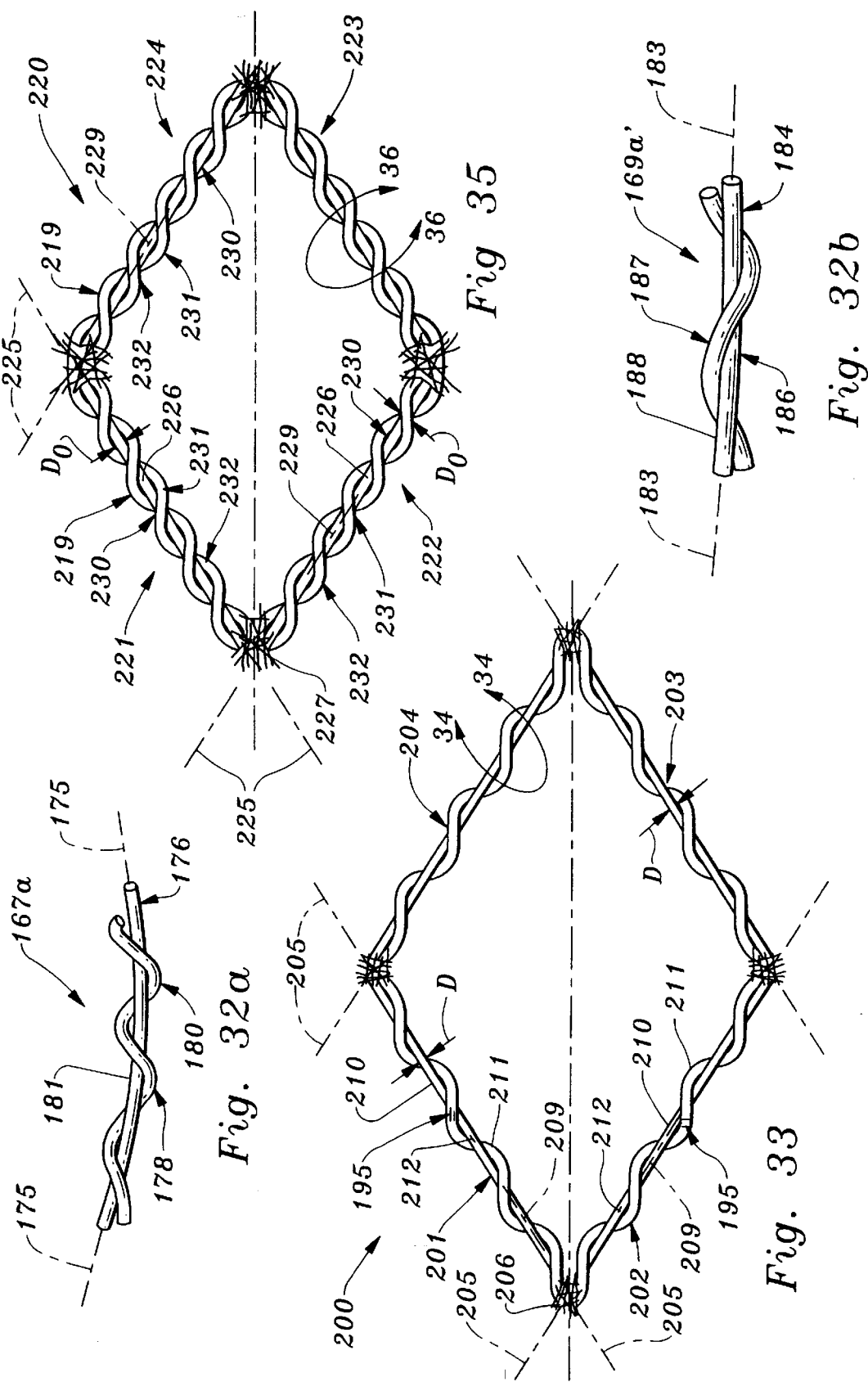

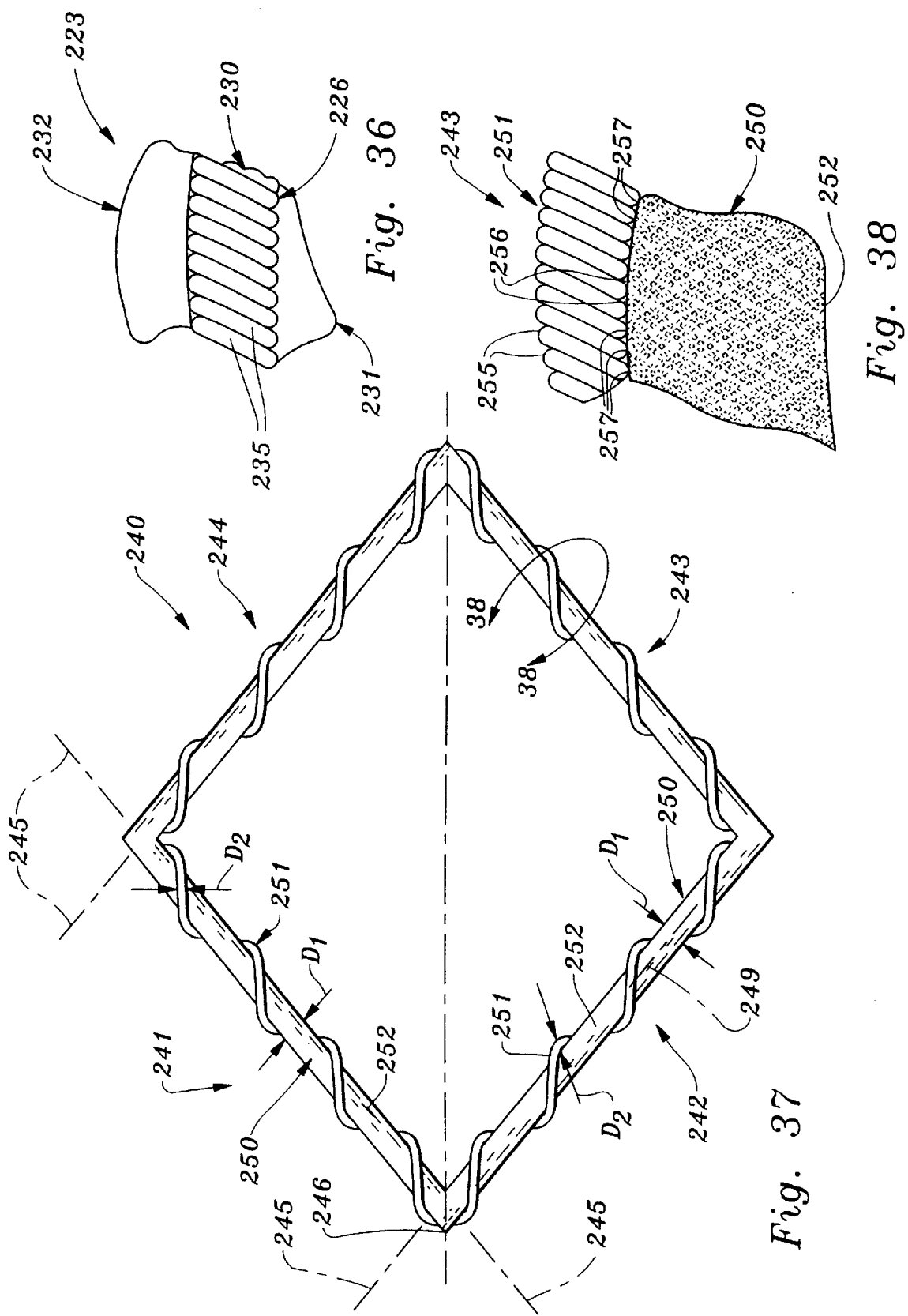

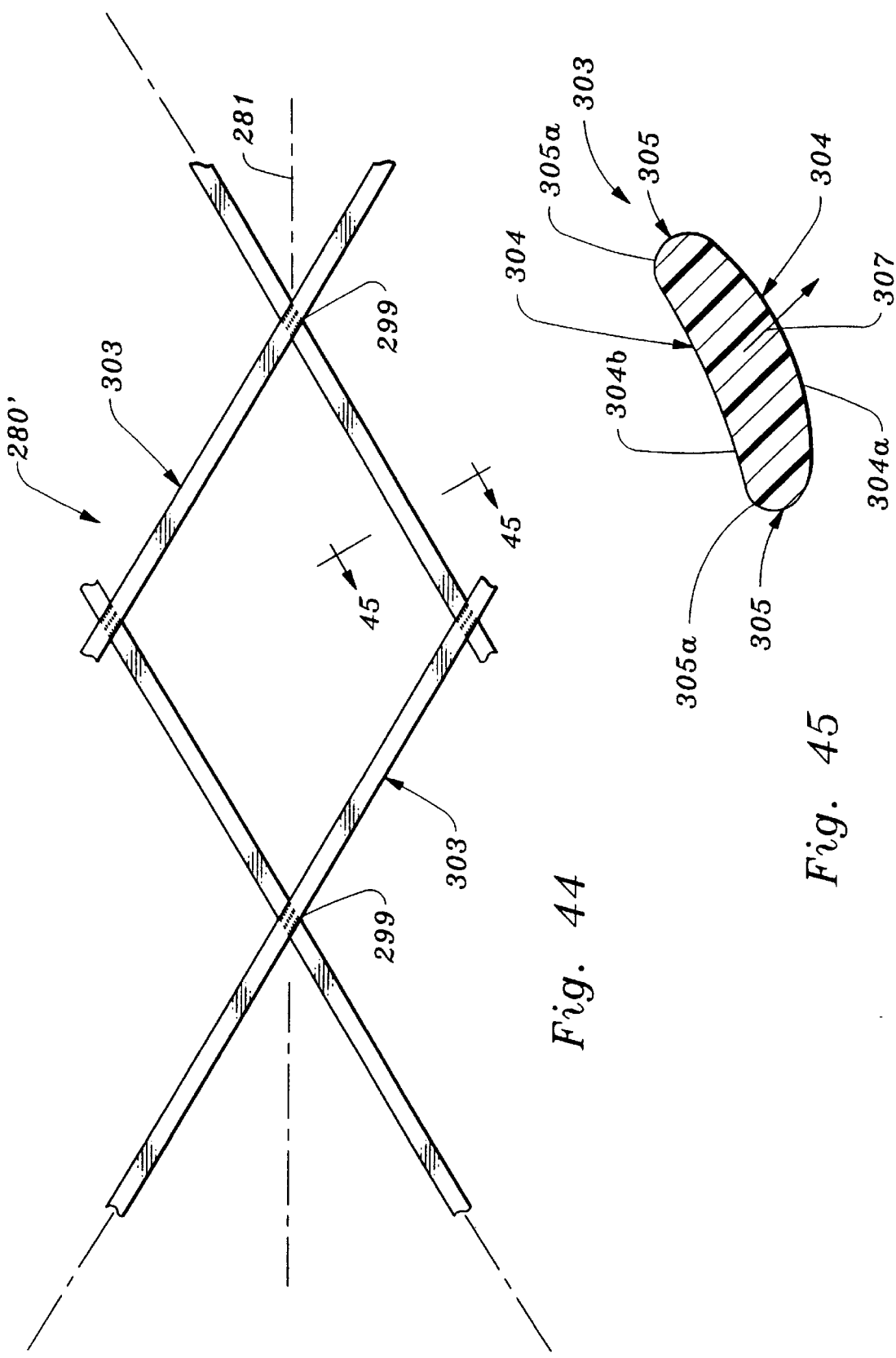

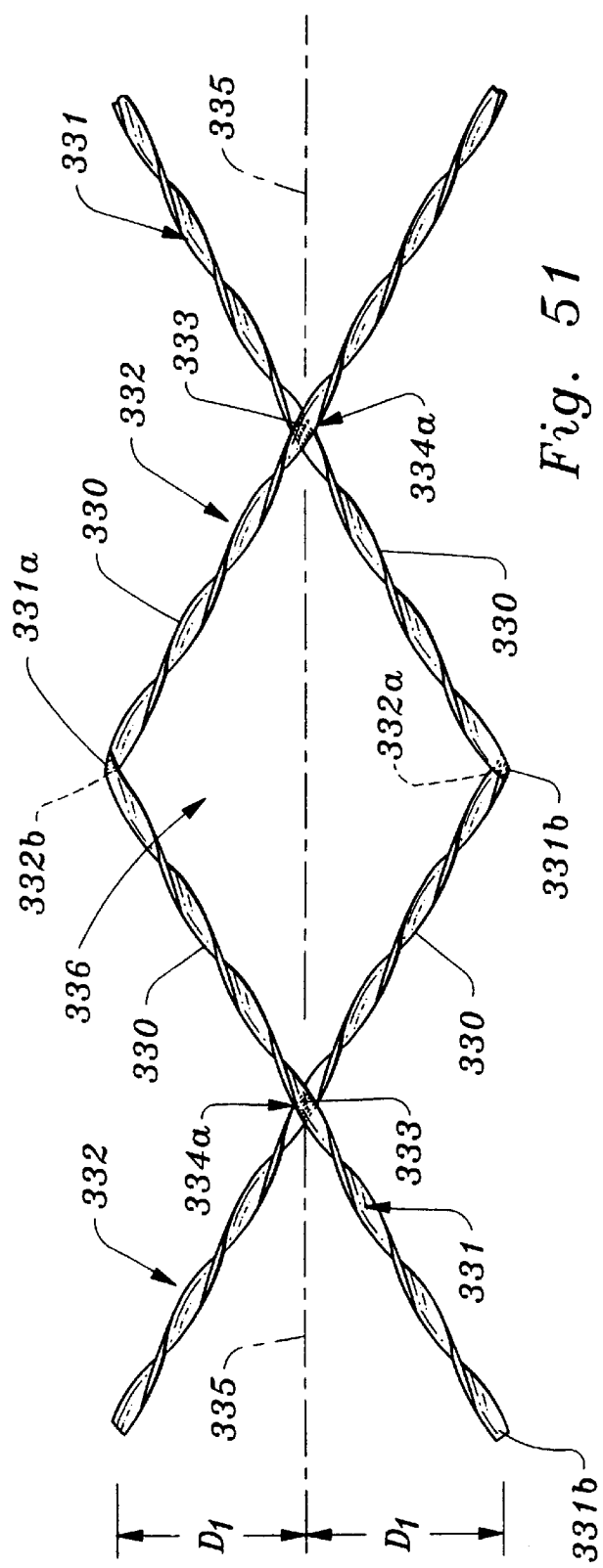
Fig. 51
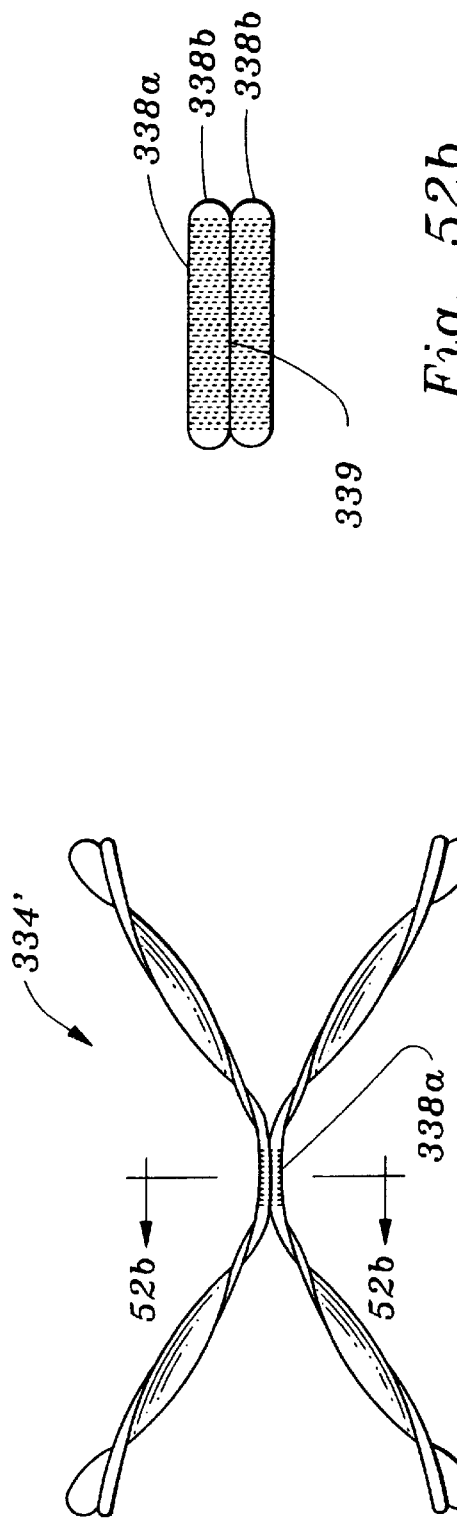
Fig. 52b
Fig. 52a

TRAWL SYSTEM CELL DESIGN AND METHODS

This is a 371 of PCT/US96/16419 Oct. 11, 1996, and claims the benefit from Prov. application No. 60/005,287 Oct. 13, 1995, Prov. application No. 60/013,509 Mar. 15, 1996, Prov. application No. 60/018,069 May 21, 1996.

FIELD OF THE INVENTION

The present invention relates to a cell design used in a trawl system associated with capturing marine life within a body of water, and more particularly to an improved cell design (that by definition is iterated or cloned in varying geometric patterns) providing improved shaping and performance, especially when incorporated in midwater or bottom trawls of such systems.

In one aspect, the invention relates to mesh cell construction for trawls that can be triangular, rectangular and/or hexagonal in cross section (where such rectangular configurations include square cells) and is associated with at least three and preferably four cell (or more) bars in a common plane, with the length of each bar being measured between a pair of normalized transverse, quasi-transverse, longitudinal or quasi-longitudinal spaced-apart knots or equivalent couplers. In accordance with the invention, a pair of half mesh bars of each cell are constructed so as to fan out from a common knot or coupler (of the four knots or couplers associated with each quadratic mesh cell). Each mesh bar of such pair is constructed to provide hydrofoil-like characteristics in field operations. Each mesh bar comprises two (or three of more) strands each comprised of filamented synthetic material such as plastic or of a naturally occurring substance, each strand being the product of a conventional manufacturing process. In accordance with the invention, such the strands are constructed to be loosely twisted about a longitudinal axis of symmetry in a direction opposite (not the same) as its mating mesh bar. In addition, the pitch of the twist is controlled wherein each mesh bar defines a a range of pitch value, say from 3 d to 70 d and preferably 5 d to 40 d where d is the diameter of at least the smaller of the twisted strands. In another aspect, each mesh bar comprises a strap of synthetic or natural fibers of either rectangular, or quasi-rectangular cross section, preferably twisted along its longitudinal axis of symmetry whereby in operation the short sides form interchanging leading and trailing edges. In still another aspect, the invention relates to cell construction associated with tow, bridle and breast lines that attach to the trawl and improved performance thereof. Result: rather deep grooves are formed along the length of each cell bar that interact with passing water during operations as explained below. Note in this regard that the invention provides for a cell construction that can be systemized. In the case of a trawl, the opposite mesh bars of any rectangularly shaped mesh cell act as mini-hydrofoils or wings in concert in operations. Such opposite bars (whether formed of a series of twisted strands or of a single twisted strap), are characterized as having a common lay direction when viewed in an axially receding direction (either right-handed or left-handed lay) that is opposite to that associated with the remaining opposite mesh bars of such mesh cell.

When incorporated in a trawl system, such cell construction of the invention, provides for improved shaping and performance. That is, the cells positioned at different geometrical locations relative to and about the longitudinal central axis of the trawl, can be controlled such that resulting trawl panels, wings, bridle lines, towlines etc., act analogous to a series of mini-hydrofoils capable of acting in concert in operation. Such concerted action provides—when the trawl is in motion—outwardly directed force vectors which increase—significantly—trawl system performance characteristics including but not limited to overall trawl volume while simultaneously—and surprisingly—decreasing drag and background noise.

BACKGROUND OF THE INVENTION

It is well understood that the basic cell of a selected portion of every trawl system net is the unit cell (called cell hereinafter). The selected portions of the trawl system is then built by repeating the basic shape.

It is axiomatic that the ability to predict the overall shape and performance of the finished product depends entirely on the shape and structural integrity of that single cell. Heretofore, proper trawl making was a two-step process that involved initial construction of undersized mesh cells, and setting the knots and mesh sizes by the substeps of depth stretching and heat setting involving turning the finished mesh in direction opposite to its natural bent and applying pressure, and then applying heat to set the knots.

Materials used in the mesh cell construction can be plastics such nylon and polyethylene but other type of natural occurring fibers also can be (and have been) used. Single, double (or more) strands make up a thread or twine composed of, say, nylon, polyethylene and/or cotton. Additionally, braided cords, of natural and synthetic materials, as well as rope and cables, have been used. However, the pitch of any braided or twisted thread, twine, cord and/or rope (distance between corresponding points along one of the strands constituting one turn thereof) which is analogous to the pitch between corresponding screw threads), has been small. Moreover, modem manufacturing processes use threads. twines, cords, cables or ropes to form mesh cells, and have always produced cells in which twist direction of the individual bars comprising each cell, is always the same. None have proposed the use of differently oriented twist of individual mesh bars of the mesh cell in the manner provided by the instant invention.

Even though various Japanese Patent Applications superficially deal with nets having differing twist directions, (see for example, Jap. Pat. Apps. 57-13660, 60-39782 and 61-386), these deal with a contrary goal than that of the instant invention, viz., to a balancing of residual torque forces within the net structure during construction thereof, not to the generation of composite vector forces during actual field operations (via water flow-net shape interaction) for enhancement of net performance. The first-mention Application, for example, states that its purpose is to provide "net legs with different twist directions according to a fixed regular pattern so that torsion and torque of said net legs are mutually canceled" and must generate substantially inconclusive unbalanced forces during operations since the depicted net would lead to a shrinkage in net volume, not increasing net volume as provided by the instant invention.

SUMMARY OF THE INVENTION

The present invention is based on the discovery that individual bars of a cell can be controlled to act as mini-hydrofoils in operation. In one aspect, the invention controls twist direction, either right-handed or left-handed in a receding direction from a knot or equivalent coupler, in a fashion to provide for an improved shaping and performance of resulting trawl system.

In one aspect, the invention relates to mesh cell construction for trawls that can be triangular, rectangular and/or hexagonal in cross section (where such rectangular configurations include square cells) and is associated with at least three and preferably four cell (or more) bars in a common plane, with the length of each bar being measured between a pair of normalized transverse, quasi-transverse, longitudinal or quasi-longitudinal spaced-apart knots or equivalent couplers. In accordance with the invention, a pair of half mesh bars of each cell are constructed so as to fan out from a common knot or coupler (of the four knots or couplers associated with each quadratic mesh cell). Each mesh bar of such pair is constructed to provide hydrofoil-like characteristics in field operations. Each mesh bar comprises two (or three or more) strands comprised of filamented synthetic material such as plastic or naturally occurring substance, each strand being the product of a conventional manufacturing process. In accordance with the invention, such the strands are constructed to be rather loosely twisted about a longitudinal axis of symmetry in direction that is opposite (not the same) direction as its mating mesh bar. In addition, the pitch of the twist is controlled wherein each mesh bar defines a range of pitch values, say from 3 d to 70 d with 5 d to 40 d being preferred where d is the diameter of at least the smaller of the twisted strands. In additio, each mesh bar can comprise a strap of synthetic or natural fibers of rectangular, quasi-rectangular cross section, preferably twisted along its longitudinal axis of symmetry whereby in operation the short sides form interchanging leading and trailing edges. In still another aspect, the invention relates to cell construction associated with tow, bridle and breast lines that attach to the trawl and improved performance thereof Result: rather deep grooves are formed along the length of each cell bar that interact with passing water during operations as explained below. Note in this regard that the invention provides for a cell construction that can be systemized. In the case of a trawl, the opposite mesh bars of any rectangularly shaped mesh cell act as mini-hydrofoils or wings in concert in operations. Such opposite bars (whether formed of a series of twisted strands or of a single twisted strap), are characterized as having a common lay direction when viewed in an axially receding direction (either right-handed or left-handed lay) that is opposite to that associated with the remaining opposite mesh bars of such mesh cell.

When incorporated in a trawl system, such cell construction of the invention, provides for improved shaping and performance. That is, the cells positioned at different geometrical locations relative to and about the longitudinal central axis of the trawl, can be controlled such that resulting trawl panels, wings, bridle lines, towlines etc., act analogous to a series of mini-hydrofoils capable of acting in concert in operation. Such concerted action provides—when the trawl is in motion—outwardly directed force vectors which increase—significantly—trawl system performance characteristics including but not limited to overall trawl volume while simultaneously—and surprisingly—decreasing drag and background noise.

DEFINITIONS

MESH is one of the openings between threads, ropes or cords of a net;

MESH CELL means the sides of a mesh and includes at least three sides and associated knots or equivalent couplers oriented in space. For a quadratic cell a longitudinal working plane bisects the knots or couplers and sides and defines a rectangular (including square) cross section with four sides and four knots or couplers. For a triangular cell, the longitudinal working plane defines a triangular cross section with three sides and three knots or couplers. For a hexagonal cell, the longitudinal working plane defines a hexagonal cross section with six sides and six knots or equivalent couplers;

MESH BARS means the sides of a mesh cell;

CELL means a construction unit of a trawl, net or the like and includes both a mesh cell relating to enclosable sides of the mesh of the trawl or net itself, as well as to bridle, breast and tow lines used in transport of the trawl or net through a water column to gather marine life.

CELL BAR means both the sides of a mesh cell and the elements that make up the bridle, breast and tow lines.

RIGHT- AND/OR LEFT-HANDINESS IN A RECEDING DIRECTION along a cell bar relates to the establishment of a central axis of the trawl, net or the like for which the cell associated with the cell bar relate, then with a normalized imaginary giant stick figure positioned so that his feet intersect said central axis but rotatable therewith and his back positioned to first intersect the velocity vector of the moving trawl, net or the like associated with cell, determining right- and/or left-handiness of the cell bar using the location of either of right or his left arm of the such giant stick figure irrespective of the fact that the cell bar position relative to the central axis may be either above, below or offset therefrom, wherein the giant figure always rotates about the central axis and his arms penetrate through the cell bar.

HALF OF MESH CELL means one-half of the cell of the invention is defined by a transverse working plane normal to the longitudinal plane that passes through the centroid of each mesh cell. For the quadratic cell, the transverse working plane passes through two transverse knots or couplers and forms the base of the half mesh cell and each half mesh cell includes a central knot or coupler and two mesh bars consisting of two mesh bars. Each mesh bar comprises a thread having hydrofoil characteristics in operation.

THREAD or MESH BAR are equivalent mesh units and is composed of, in accordance with the invention, of synthetic or natural fibers having hydrofoil-like characteristics in field operation. Firstly, a thread can comprise two strands twisted along the longitudinal axis of symmetry in a loose fashion, say where the pitch is in a range of 10 d–70 d where d is the diameter of the larger of the strands or where d is their diameters if the same. Or secondly, a thread can comprise a strap of solid geometric configuration, say composed of fibers having hydrofoil-like characteristics in operation.

STRAP is a flexible element of synthetic or natural fibers that forms a mesh bar, the strap having a cross section that is generally rectangular or can be quasi-rectangular with rounded short sides and elongated long sides with or without camber. In operation, the strap acts as a hydrofoil, preferably twisted along its longitudinal axis wherein the short sides form interchanging leading and trailing edges. Or where the strap is not twisted, the long sides can be shaped relative to each to provide a pressure differential therebetween resulting in hydrofoil-like effects.

PRODUCT STRAND includes the synthetic or natural fibers or filaments used to form the construction unit of the invention which is preferably but not necessarily the product of a conventional manufacturing process, usually made of nylon, polyethylene, cotton or the like twisted in common lay direction. Such strand can be twisted, plaited, braided or laid parallel to form a sub-unit for further twisting or other use within a mesh bar or a cell bar in accordance with the invention.

NET is a meshed arrangement of threads that have been woven or knotted or otherwise coupled together usually at regular intervals or at intervals that vary usually uniformly along the length of the trawl.

TRAWL is a large net generally in the shape of a truncated cone including bridle lines and like means to keep its mouth open and towlines to enable same to be trailed through a water column or dragged along a sea bottom to gather marine life including fish.

CODEND is a portion of a trawl positioned at the trailing end thereof and comprises a closed sac-like terminus in which the gathered marine life including fish are trapped.

FRAME is a portion of the larger sized meshes of a net or trawl upon which is overlaid (and attached by a binding) a netting of conventional twist.

PANEL is one of the sections of a trawl and is made to fit generally within and about frames shaped by riblines offset from the longitudinal axis of symmetry of the trawl.

PITCH is the amount of advance in one turn of one strand twisted about another strand (or strands) when viewed axially. Or common advance of the twist of the strap along its axis of symmetry.

LAY is the direction in which the strands or the strap wind when viewed axially and in a receding direction.

INTERNAL LAY OR TWIST is the direction of synthetic or natural fibers comprising each product strand, is wound when viewed axially and in a receding direction.

INTERNAL BRAID describes the method of formation of a particular product strand.

TOW LINE comprises a cable, rope or the like that connects a vessel at the surface of a body of water with the trawl, net or the like. Such connection can bia via a trawl door and thence through a bridle to the frontropes attached at the mouth of the trawl, net or the like. In the absence of doors, the tow line can connect directly to a bridle. A vessel or trawler usually employs two towline, one positioned at the portside and one nearer the starboard side.

FRONTROPE(S) is a term that includes all lines located at perimeter edge of the mouth of the trawl, net or the like, such as headrope, footrope (or bottomrope) and breast lines. The frontropes have a number of connections relative to each other and to the bridle lines.

BRIDLES relates to lines that intersect the frontropes and attach to the tow lines. For a particular port or starboard tow line, a pair of bridles extend from a common connection point therewith, back to the frontropes.

TRAWL SYSTEM is a term that includes the trawl, net or the like in association with the tow lines therefor as well as the frontropes and bridles lines.

BRIEF DESCRIPTION OF THE DRAWINGS

FIG. 1 is a illustrative side view of a mid-water trawl being towed by a vessel and indicates that the trawl system of the invention can include the trawl, the tow lines, the bridles and the frontropes, FIG. 2 is another view of a trawl of FIG. 1 disconnected from the towing apparatus and vessel, FIG. 3 is a fragmentary enlargement of a mesh cell of the trawl of FIG. 2;

FIG. 9a is top view of another work station for producing a torque-free segment;

FIG. 9b is a top view of the segment of FIG. 9a after a counterclockwise twist has been applied but before release from the work station;

FIG. 9c is a top view of the segment of FIG. 9b after release from the work station;

FIG. 9d is a top view of a mating segment after a clockwise twist has been applied in the manner of the work station of FIG. 9a;

FIG. 9e is a top view of first and second pairs of the segments of FIGS. 9c and 9d produced by the method of FIG. 9a placed in a X-pattern illustrating the formation of the mesh cell of the invention;

FIG. 24a is a detailed akin to FIG. 24 showing an alternate mesh bar construction using braided (not twisted) strands);

FIG. 24b is also a detailed akin to FIG. 24 showing a combination of braided and twisted strands;

FIG. 24c is a detailed view of another mesh bar construction using a combination of first and second pairs of twisted strands in which each pair comprises first and second strands twisted each other and in which the first pair is later twisted about the other pair;

FIG. 25 is yet still another top view of yet still other sets of segments of FIGS. 8 and 9 placed in an X-pattern illustrating yet still another alternate method of forming the mesh cell of the invention;

FIG. 26 is yet still another top view of yet still other sets of segments of FIGS. 8 and 9 placed in an X-pattern illustrating yet still another alternate method of forming the mesh cell of the invention;

FIG. 27 is a top view of a series of alternate mesh cells of the invention in which each mesh cell is of a triangular cross section in which the bases thereof are parallel to the axis of symmetry of the group of alternate mesh cells and the apexes are centered along the base of an adjoining cell;

FIG. 28 is another top view of another group of alternate mesh cells of the invention in which each mesh cell is of a triangular cross section in the bases thereof are parallel to the axis of symmetry of the group and wherein the bases are formed of larger diametered rope for better load carrying capability;

FIG. 29 is another top view of still another group of alternate mesh cells of the invention in which each mesh cell is of a triangular cross section but is formed of a single strap of material of rectangular cross section in which the bases thereof are substantially parallel to the axis of symmetry of the group;

FIG. 30 is yet another top view of yet still another group of alternate mesh cells of the invention in which each mesh cell is of a hexagonal cross section in which the bases thereof are substantially parallel to the axis of symmetry of the group;

FIG. 31 is a top view of the trawl of FIGS. 1 and 2 modified to provide a netting of conventional design covering mesh cells constructed in accordance with the invention;

FIG. 32 is a fragmentary perspective view of yet another trawl system design of the invention including sub-headrope and sub-footrope assemblies;

FIG. 32a is a fragmentary detail of another sub-headrope assembly of the trawl system of FIG. 32 illustrating another cell construction;

FIG. 32b is a fragmentary detail of another sub-footrope assembly of the trawl system of FIG. 32 illustrating yet another cell construction;

FIG. 33 is yet another top view of an alternative mesh cell in which the mesh bars include a rectilinearly disposed cylindrical first strand about which a second strand serpentines;

FIG. 34 is an enlarged detail taken along line 34—34 of FIG. 33;

FIG. 35 is a top view of another alternative mesh cell in which the mesh bars include a rectilinearly disposed cylindrical first strand about which a second strand serpentines;

FIG. 36 is an enlarged detail taken along line 36—36 of FIG. 35;

FIG. 37 is a top view of still anther alternative mesh cell in which a rectilinearly disposed cylindrical first strand about which a second strand (of reduced diameter) serpentines;

FIG. 38 is an enlarged detail taken along line 38—38 of FIG. 37;

FIG. 44 is another fragmentary enlargement of an alternative mesh cell of the invention;

FIG. 45 is a section taken along line 45—45 of FIG. 44;

FIG. 51 is a fragmentary enlargement of yet another alternate mesh cell of the invention;

FIG. 52a is a detail view of an alternative connection for the mesh cell of FIG. 51;

FIG. 52b is a section taken along line 52b—52b of FIG. 51a;

DETAILED DESCRIPTION OF THE PREFERRED EMBODIMENTS

Figure 4:
FIGS. 4–7 are top views of a work station having a table, reel post and for producing a looped segment of the invention.
Figure 5:
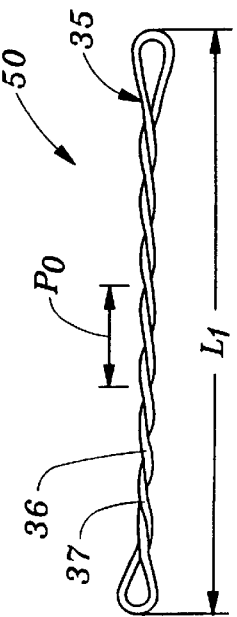
Figure 6:
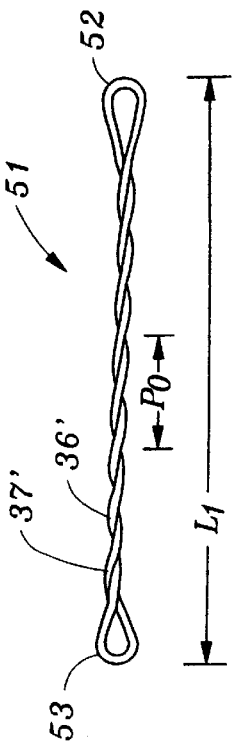

Referring to FIG. 1, there is shown a towing vessel 10 at the surface 11 of the ocean 12 towing a mid-water trawl 13 of the of the trawl system 9 of the invention. The trawl 13 is positioned between the surface 11 and the ocean bottom 14. The trawl 13 can be connected to the towing vessel 10 in many different configurations and the one chosen includes a main towing line 18 connected through door 19, towing bridles 20 and mini bridles 21, 22. A series of weights 23 is attached to minibridle 22. Likewise, the shape and pattern of the trawl 13 can vary as is well known in the art. As shown, the trawl 13 shown includes wings 25 for better herding open at mouth 26. The wings 25 are seen to define a mesh size that is larger than that used to form mid-portion jacket 27, intermediate portion jacket 28 or codend 29.

FIG. 2 illustrates the trawl 13 of FIG. 1 in more detail.

As shown, the wing 25 includes a series of mesh cells 30 of rectangular cross section that is part of a panel 31 offset from axis of symmetry 32 of the trawl 13. The trawl 13 includes meshes 33 of a selected size determined by the length between adjacent knots or equivalent couplers 34. The mesh cells 30 are of a general rectangular cross section that is repeated through the longitudinal and lateral scope of the trawl 13.

As shown in FIG. 3, the mesh cells 30 each have a longitudinal axis of symmetry 30a parallel to the axis of symmetry 32 of the trawl 13 and are formed of a series of threads 35 comprising first and second product strands 36, 37. As explained in more detail below, the product strands 36, 37 of each mesh cell 30 are twisted about a common axis of symmetry 38 either in one of two lay directions: clockwise or counterclockwise as viewed axially along longitudinal axis of symmetry 38 and in a receding direction established at the mouth 26 of the trawl 13 (FIG. 1).

FIGS. 4, 5, 6 and 8 shows how a given segment of thread 35 is formed.

Figure 7:
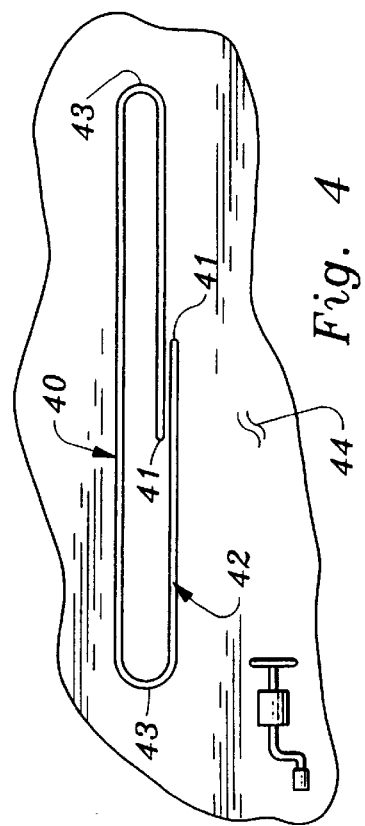
Figure 8:
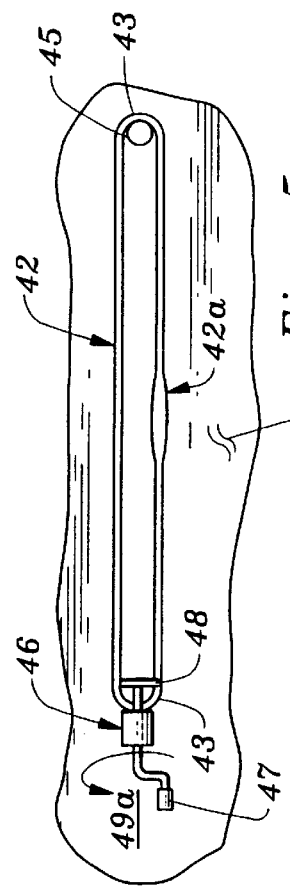
FIG. 8 is a top view of the segment of FIGS. 4–7 after a counterclockwise twist has been applied.
Figure 9:
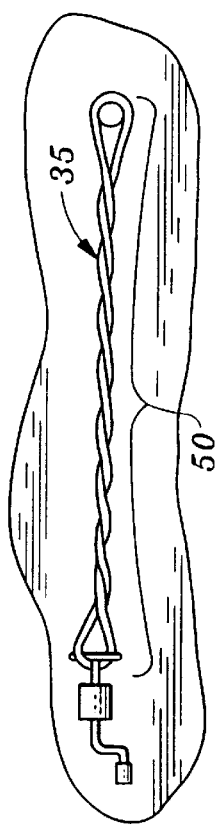
FIG. 9 is a top view of another segment produced from FIGS. 4–7 after a clockwise twist has been applied.

As show, a single strand 40 that is the product of a conventional manufacturing process as well as has termini 41, is formed in a loop 42 after which the termini 41 are permanently attached together to form a spliced region 42a. Thereafter, ends 43 of the loop 42 are attached between a fixed post 45 and a reel 46 located on a table 44. The reel 46 has a handle 47 capable of providing rotation to a spindle 48 attached to one end 43 of the loop 42. Result: when the handle 47 is rotated in a counterclockwise direction as indicated by arrow 49a, the loop 42 becomes twisted to form a counterclockwise lay segment 50 of thread 35, wherein segment 50 has a length L1 measured between the ends 43 and is composed of the first and second strands 36, 37 previously mentioned wound in a counterclockwise lay direction (FIG. 8). Thereafter, the method is repeated except that the handle 47 is rotated in a clockwise direction (FIG. 7) wherein a new segment 51 (FIG. 9) is provided having a length L1 measured between ends 52, 53 and of course is composed of the strands 36', 37' twisted in a clockwise direction, i.e. in a direction opposite to that of the segment 50 composed of strands 36, 37. Note that the pitch Po of the segments 50 and 51 are the same and is in a range of 3 d to 70 d where d is the diameter of the strands 36, 37, 36', 37'.

Note that the methods depicted in FIGS. 5–9 produces segments 50, 51. Each segment 50 or 51, after twisting has occurred, has turns which contain residual torque. Such torque can be balanced by conventional thermal setting techniques, however.

But a better method has been discovered in which the large loops 42 (as depicted in FIG. 5–9) are eliminated prior to the twisting process to permit the formation of torque-free segments.

Such method is shown in FIG. 9a.

As shown in FIG. 9a, two (say first and second) strands 40' are placed side-by-side of each other across a long table 44'. Each of strands 40' have separate near and far termini 41' and 41". Each near and far termini 41', 41" comprises first and second terminus positioned side-by-side, i.e., so they are parallel to each other. Then the parallel positioned near termini 41' at the near ends of the first and the second strands 40' and are formed into mini loops 56. These mini loops 56 attach to the respective opposed T-arms 48a of the spindle 48 as shown in FIG. 9b. The opposed parallel far termini 41" of the same first and second strands 40' are each then attached to a series of in-line conventional barrel swivels 57a (such as used in removing torque in fishing lines and purchasable at any sporting goods store) and thence through a second residual strand 57b to a separate fixed post 45' attached at the far end of the table 44'. Then with rotation of the spindle 48 in a first direction, the first and second strands 40' twist together, while the residual strands 57b attached thereto, are not so wound because of the action of the barrel swivels 57a. After the mini loops 56 at the near termini 41' of the first and second strands 40' (at the spindle 48) are removed from contact with the T-arms 48a as are the far termini 41" from the barrel swivels 57 followed by the formation of mini loops similar in shape to the mini loops 56 for the near termini 41', the result is segment 59a having a length L1 and a pitch Po in the range precisely(?) set forth above, as shown in FIG. 9c. That is, a segment 59a twisted in a left-handed or counterclockwise lay direction is formed wherein the resulting turns have no or substantially minimum residual torque. Hence thermal setting is unneeded. Thereafter, the method is repeated but rotation of the spindle 48 being in an opposite direction as shown, producing segment 59b of FIG. 9d having a length Li and a pitch Po where Po has a range of values as previously set forth. Further iteration of the method produces further pairs of segments 59c and 59d which can then be assembled together in a X-pattern as shown in FIG. 9e FIG. 9e shows a X-pattern layout of pairs of segments 59a–59d produced by the method of FIGS. 9a and 9b.

As shown, a pair of left-handed or counterclockwise segments 59a, 59c (each constructed as depicted in FIG. 9c and positioned parallel to each other) is located in the aforementioned X-pattern along with a pair of right-handed or clockwise segments 59b, 59d (each constructed as depicted in FIG. 9d and positioned parallel to each other). The segments 59a–59d are offset from a central axis 32' associated with the axis of symmetry of the trawl to be manufactured and terminate in mini loops 56. The result is the formation of a mesh cell 58 of a quadratic design in accordance with the invention which consists of four mesh bars or sides associated with subsegments 59a', 59b', 59c' and 59d'. Note that the two mesh bars or sides of the cell 58 associated with sub-segments 59b', 59d' are of a right-handed or clockwise lay and positioned parallel to each other while the two mesh bars or sides of the cell 58 associated with sub-segments 59a' and 59c' are of a left-handed or counterclockwise lay and are positioned parallel to each other.

Assuming a normalizing receding direction in the manner of arrow A', note that the sub-segments 59a' and 59b' diverge from a common intersection point B' and leading and trailing edges are established for each of the sub-segments 59a' and 59b' wherein the leading edge for the sub-segment 59a' when normalized to the receding direction arrow A' relative to the central axis 32', reside at a right side of the sub-segment 59a' as viewed in the receding direction arrow A' and wherein the leading edge of the sub-segment 59b' when normalized to the receding direction arrow A', reside along a left side of the subsegment 59b' as viewed in the receding direction as indicated by arrow A'. Similarly, for the sub-segments 59c' and 59d' converging toward common intersection point B", leading and trailing edges are established for each of the sub-segments 59c' and 59d' wherein the leading edge for the sub-segment 59c' when normalized to the receding direction arrow A' relative to the central axis 32', reside at a right side of the subsegment 59b' as viewed in the receding direction arrow A' and wherein the leading edge of the sub-segment 59d' when normalized to the receding direction arrow A', reside along a left side of the sub-segment 59d' as viewed in the receding direction as indicated by arrow A'. Further characteristics of the mesh cell 58 is discussed by inference in FIG. 10, below.

Figure 10:
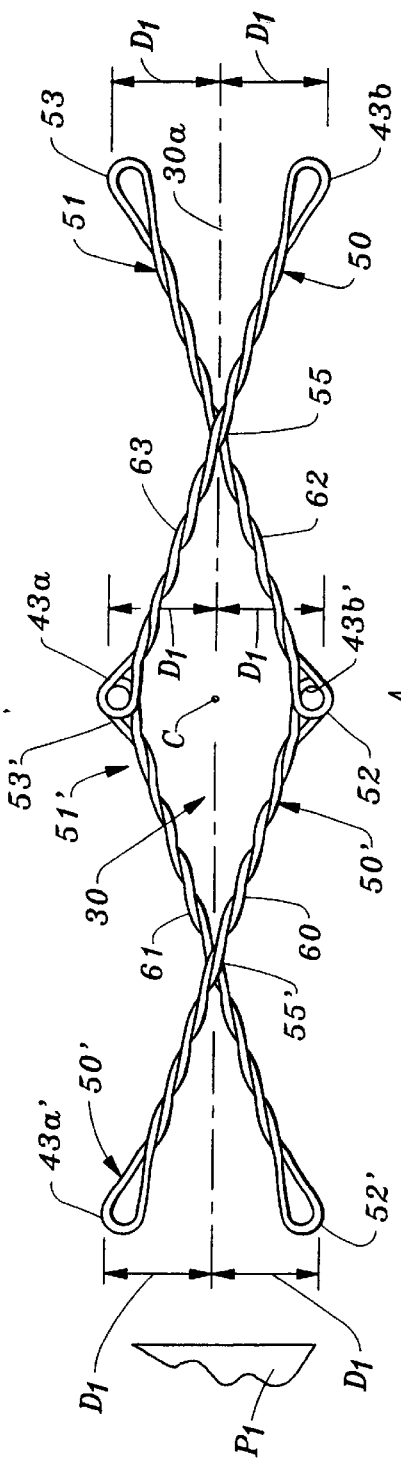
FIG. 10 is a top view of sets of the segments of FIGS. 8 and 9 placed in an X-pattern illustrating the formation of the mesh cell of the invention.

FIG. 10 shows the layout of a series of the segments 50, 51 to form the mesh cells 30 of the invention.

As shown, the clockwise lay directed segment 51 and counterclockwise lay direction segment 50 are lain in a X-pattern relative to each other when viewed in plan so that their mid-points 55 are coincident with and make intersection with each other and with the axis of symmetry 30a of the cell 30 to be formed. That is, the segment 50 is positioned such that its end 43a is offset a distance D1 above the axis of symmetry 30a, while end 43b is offset a distance D1 below the axis of symmetry 30a. And the segment 51 is positioned such that its end 52 is offset a distance D1 below the axis of symmetry 30a and its other end 53 is positioned above the axis of symmetry 30a. Thereafter, a second pair of segments 50', 51' are likewise lain in X-pattern relative to each other wherein their mid-points 55' are coincident with and make intersection with each other and with the axis of symmetry 30a. That is, the end 53' of clockwise twisted segment 51' overlays end 43a of counterclockwise segment 50 and is thus, offset a distance D1 above the axis of symmetry 30a. Similarly, end 52' of the segment 51' is offset a distance D1 below the axis of symmetry 30a. In similar fashion, end 43b' of counterclockwise twisted segment 50' overlays end 52 of clockwise twisted segment 51, and thus, is offset a distance D1 below the axis of symmetry 30a. Similarly, the end 43a' of counterclockwise twisted segment 50' is positioned a distance D1 above the axis of symmetry 30a.

As a result, note that resulting mesh cell 30 is rectangularly shaped and begins with a counterclockwise twisted mesh bar 60 and clockwise twisted mesh bar 61 and ends with a clockwise twisted mesh bar 62 and counterclockwise twisted mesh bar 63 Note that additional mesh cells can be formed at the exterior of the mesh cell 30 in both longitudinal and transverse directions relative to the axis of symmetry 30a by a continuation of the method of the invention.

In more detail, counterclockwise mesh bar 60 starts at intersection 55', diverges transversely outward relative to the axis of symmetry 30a and terminates at the intersection of pair ends 43b', 52, a distance D1 below the axis of symmetry 30a. While, mating clockwise twisted mesh bar 61 starts at intersection 55', diverges transversely outward relative to the axis of symmetry 30a and terminates at the intersection of pair ends 43a, 53' a distance D1 above the axis of symmetry 30a.

Clockwise mesh bar 62 starts at the intersection of pair ends 43b', 52 a distance D1 below the axis of symmetry 30a, diverges transversely inwardly relative to the axis of symmetry 30a and terminates at the intersection 55. While, mating counterclockwise twisted mesh bar 63 starts at the intersection of ends 43a, 53', diverges transversely inward relative to the axis of symmetry 30a and terminates at the intersection 55 coincident with the axis of symmetry 30a.

Thereafter, the mesh bars 60, 61, 62, 63 can be permanently attached together at intersections 55', 55 and at pair ends 43a, 53' and 43b', 52 via couplers not shown that are conventional in the art, such as bindings, seams, braids, metallic bands or the like, or the ends 43a, 53' and 43b', 52 may be joined to one another.

Note that for the mesh cell 30, a longitudinal working plane P1 is seen to bisect the mesh bars 60–63 and defines a rectangular (including square) cross section.

Note that half of the mesh cell 30 means one-half of the cell 30 as bisected by a transverse working plane P2 normal to the longitudinal working plane P1, such working plane P2 passing through centroid C, such centroid being positioned coincident with the axis of symmetry 30a of the cell 30. For the quadratic mesh cell 30, as shown, the transverse working plane P2 passes through paired ends 43b', 52 and 53', 43a. Such working plane P2 forms the base from which each half of the mesh cell 30 extends. Each of the halves of the mesh cell 30 are positioned back-to-back normalized to the transverse working plane P2. Note that in viewing half of the mesh cell 30, one half faces forward toward the front of the trawl 13 (FIG. 1) and such half includes the pair of mesh bars 60, 61 that have been twisted in opposite directions when viewed axially and in a direction receding from intersection 55'. That is, the mesh bar 60 begins at intersection 55' coincident with the axis of symmetry 30a and is twisted in a counterclockwise direction; and the mesh bar 61 also begins at intersection 55' and is twisted in a clockwise direction. Similarly, the remaining half of mesh cell 30 faces backward toward the aft of the trawl 13 (FIG. 1) and includes the pair of mesh bars 62, 63 that have been twisted in opposite directions when viewed axially and in a direction receding from the intersection of paired ends 43a, 53' and 43b', 52 and terminating at intersection 55 coincident with the axis of symmetry 30a. That is, the mesh bar 62 begins at the ends 43b', 52 coincident with the transverse working plane P2 and is twisted in a clockwise direction; and the mesh bar 63 begins at the ends 43a, 53' also coincident with the transverse working plane P2 and is twisted in a counterclockwise direction.

Operational Aspects

Now having described the method of forming the mesh cell 30 and the nature of the twist directions of the mesh bars 60–63, it is now believed to be important to show how the twist directions affect operations. In this regard, one-half mesh cell of the invention as depicted in FIG. 10 has been tested in a flume tank by locating the mesh bars 60, 61 between three posts positioned in 3-spot triangular orientation. That is, one post was located slightly forward of the intersection 55' and two remaining posts were positioned adjacent to the ends 53', 43a and 43b', 52. A 1-kilogram weight was positioned at the intersection 55' and its normalized positioned noted. The half of mesh cell 30 was then subjected to vertically distributed water flow at a velocity of 2 meters per second and pictures taken to show the change in position of the weight. The results of the test are shown below.

Mesh bars 60, 61 Total length=1.4 meters
Pitch=35 d where d is 1 centimeter

Distance along transverse plane=1 meter

Figure 11:
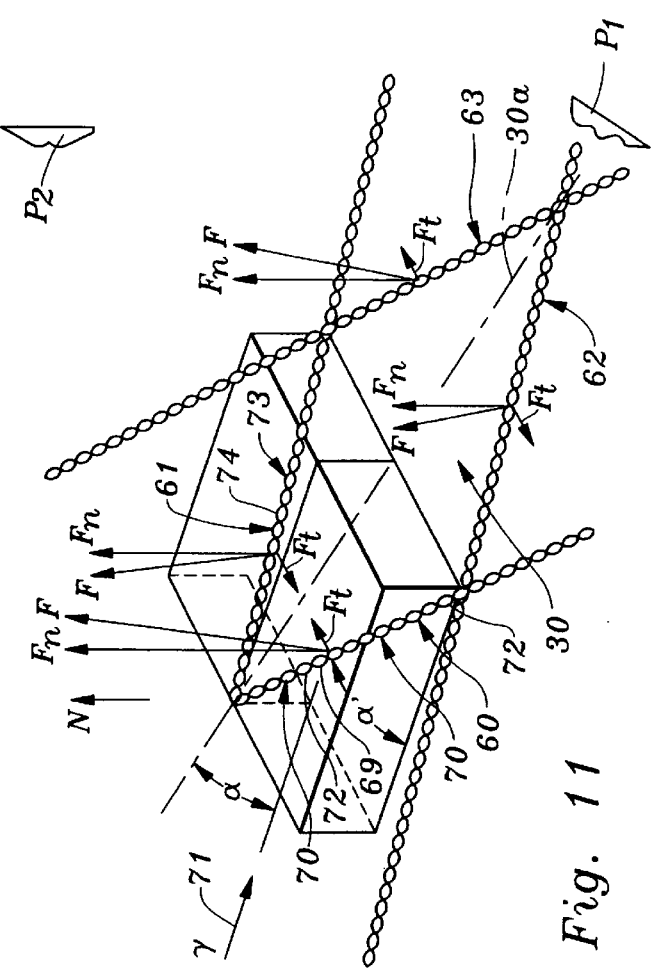
FIG. 11 is a force diagram of hydrodynamic forces acting on the mesh cells of the invention in operation.

Lift distance of the 1-kilogram weight within a water stream of 2.0 meter per second=13.33 centimeters FIG. 11 shows the engineering reasons for providing lift in the operations of the mesh cell 30 of the invention.

As shown, the mesh 30 is seen to be bisected by longitudinal working plane P1 previously mentioned wherein the plane P1 passes through the common longitudinal axis of symmetry 30a of the mesh bars 60, 61, 62 and 63. At the intersection of plane P1 with the forward surface 69 of the mesh bar 60 note that water particles that have a relative velocity vector V in the direction of water flow arrow 71. Since the direction of twist of the mesh bar 60 is counterclockwise, likewise the direction of grooves 70 of mesh bar 60 at the upper surface 72 is parallel of the larger of the component of the relative velocity vector V. Similarly the direction of twist of the grooves 73 of mesh bar 61 (being clockwise) is also parallel of the larger of the component of the relative velocity vector V as the grooves 73 initially make contact with water flow arrow 71 at surface 74 of the mesh bar 61. Note in this regard that angle alpha denotes angle of attack of the mesh cell 30, i.e., the vertical angle between the direction of water flow arrow 71 and the axis of symmetry 30a of the mesh cell 30, and the angle alpha zero measures the transverse angle between the mesh bar 60 and the direction of water flow arrow 71. When angle alpha zero is between 10 to 70 degrees, the water particles splitting at the intersection of plane P1 with the surfaces 69, 74 of the mesh bars 60, 61 for flow about the mesh bars 60, 61, have large components of force that maximize hydrodynamic forces acting normal to the longitudinal working plane P1.

Figures 12, 13:
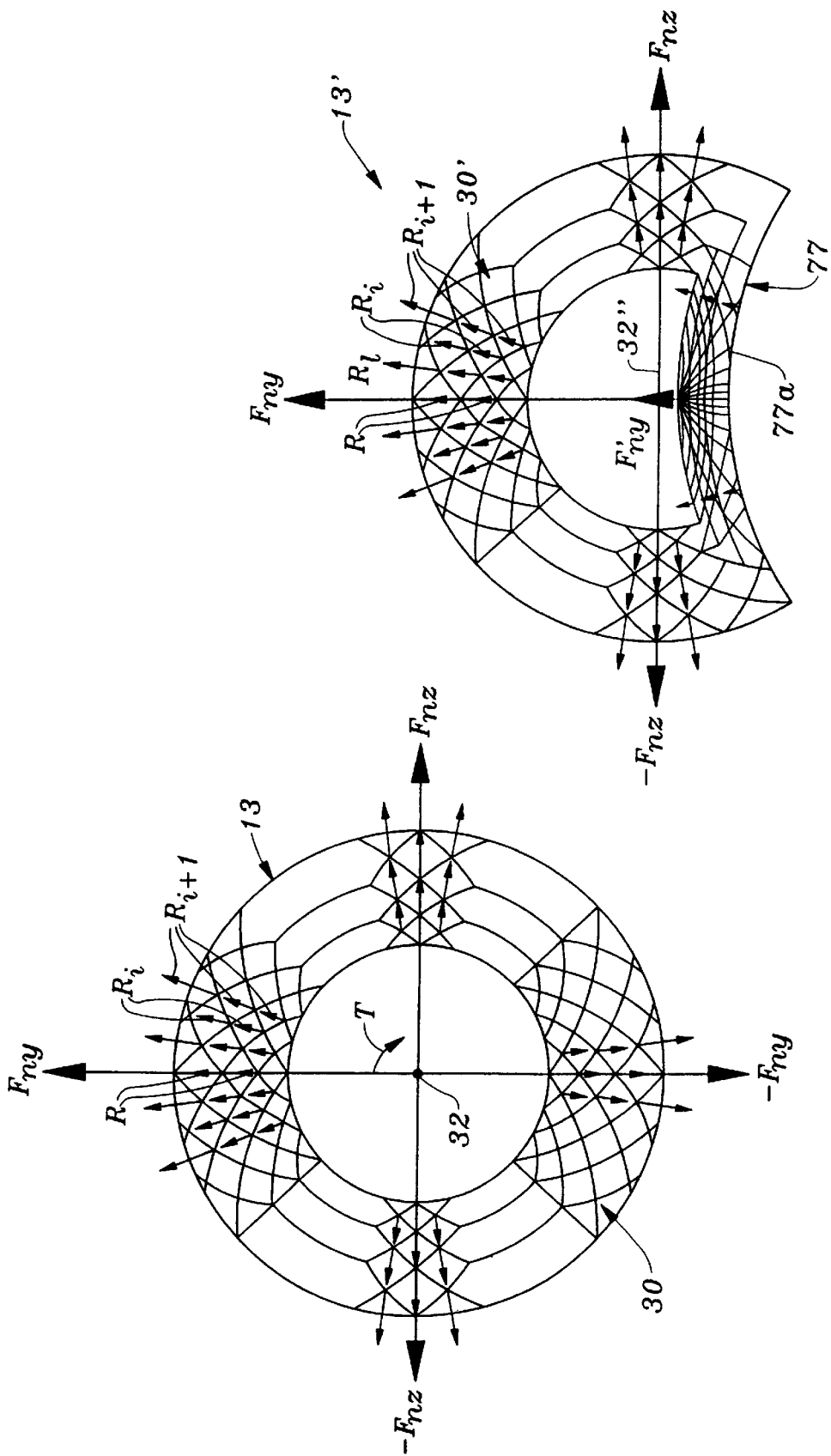
FIG. 12 is a section taken along line 12—12 of FIG. 2.
FIG. 13 is a section akin to that depicted in FIG. 12 in which the bottom panel comprising the mesh cells of the invention has been inverted so that its resultant hydrodynamically created forces are directed inwardly toward the axis of symmetry of the trawl.
Figure 14:
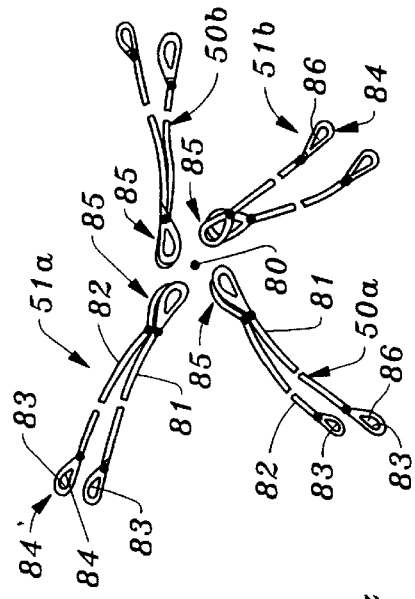
FIG. 14 is also a section akin to that shown in FIG. 13 in which bottom panel is composed of mesh cells constructed in accordance with the prior art, i.e., the cells are formed of threads of the same twist.

That is, due to position, orientation, and direction of grooves 70, 73 relative to the direction of water flow force vector V, the moving water passing over and under the mesh bars 60, 61 acquires both a forward and circular velocity wherein the direction of the circular velocity is dependent upon lay direction of twist of the mesh bars 60, 61 and angle alpha zero, the angle of attack of the mesh bar 60. Moreover, with the twist lay direction of mesh bars 60, 61 as shown, the magnitude of the circular velocity component that passes over the upper surfaces of the mesh bars 60, 61 is larger than that which passes under the undersurfaces of such mesh bars. The result is akin to the production of lift above the wing of an airplane in which decreased pressure zones are provided at the upper surfaces of the mesh bars 60, 61 resulting in creation of lift force vector F having a upwardly directed direction that is slightly angled inward toward the axis of symmetry 30a of the mesh cell 30 due to the pressure differential at the adjacent surfaces thereof Resolution of the lift force F provides for a component Fn normal to the longitudinal working plane P1 and tangential component Ft and −Ft that are each inwardly directed towards the axis of symmetry of the mesh cell 30. Note that the normal forces Fn of the mesh bars 60, 61 are thus additive while the tangent forces Ft and −Ft are equal and opposite. Result: if the mesh cell 30 is united with like cells to form a truncated conical trawl 13 as depicted in FIG. 12, such normal forces Fn are additive as a function of radial angle T centered at axis symmetry 32 to substantially increase the interior volume of the trawl 13 (see FIG. 12) relative to longitudinal axis of symmetry 32. Likewise, since there is cancellation of all tangential components (Ft, −Ft), drag of the trawl 13 is also substantially reduced. Moreover, it is also apparent that the direction of the resultant forces acting on the trawl 13, say acting on bottom panel 77 of FIG. 13 during operations, could be inverted from that depicted in FIG. 12 whereby the normal forces Fny for the bottom panel 77 have a direction that points inwardly of the trawl 13' toward the axis of symmetry 32' causing outer surface 77a to become convexed relative to the axis of symmetry 32'. Note that the shape of the bottom panel of the trawl 13 could also be changed as depicted in FIG. 14 whereby outer surface 77a' of the bottom panel 77' defines a longitudinal plane P6 parallel to the axis of symmetry 32" of the trawl 13". Such a construction occurs by forming the bottom panel 77' of mesh cells constructed in accordance with the prior art, i.e., the cells are formed of strands of the same twist.

Additional Method Aspects

Figure 15:
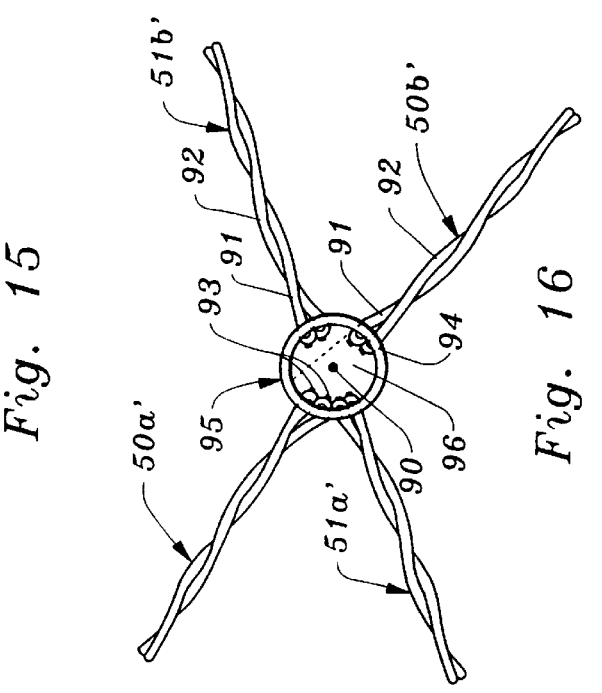
FIG. 15 is another top view of other sets of segments of FIGS. 8 and 9 placed in an X-pattern illustrating an alternate method of forming the mesh cell of the invention.
Figure 15A:
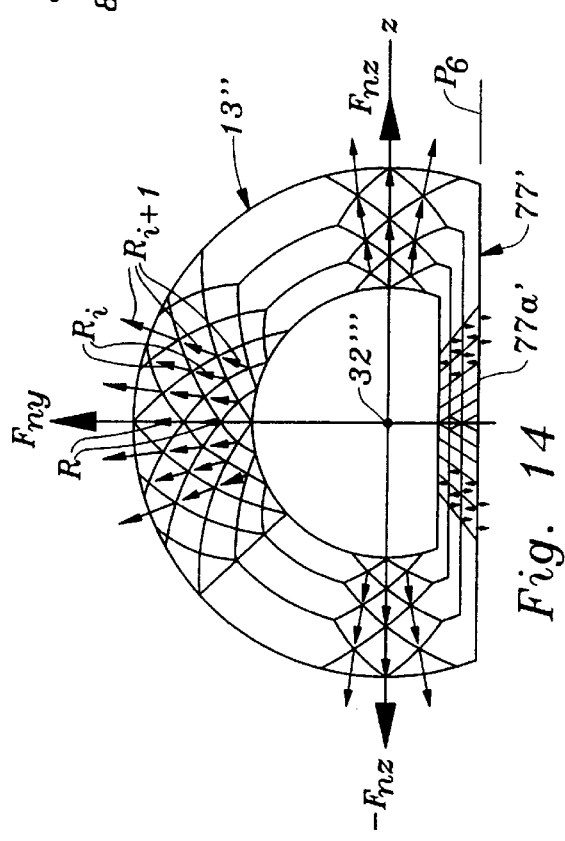
FIG. 15a is another top view of segments of FIG. 15 after a central knot and twisting thereof has occurred.

FIG. 15 shows an additional method of formation of the segments 50, 51 of FIG. 10. As shown the segments 50, 51 are divided into separate subsegments 50a, 50b and 51a, 51b formed in a X-pattern about a central point 80. Each subsegment is formed of a two strands 81, 82 having loops 83 at exterior and interior end segments 84, 85. The loops 83 having openings 86 large enough to permit passage of selected subsegments through such openings 86 at the intersection of the interior end segment 85 of the subsegments to form handing knot 87, see FIG. 15a, at the central point 80. Thereafter, the subsegments are twisted about central axes 88a, 88b to provide the orientation depicted in FIG. 10. That is, the subsegments 50a, 50b are twisted to form a counterclockwise lay direction as viewed from exterior end segment 84a of subsegment 50a. Likewise, the subsegments 51a, 51b are twisted to form a clockwise lay direction as viewed from exterior end segment 84b of subsegment 51a.

Figure 16:
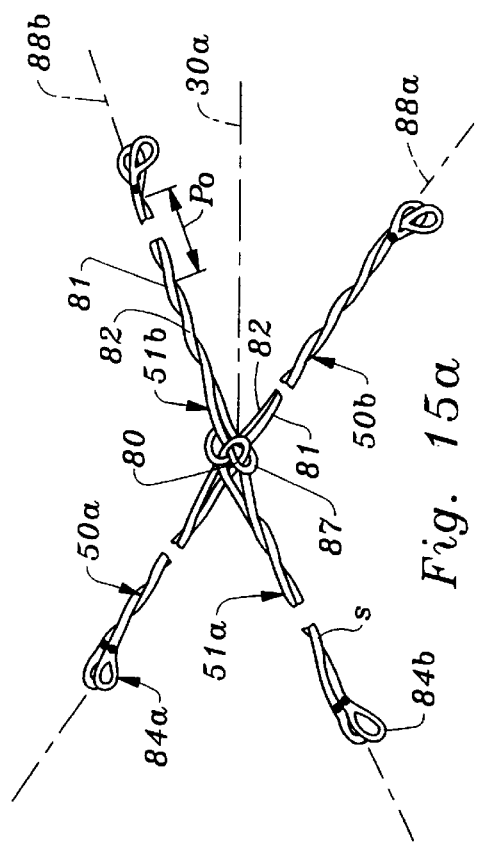
FIG. 16 is yet another top view of yet other sets of the segments of FIGS. 8 and 9 placed in an X-pattern illustrating yet another alternate method of forming the mesh cell of the invention.

FIG. 16 shows another method of formation of the segments 50, 51 of FIG. 10. As shown the segments 50, 51 are divided into separate subsegments 50a', 50b' and 51a', 51b' formed in a X-pattern about a central point 90. Each subsegment is formed of a two strands 91, 92 having interior ends 93 that fit through radial openings 94 in a collar 95. After attachment say via overhand knot 96, each subsegment is twisted as previously indicated above.

Figure 17:
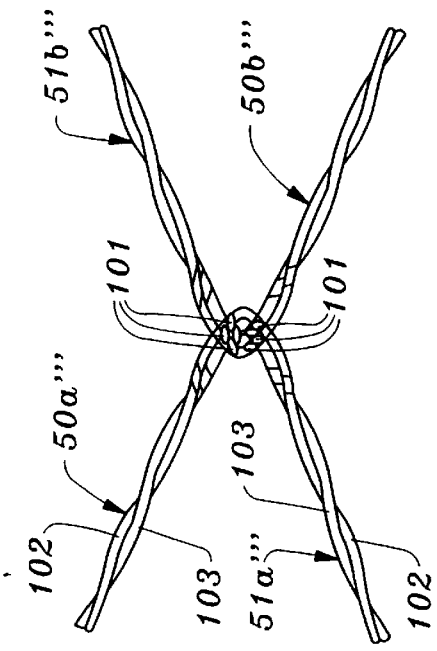
FIG. 17 is still yet another top view of yet other sets of segments of FIGS. 8 and 9 placed in an X-pattern illustrating yet another alternate method of forming the mesh cell of the invention.

FIG. 17 shows yet another method of formation of the segments 50, 51 of FIG. 10. As shown the segments 50, 51 are divided into separate subsegments 50a", 50b" and 51a", 51b" formed in a X-pattern about a braided or woven intersection segment 97. Each subsegment is formed of a two strands 98, 99 that attach together via intersection segment 97. As shown, all strands 98, 99 are independent of each other. Thereafter, each subsegment is twisted as previously indicated above.

Figure 18:
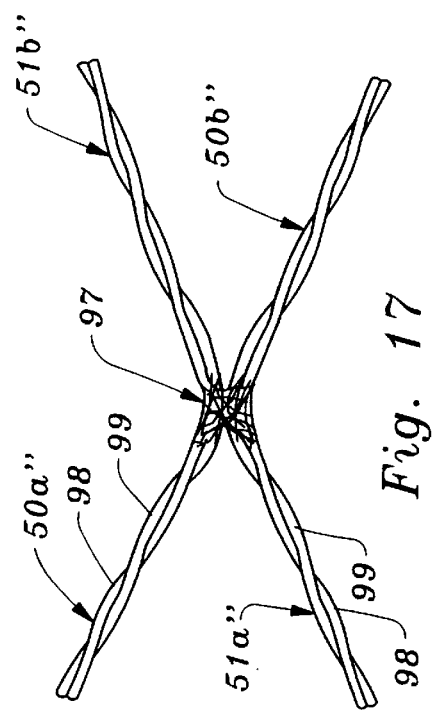
FIG. 18 is yet still another top view of yet still other sets of segments of FIGS. 8 and 9 placed in an X-pattern illustrating yet still another alternate method of forming the mesh cell of the invention.

FIG. 18 shows still another method of formation of the segments 50, 51 of FIG. 10. As shown the segments 50, 51 are divided into separate subsegments 50a''', 50b''' and 51a''', 51b''' wherein subsegment 50a' is integrally united with subsegment 51a''' and subsegment 50b''' is integrally united with subsegment 51b''' in a X-pattern about separate braided or woven intersection segments 101. Each subsegment is formed of a two strands 102, 103 which are twisted as previously indicated above.

Figure 19:
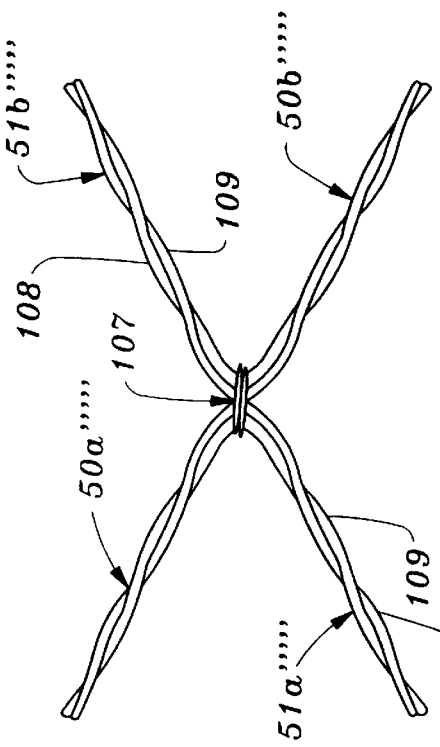
FIG. 19 is yet still another top view of yet still other sets of segments of FIGS. 8 and 9 placed in an X-pattern illustrating yet still another alternate method of forming the mesh cell of the invention.

FIG. 19 shows yet still another method of formation of the segments 50, 51 of FIG. 10. As shown the segments 50, 51 are divided into separate subsegments 50a"", 50b"" and 51a"", 51b"" wherein subsegment 50a"" is integrally united with subsegment 51b"" and subsegment 50b"" is integrally united with subsegment 51a"" in a X-pattern about separate braided or intersection segments 104. Each subsegment is formed of two strands 105, 106 which are twisted as previously indicated above.

Figure 20:
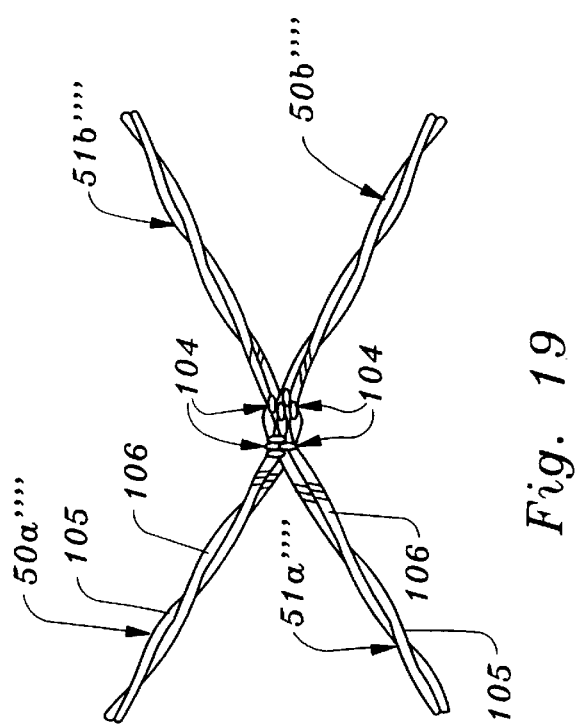
FIG. 20 is yet still another top view of yet still other sets of segments of FIGS. 8 and 9 placed in an X-pattern illustrating yet still another alternate method of forming the mesh cell of the invention.

FIG. 20 shows still yet another method of formation of the segments 50, 51 of FIG. 10. As shown the segments 50, 51 are divided into separate subsegments 50a''''', 50b''''' and 51a'''', 51b'''' wherein subsegment 50a'''' is integrally united with subsegment 51a'''' and subsegment 50b'''' is integrally united with subsegment 51b'''' in a X-pattern about twine or metallic connector 107. Each subsegment is formed of a two strands 108, 109 which are twisted as previously indicated above.

Figure 21:
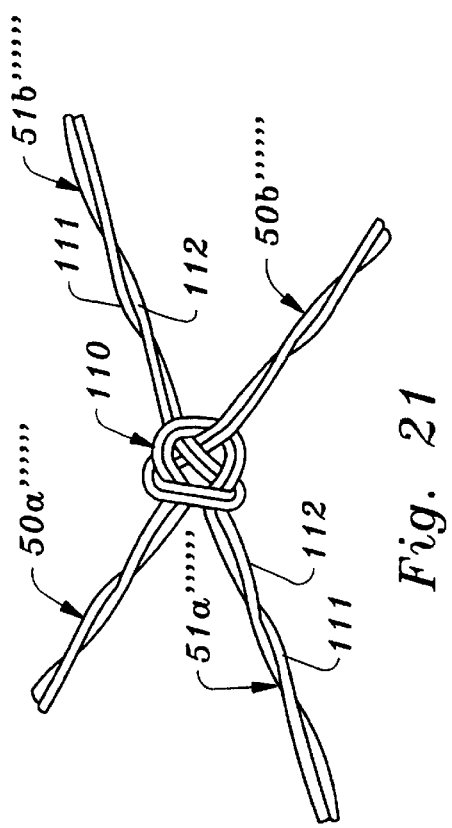
FIG. 21 is yet still another top view of yet still other sets of segments of FIGS. 8 and 9 placed in an X-pattern illustrating yet still another alternate method of forming the mesh cell of the invention.

FIG. 21 shows still yet another method of formation of the segments 50, 51 of FIG. 10. As shown the segments 50, 51 are divided into separate subsegments 50a'''', 50b'''' and 51a'''', 51b'''' wherein subsegment 50a'''' is integrally united with subsegment 51a'''' and subsegment 50b'''' is integrally united with subsegment 51b'''' in a X-pattern intertwined as shown to form knot 110. Each subsegment is formed of two strands 111, 112 which are twisted as previously indicated above.

Figure 22:
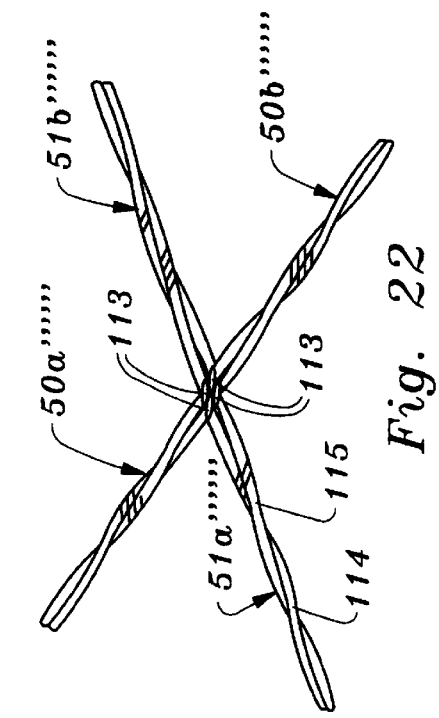
FIG. 22 is yet still another top view of yet still other sets of segments of FIGS. 8 and 9 placed in an X-pattern illustrating yet still another alternate method of forming the mesh cell of the invention.

FIG. 22 shows still yet another method of formation of the segments 50, 51 of FIG. 10. As shown the segments 50, 51 are divided into separate subsegments 50a''''', 50b''''' and 51a''''', 51b''''' formed in a X-pattern about braided or woven intersection segments 113 formed by opening up strands 114, 115 of subsegments 50a''''', 50b''''' and passing subsegments 51a''''', 51b''''' therethrough, then opening up strands 114, 115 of subsegments 51a''''', 51b''''' and passing subsegments 50a''''' and 50b''''', therethrough. Thereafter, each subsegment is twisted as previously indicated above. Note that the load bearing capability of subsegments 51a''''' and 51b''''' are maxmimal.

Figure 24:
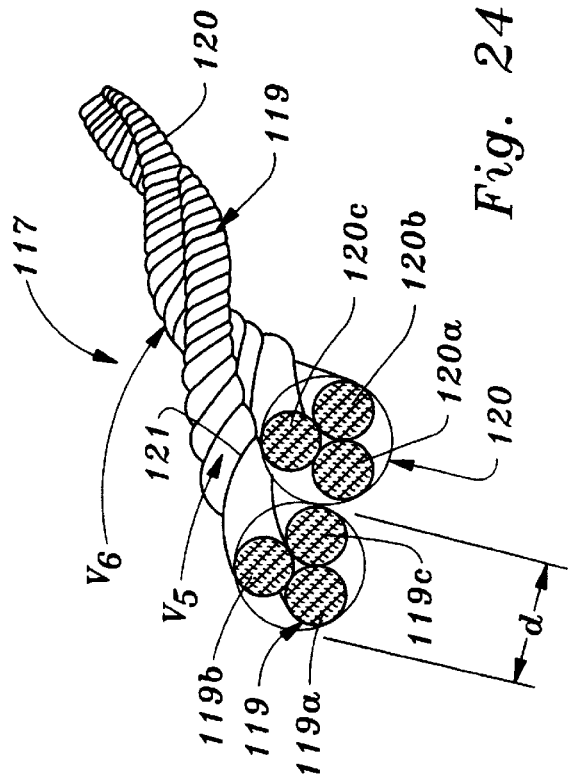
FIG. 24 is a fragmentary perspective view of the sets of segments of FIG. 23 further modified to provide an incremental hydrodynamic force during operations.
Figure 23:
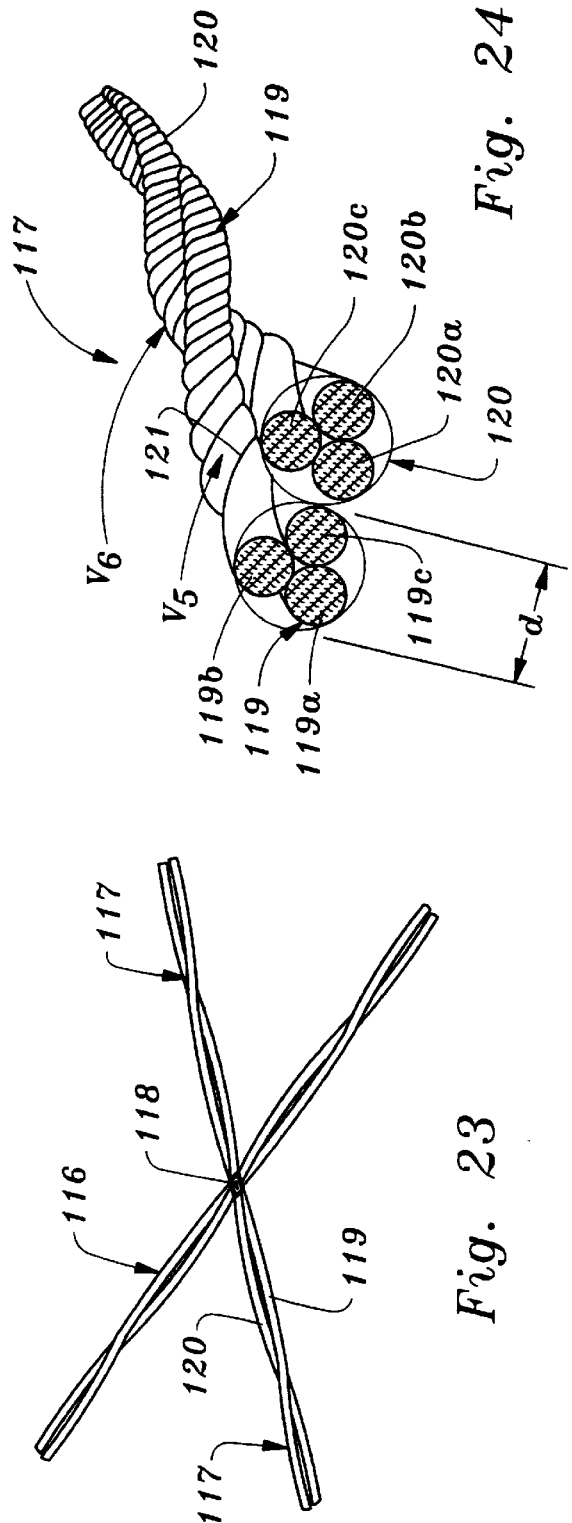
FIG. 23 is yet still another top view of yet still other sets of segments of FIGS. 8 and 9 placed in an X-pattern illustrating yet still another alternate method of forming the mesh cell of the invention.

FIG. 23 shows still yet another method of formation of the segments 50, 51 of FIG. 10. As shown the segments 116, 117 are integrally formed in a X-pattern about a seamed intersection segment 118. The segments 116, 117 are each formed of separate strands 119, 120. Thereafter the segments 116, 117 are twisted as previously indicated above. Note in FIG. 24 that each strand 119, 120 can themselves be composed of substrands 119a, 119b, 119c and 120a, 120b, 120c. These sub-strands 119a–120c are provided a twist direction that matches that of segment 116 or 117 into which the former is incorporated. For example, since the segment 117 of FIG. 24 is provided with a clockwise direction, hence the sub-stands 119a–119c and sub-stands 120a–120c are also provided with a clockwise direction. Result: there is an increase in the magnitude of hydrodynamic forces generated in operations. That is, an incremental circular vector V5 is created in addition to usual vector force V6 created by water passage through grooves 121 between the sub-strands 119a–120c.

FIGS. 24a–24c illustrate variations in the construction of the strands 119, 120 of segment 117 of FIG. 24. In FIG. 24a, the strands 119', 120' are twisted in a right-handed or clockwise direction about axis of symmetry 117a as previously mentioned, but more particularly, each strand 119' or 120' is formed by a conventional braided formation technique in which synthetic or natural fibers or filaments are braided together about the axis of symmetry 117a. In FIG. 24b, a combination of braided and conventional twisted strands 119" and 120" is illustrated. That is, note that strand 119" is of a conventional twisted line or rope product formed of conventional synthetic or natural fibers or filaments twisted about axis of symmetry 117b, as shown in FIG. 24. While strand 120" is formed of a braided construction as hereinbefore described with reference to FIG. 24a. In FIG. 24c, the strands 119''' and 120''' (akin in twist direction to that of segment 116 of FIG. 23) have multiplied to form separate strand pairs 116', 116" nested together about axis of symmetry 117c in which the dominated twist direction for all elements is counterclockwise or left-handed. That is, note that segment 116' that comprises strands 119''' and 120'''' twisted together in a left-handed direction, while pair 116" that comprises strands 119"" and 120''' also twisted together in a similar left-handed or counterclockwise direction. Yet the pair segments 116', 116" also twist about each other in a left-handed or counterclockwise direction relative to the axis of symmetry 117c.

FIG. 25 shows still yet another method of formation of the segments 50, 51 of FIG. 10. As shown the segments 122, 123 are integrally formed in a X-pattern about a seamed intersection segment 124. The segments 122, 123 are each formed of a single strand 125 of material of rectangular cross section. Thereafter, each subsegment is twisted as previously indicated above.

FIG. 26 shows yet another method of formation of the segments 50, 51 of FIG. 10. As shown, the segments 126, 127 are formed in X-pattern about a seamed region 128. The segments 126, 127 are each formed of three strands 129, 130, 131 twisted as previously indicated.

Alternate Mesh Cell Designs

FIGS. 27–30 show alternate shapes for the mesh cell of the invention.

As show in FIG. 27, a series of mesh cells 135 are depicted, each of which being of a triangular cross section that includes side mesh bars 136, 137 and base mesh bar 138. The side mesh bars 136, 137 meet each other at apex knot 139 and meet the base mesh bar 138 at corner knots 140. The side mesh bars 136, 137 include first and second strands 141, 142 which are twisted in opposite directions, i.e., the strands 141, 142 which comprise mesh bar 136 are twisted in a clockwise direction while such strands which comprise mesh bar 137 (when viewed from apex knot 139) are twisted in a counterclockwise direction. And the base mesh bar 138 which includes the strands 141, 142 twisted in a clockwise direction when view axially from initiation of contact with the velocity vector V8 representing relative water flow during operations. Repeating the shape of the series of mesh cells 135 places the apex knots 139 in a common transverse plane P8. While the corner knots 140 are longitudinally spaced a common longitudinal distance D4 that repeats along the series of mesh cells 135. Note that the pitch Po of the strands 141, 142 are common and are in a range of 10 d to 70 d. Result: hydrodynamic forces are created in which normalized components of mesh bars 136, 137, 138 are additive in a direction of arrow 143 out of the plane of FIG. 27 toward the viewer.

But in FIG. 28, the base mesh bar 138' is composed of a rope of clockwise orientation of fibers in which the pitch P7 is less than Po of the mesh bars 136', 137'. Results are identical but since the longitudinal forces are born by the base mesh bars 138' of greater load carry capability, the diameter of the mesh bars 136', 137' can be reduced with subsequent reduction in drag.

As shown in FIG. 29, the triangularly shaped mesh bars 143, 144 are composed of a single strand 146 of material of rectangular cross section in which mesh bar 143 is twisted clockwise and mesh bar 144 is twisted counterclockwise. Base mesh bar 145 is also composed of a single strand 146 of material of rectangular cross section is twisted in a clockwise direction as viewed from the initialization of the mesh bars 143, 144, 145 with water flow vector V9 in operations.

As shown in FIG. 30, a hexagonal mesh cell 150 is depicted, and is composed mesh bars 151, 152, 153, 154, 155, and 156. The mesh bars 151–156 are appropriately attached at braided intersections 157a–157f The mesh bar 151 includes first and second strands 158, 159 which are twisted in a counterclockwise direction when viewed from braided intersection 157a. The mesh bar 152 also includes first and second strands 158, 159 which are twisted in a clockwise direction when viewed from braided intersection 157a. Mesh bars 153, 154 also includes first and second strands 158, 159 which are twisted in a clockwise direction when viewed braided intersection 157b or 157c. Mesh bar 155 also includes first and second strands 158, 159 which are twisted in a counterclockwise direction when viewed from braided intersection 157d. And mesh bar 156 also includes first and second strands 158, 159 which are twisted in a clockwise direction when viewed from braided intersection 157e. Note that the pitch Po of the strands 158, 159 are common and are in a range of 10 d to 70 d. Result: hydrodynamic forces are created in which normalized components of mesh bars 151–156 are additive in a direction of arrow 160 out of the plane of FIG. 30 toward the viewer.

Alternate Trawl Designs

FIGS. 31 and 32 show variations in trawl designs using the mesh cell of the invention.

As shown in FIG. 31, a modified trawl 161 is depicted in accordance with the invention. In this aspect the mesh cells 162 of the invention are created in the fashion previously described so that subsequent operations generates increased volume of the trawl 161. However, such operations are unaffected by the fact that the trawl 161 is overlaid with netting 163 of a conventional twist, i.e., of a common direction. In this embodiment, the trawl 162 acts as frame to accommodate the netting 163 while the mesh cells 162 provide for increased volumetric performance as previously mentioned.

As shown in FIG. 32, a further modified trawl 165 is illustrated in accordance with the invention. Trawl 165 comprises the following: (i) mesh cells 166 formed in accordance with invention, (ii) headrope 167 bisected at midpoint 168 to define a left-hand lay sub-headrope 167a and a right-hand lay sub-headrope 167b, and (iii) footrope 169 comprising right hand lay sub-footrope 169a and left-hand lay sub-footrope 169b extending from bottom segments 170. In subsequent operations, as previously discussed, the twist directions of the headrope 167 provides for generation of upwardly, vertical force vectors 171. During similar operating conditions, the footrope 169 provides for generation of downwardly, vertical directed force vectors 172. Result: a substantial increase in the size of opening 173 measured between the headrope 167 and the footrope 169.

FIGS. 32a and 32b show variations in the headrope 167 or footrope 169 in which the cell construction depicted in FIGS. 32 is changed. In more specific reference to FIG. 32a, a detail of sub-headrope 167a' comprises an axis of symmetry 175, a first cylindrical strand 176 having internal axis of symmetry coincident with the axis of symmetry 175 and a second strand 178. The first strand 176 is hence in an unwound state while the second strand 178 is seen to wind about the first strand 176 to define a series of turns 180 in tangential contact with outer surface 181 thereof Ratio of the diameters of the strands 176, 178: preferably 1:1 but can be larger say 2:1 to about 4:1. Direction of twist of second strand 178: the same as before, i.e., in a left-handed or counterclockwise lay. Note that any transverse cross section of the first strand 176 is circular and the outer surface 181 thereof is equi-spaced from both the internal axis thereof and the axis of symmetry 175 of the sub-headrope 167a'. Note that the mate of the sub-headrope 167a' would have a similar construction as the latter but with opposite winding as that shown.

In FIG. 32b, a detail of sub-footrope 169a" comprises an axis of symmetry 183, a first cylindrical strand 184 having internal axis of symmetry coincident with the axis of symmetry 183 and a second strand 186. The first strand 184 is hence in an unwound state while the second strand 186 is seen to wind about the first strand 184 to define a series of turns 187 in tangential contact with outer surface 188 thereof Ratio range of the diameters of the strands 184, 186: preferably about 1:1 but can be larger say from 2:1 to 4:1. Direction of twist: the same as before, i.e., in a right-handed or clockwise lay. Note that any transverse cross section of the first strand 184 is circular and the outer surface 188 thereof is equi-spaced from both the internal axis 185 thereof and the axis of symmetry 183 of the sub-footrope 169a'. Note that the mate of the sub-footrope 169a' would have a similar construction to the latter but with opposite winding as that shown.

STILL FURTHER ASPECTS

FIG. 33 shows an alternative mesh cell 200. The mesh cell 200 comprises four mesh bars—viz., mesh bars 201, 202, 203 and 204. Each mesh bar 201–204 has an angulated axis of symmetry 205 and includes a first strand 210 and a second strand 211. As explained in more detail below, the first strand 210 can be created using a conventional manufacturing process (or otherwise as previously explained) and includes an outer surface 212. Such outer surface 212 defines a common diameter D. The outer surface 212 is seen not to undulate relative to the axis of symmetry 205 of each mesh bar 201–204 but instead remain parallel thereto throughout the length of the latter, beginning from upstream point 206. That is, the axis of symmetry 209 of the first strand 210 remains coincident with the axis of symmetry 205 over the entire length of each mesh bar 201–204 and is not twisted about such axis of symmetry 205.

However, this is not the case with regard to the second strand 211. It is seen to be twisted about such axis of symmetry 205 of each mesh bar 201–204 in helical fashion and to form a series of turns 195 in contact with the outer surface 212 of the first strand 210. The direction of the turns 195 in contact with the outer surface 212 of the first strand 210 is in either one of two directions thereabout—clockwise or counterclockwise as viewed along the axis of symmetry 205 in a receding direction established at the upstream end 206 of each mesh bar 201–204.

In more detail with regard to mesh bar 201, the second strand 211 is constructed to define a clockwise lay direction. As to mesh bar 202, the second strand 211 defines a counterclockwise lay direction. With respect to mesh bar 203 (opposite to mesh bar 201), the second strand 211 is created to provide a clockwise lay direction. Finally, with regard to mesh bar 204 (opposite to mesh bar 202), the second strand 211 defines a counterclockwise direction.

FIG. 34 shows an enlarged view of the outer surface 212 of the first strand 210 of the mesh bar 201 in contact with turns 195 of the second strand 211. Note that the first strand 210 may be constructed of one (or more) twisted thread or threads 215 defining a lay direction (normalized relative to the upstream end 206), that is opposite to the lay serpentining direction of the second strand 210 about the first strand 210. In that way, a series of openings 196 are provided adjacent to intersections 197 between the turns 195 and the outer surface 212 of the first strand 210 that aid in creating macro-lift vectors during operations apart from the lift mechanism(s) previously described.

Since the direction of twist of the threads 215 making up the first strand 210 is based upon the lay serpentining direction of second strand 211 about such first strand 210 as each mesh bar 201–204 is constructed, note in FIG. 33 that the lay direction of second strand 211 associated with the mesh bar 201 is clockwise. Hence, the twist direction of threads 215 comprising the first strand 210 for such mesh bar 201 is counterclockwise. A similar construction scheme is used for the remaining mesh bars 202–204 wherein the lay direction of the threads 215 associated with the first product strand 210 is clockwise, counterclockwise, and clockwise, respectively, for the mesh bars 202, 203 and 204.

FIG. 35 shows yet another alternative mesh cell 220 comprising four mesh bars—viz., mesh bars 221, 222, 223 and 224. Each mesh bar 221–224 has an angulated axis of symmetry 225 and is composed a first strand 230 as hereinbefore described. However, instead of a single strand, note that the invention embodied within the mesh cell 220 includes a like oriented pair of second and third strands 231, 232 that serpentine about the first strand 230. As previously explained, the first strand 230 has an outer surface 226 defining a common diameter Do, such outer surface 226 remaining parallel to the axis of symmetry 225 beginning at upstream point 227. That is to say, note that the internal axis of symmetry 229 of the first strand 230 remains coincident with the axis of symmetry 225 of mesh bar 221–224 over the entire length of the latter and is not twisted about such axis of symmetry 225. However, the pair of second and third product strands 231, 232 is twisted about such axis of symmetry 225 of each mesh bar 221–224 in uniform fashion to form turns 219 in contact with the outer surface 226 of the first strand 230 in either one of two directions—clockwise or counterclockwise as viewed along the axis of symmetry 225 in a receding direction established at the upstream end 227 of each mesh bar 221–224.

In more detail with regard to mesh bar 221, the pair of second and third strands 231, 232 is constructed to each provide a clockwise lay direction. As to mesh bar 222, the pair of second and third strands 231, 232 defines a counterclockwise lay direction. With respect to mesh bar 223 (opposite to mesh bar 221), the pair of second and third strands 231, 232 is created a clockwise lay direction. Finally, with regard to mesh bar 224 (opposite to mesh bar 222), the pair of second and third strands 231, 232 defines a counterclockwise direction.

FIG. 36 shows an enlarged view of the outer surface 226 of the first strand 230 of the mesh bar 223. Note that the first strand 230 is similar in construction to that previously described and includes one or more twisted threads 235 defining a lay direction that is opposite to the direction of the pair of second and third strands 231, 232. That is, since the lay direction of the pair of second and third strands 231, 232 of the mesh bar 223 is clockwise, the twist direction of threads 235 comprising the first strand 230 is counterclockwise. A similar construction scheme is used for the remaining mesh bars 221, 222 and 224 wherein the lay direction of the threads 235 associated with the mesh bars 221, 222, and 224, is counterclockwise, clockwise, and clockwise, respectively.

FIG. 37 shows still yet another alternative mesh cell 240 comprising four mesh bars—viz., mesh bars 241, 242, 243 and 244. Each mesh bar 241–244 has an angulated axis of symmetry 245 and is composed of a first strand 250 of diameter D1 and a second strand 251 of diameter D2 where D2=½ D1. As previously explained, the first strand 250 has an outer surface 252 defining the aforementioned diameter D1, such outer surface 252 remaining parallel to the axis of symmetry 245 beginning from upstream point 246. That is, the axis of symmetry 249 of the first strand 250 remains coincident with the axis of symmetry 245 over the entire length of mesh bar 241–244 and is not twisted about such axis of symmetry 245. However, the second strand 251 is twisted about such axis of symmetry 245 of each mesh bar 241–244 in contact with the outer surface 252 of the first strand 250 in either one of two directions—clockwise or counterclockwise as viewed along the axis of symmetry 245 in a receding direction established at the upstream end 246 of each mesh bar 241–244.

In more detail with regard to mesh bar 241, the second strand 251 is constructed in a clockwise lay direction. As to mesh bar 242, the second strand 251 defines a counterclockwise lay direction. With respect to mesh bar 243 (opposite to mesh bar 241), the second strand 251 is created a clockwise lay direction. Finally, with regard to mesh bar 244 (opposite to mesh bar 242), the second strand 251 defines a counterclockwise direction.

FIG. 38 shows an enlarged view of the outer surface 252 of the first strand 250 of the mesh bar 243 in contact with the second strand 251. Note that the first strand 250 is constructed of braided construction while the second strand 251 is constructed of one (or more) twisted thread or threads 255 defining a lay direction that can be the same as or can be opposite to its lay serpentining direction about the first strand 250. In either circumstance, a series of openings 256 are provided adjacent to intersections 257 and the outer surface 252 of the first strand 250 that aid in creating macro-lift vectors during operations as previously mentioned, such vectors being separate and apart from the main lift mechanism(s) previously described.

Aspects Associated with the Trawl System of the Invention

Figure 39:
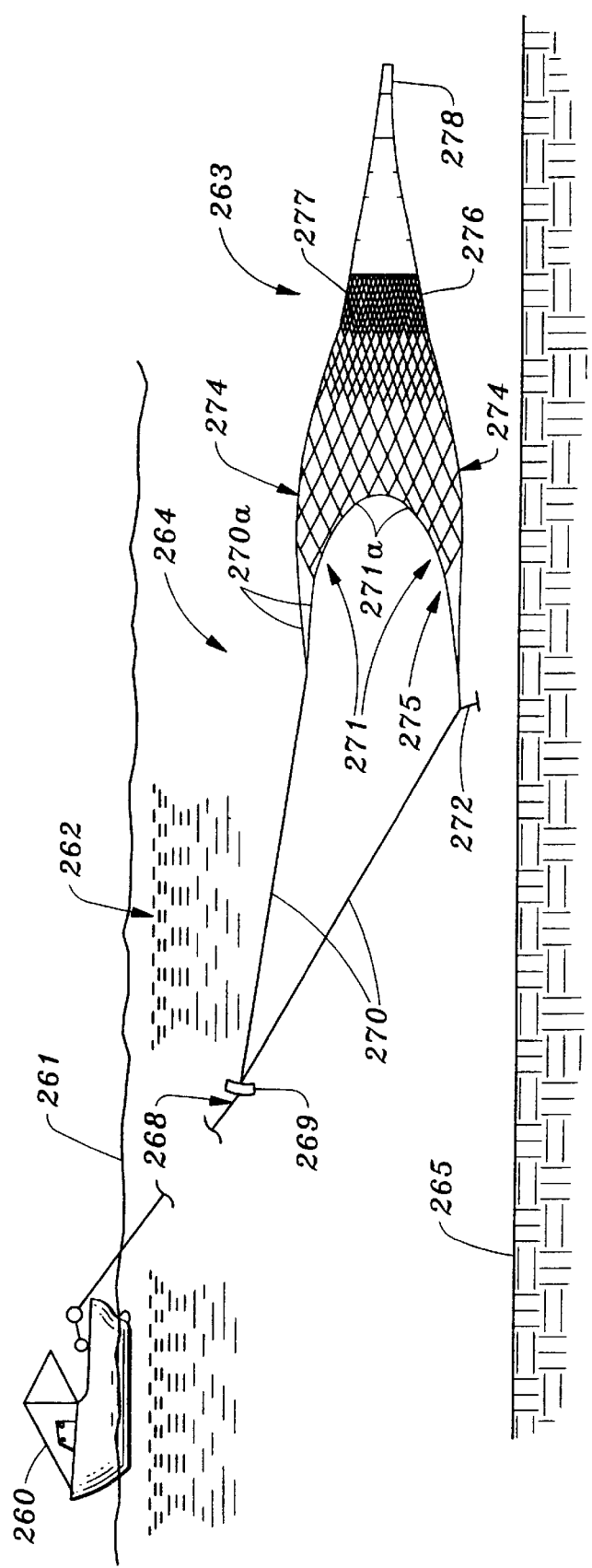
FIG. 39 is an illustrative side view of trawl system in accordance with the invention.
Figure 40:
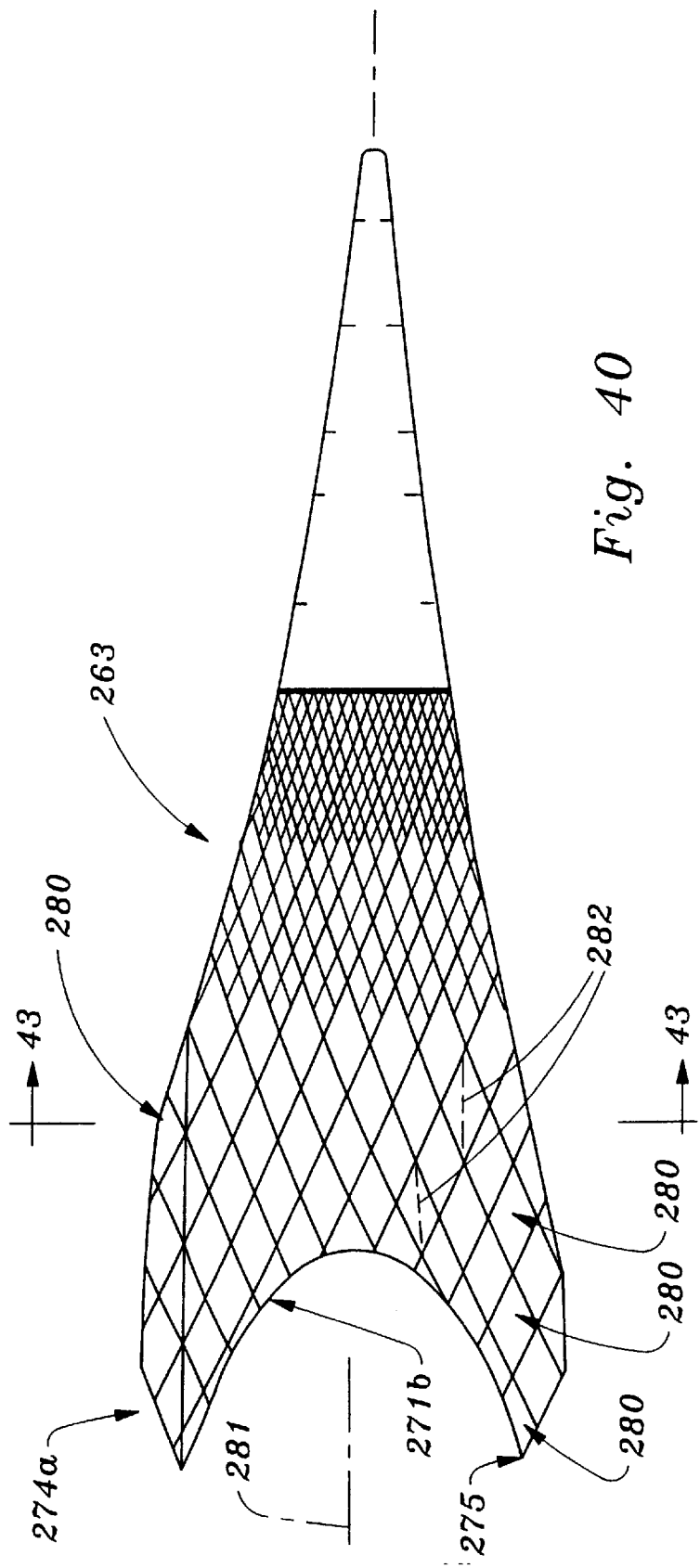
FIG. 40 is a top view of the trawl of the trawl system of FIG. 39 disconnected from the towing vessel.

FIG. 39 shows another embodiment of the invention. A towing vessel 260 is shown the surface 261 of a body of water 262 towing a mid-water trawl 263 of the trawl system 264 positioned between surface 161 and the bottom 265. The trawl system 264 includes the trawl 263 connected to the vessel 260 via main tow lines 268, doors 269, towing bridles 270, mini bridles 270a, and frontropes 271 that include breastlines 271a, headropes 271b (see FIG. 40), minibridles, etc. A series of weights 272 attach to the bridles 270. The trawl 263 is made up four panels (tow side panels, a top panel and a bottom panel), and includes wings 274 for a better herding at open mouth 275. The wings 274 are seen to define a mesh size that is larger than that used to form mid-portion jacket 276, intermediate jacket 277 or codend 278. As shown in FIG. 40, the wing 274a includes a series of mesh cells 280 of rectangular cross section that are offset from the central axis of symmetry 281 of the trawl 263.

Figure 41:
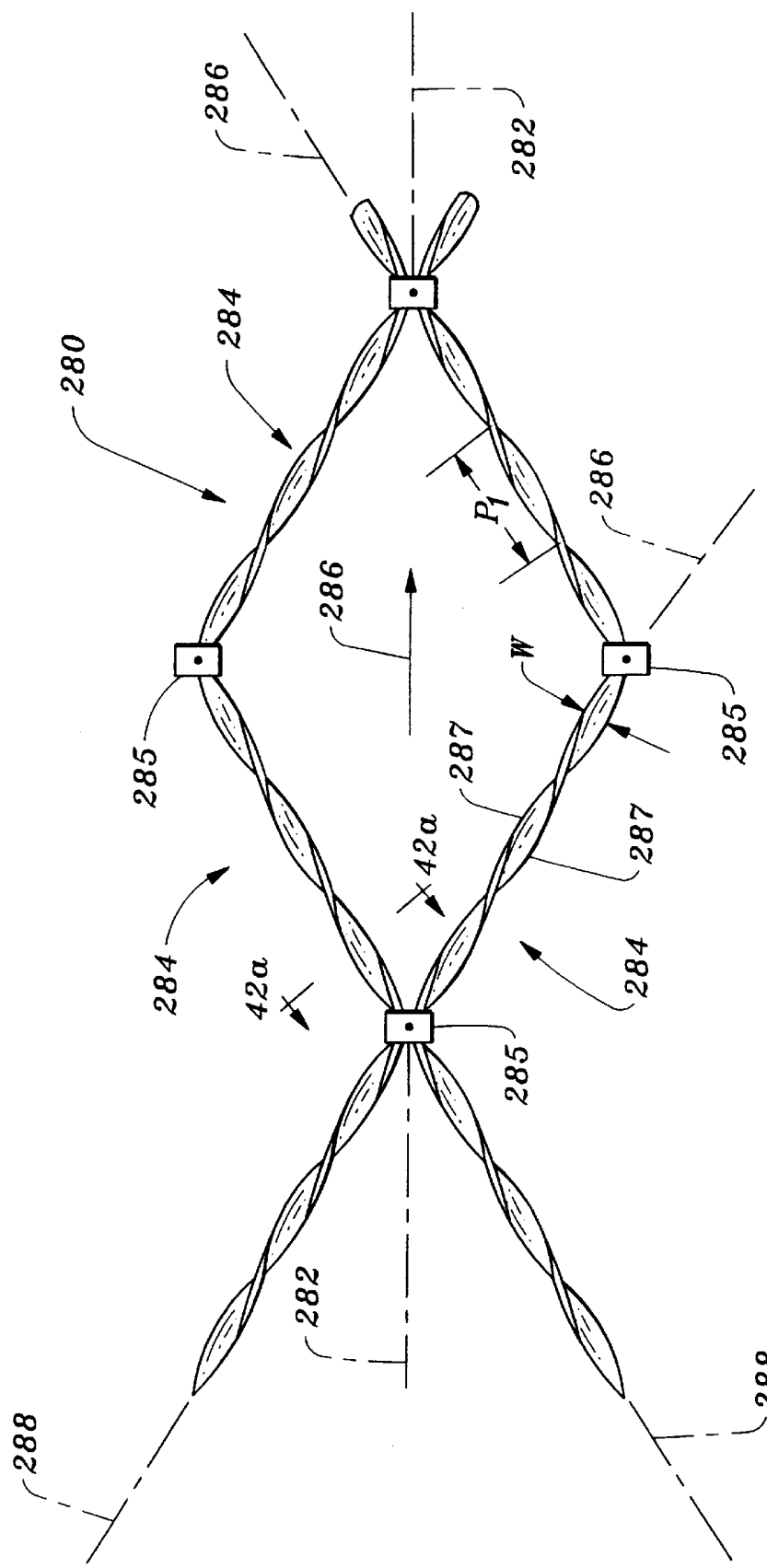
FIG. 41 is a fragmentary enlargement of a mesh cell of the trawl of FIG. 40.

FIGS. 40 and 41 show the mesh cells 280 in more detail.

As shown in FIG. 40, the mesh cells 280 each have a longitudinal axis of symmetry 282 that is offset from the central axis of symmetry 281 of the trawl 263. Since the shape of the trawl 263 varies along the axis of symmetry 281 from almost cylindrically shaped at the wing 274a to a more frustoconical shape over the remainder, the position of the axes of symmetry 282 of individual cells 280 vary with respect to the axis of symmetry 281, from parallel and coextensive, non-parallel and non-intersecting and/or to non-parallel and intersecting. But note that axes of symmetry 282 of the cells 280 are always offset therefrom.

In FIG. 41, each cell 280 is formed of a plurality of straps 284 formed into a X-pattern using a series of connections 285 to maintain such orientation. Each strap 284 is twisted, such direction being normalized to the receding direction of use, as indicated by arrow 286, such twisting occurring about its own axis of symmetry 286 in either one of two lay directions: left-handed or clockwise or right-handed or counterclockwise as viewed relative to the central axis 281 of the trawl 263 (see FIG. 40). As a result, leading and trailing edges 287 are formed.

Figure 42:
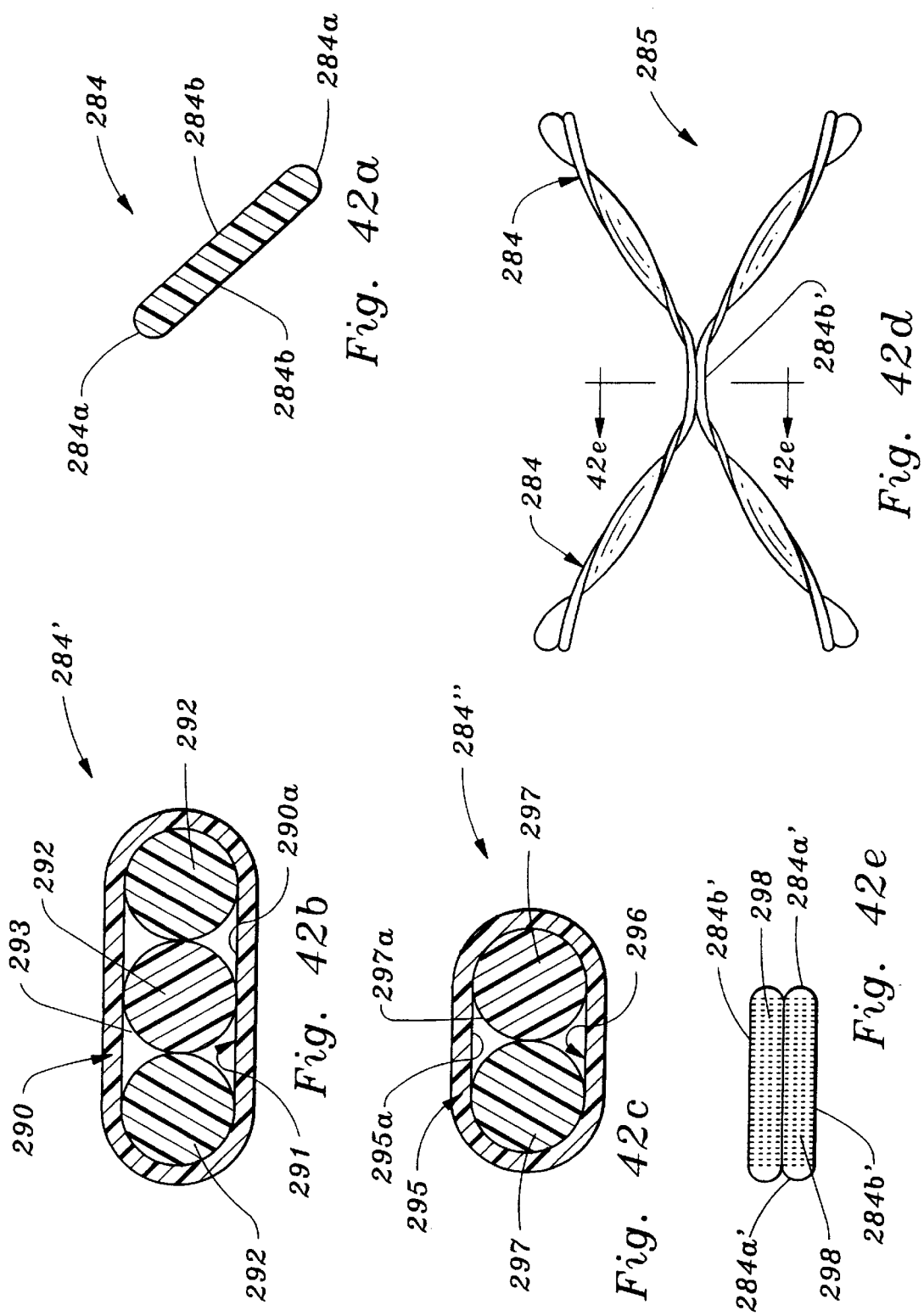
FIG. 42a is a section taken along line 42a–42a of FIG. 40.
FIG. 42b is a detail section akin to FIG. 42a showing an alternative embodiment.
FIG. 42c is a detail section akin to FIG. 42a showing another alternative embodiment.
FIG. 42d is a detail view—slightly enlarged—of alternate connector for the mesh cell of FIG. 41.
FIG. 42e is a section taken along line 42e—42e of FIG. 42d.

As shown in FIGS. 42a, 42b and 42c, the cross section of each strap 284 is seen to be basically rectangular. In FIG. 42a, the twisted strap 284 includes rounded short sides 284a and parallel long sides 284b with the leading and trailing edges occurring at the short sides 284b alternating between the former and the latter based on the pitch, as explained below. In FIG. 42b, instead of the cross section being of a solid geometrical rectangle, strap 284' includes a side wall 290 defining a cavity 291 into which three strands 292 reside—in side-by side fashion. That is, outer surfaces 293 of the three strands 292 have tangential contact with each other as well as inner surface 290a of the oval side wall 290. In FIG. 42c, strap 284" includes side wall 295 defining a cavity 296 into which two strands 297 reside—in side-by side fashion. That is, outer surfaces 297a of the two strands 297 have tangential contact with each other as well as inner surface 295a of the oval side wall 295.

FIG. 42d shows an alternate connection 285' in which the long sides 284b' of adjacent X-ed straps 284 are attached together in a butting relationship. A series of seams 298 provide for such attachment as shown in FIG. 42e. The seams 298 are parallel to short sides 284a'.

Figure 43:
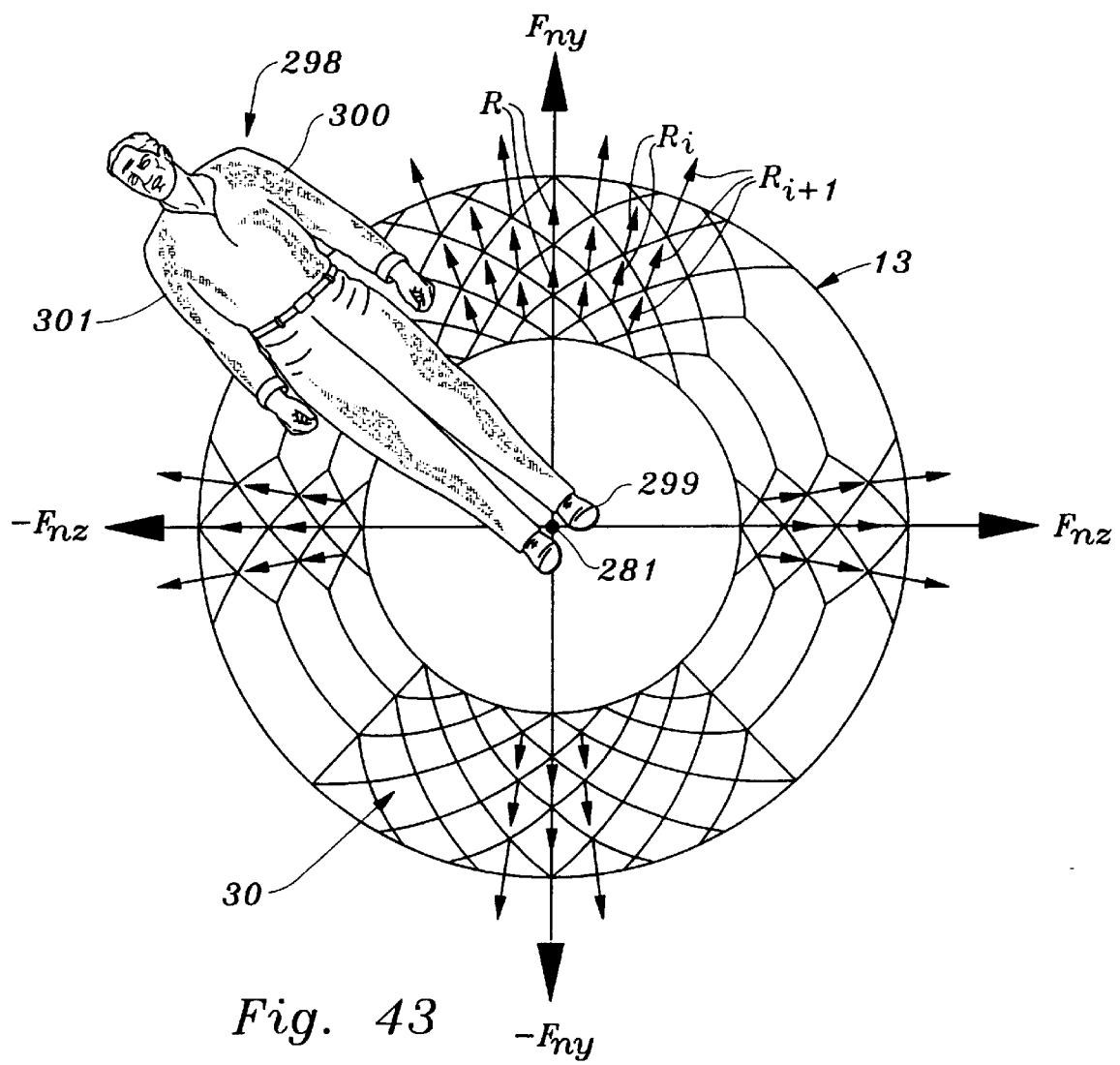
FIG. 43 is a section taken along 43—43 of FIG. 40.

Note that the right-handiness or left-handiness twist of the straps 284 of FIG. 41 is determined using the concept of a figure of man 298 as shown in FIG. 43 as a normalizing icon positioned as described below. Note that the FIG. 298 has feet 299 rotatable affixed to the central axis 281 of the trawl 263. As the trawl 263 and FIG. 298 are moved through the water, the FIG. 298 faces downstream so that his back first encounters the resistance provided by the water to the moving trawl 263. Hence, the FIG. 298 always looks in the direction of the arrow 286 with reference to the cell 280 of FIG. 41, in a receding direction relative to such movement. The right-handed (clockwise) or left-handed (counterclockwise) twist of the straps 284 is hence based of the particular position of the right arm 300 versus left arm 301 as so positioned. Since the FIG. 298 can rotate relative to the central axis 281, the twist direction of each strap 284 can be easily determined irrespective of the fact that the particular strap 284 is positioned above, below or offset to the side from the central axis 281.

FIG. 44 shows another mesh cell embodiment.

As shown, the mesh cell 280' is formed of a plurality of straps 303 formed into a X-pattern using a series of connections 299 to effect such orientation. Each strap 303 is untwisted and can be of a quasi-rectangular in cross section as shown in FIG. 45. Note that each such strap 303 in cross section includes long sides 304 and short sides 305. The short sides 305 form either the leading or trailing edges of the straps 303. In order have the capability of a hydrofoil, the exterior far long side 304a (exterior relative to the central axis 281 of the trawl) is preferably cambered relatively more than the near long side 304b. As a result, lift vector 307 is provided. In addition, the short sides 305 can be rounded at corners 305a. The ratio of width W to thickness T of the strap 303 is as set forth supra.

Figure 46:
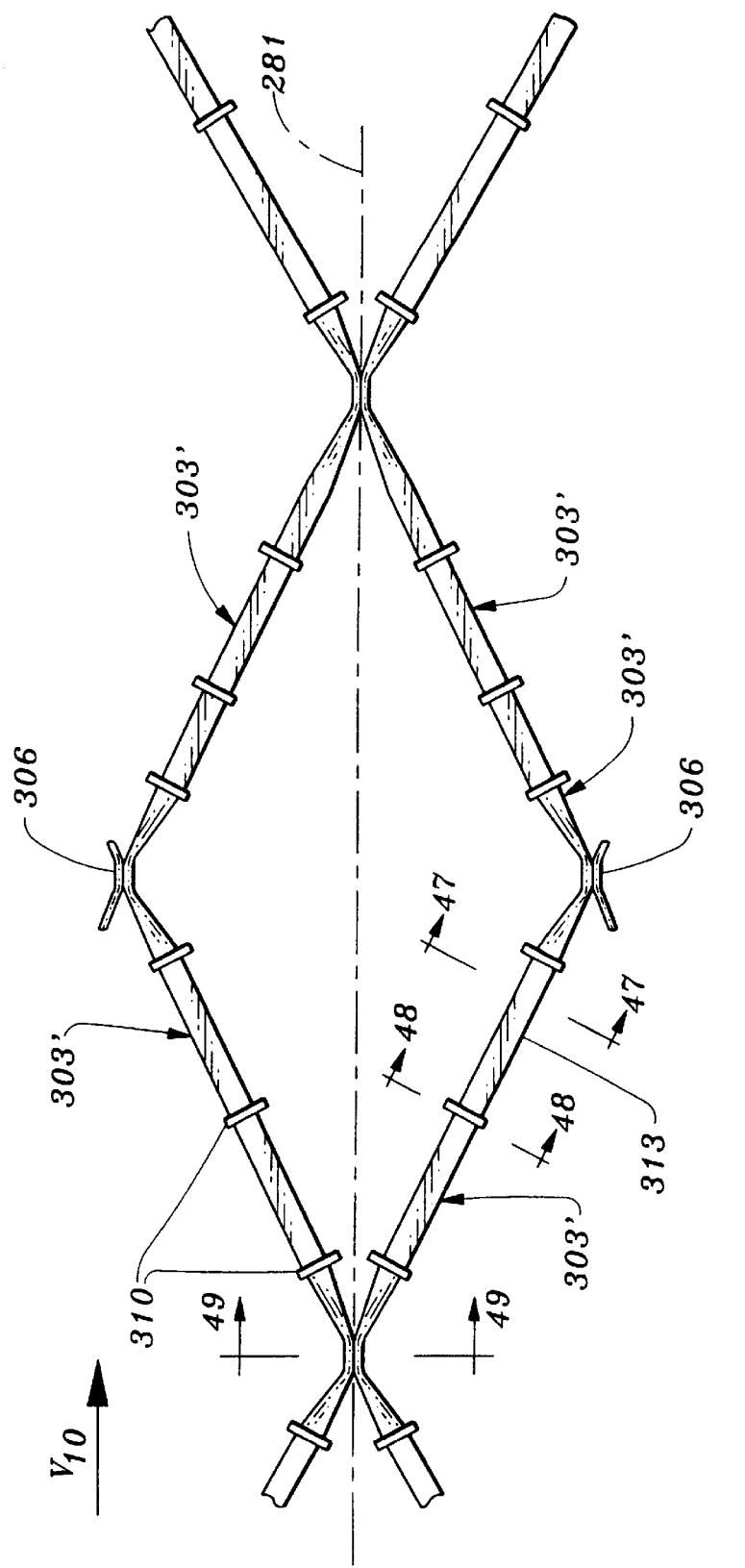
FIG. 46 is yet another fragmentary enlargement of another alternative mesh cell of the invention.
Figure 47:
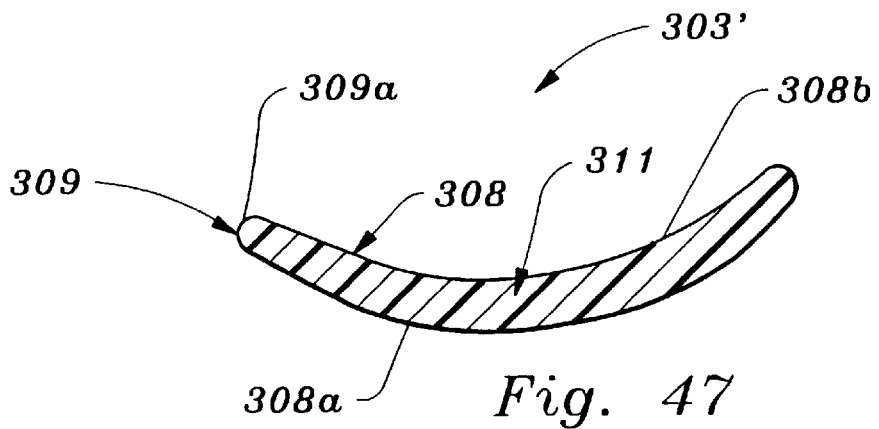
FIG. 47 is a section taken along the 47—47 of FIG. 46.

FIG. 46 shows an alternate strap design. As shown, the straps 303' are untwisted and have a X-pattern layout as previously described wherein the particularly straps 303' form the four mesh sides and use a series of connections 306 to maintain such orientation. Each strap 303' is of a quasi-rectangular in cross section as shown in FIG. 47. Note that each such strap 303' includes long sides 308 and short sides 309. The short sides 309 form either the leading or trailing edges of the straps 303'. In order have the capability of a hydrofoil, the exterior far long side 308a (exterior relative to the central axis 281 of the trawl) is preferably cambered relative to uncambered near long side 308b, via placement of a series of shape-altering support sleeves 310 therealong, see FIG. 46. As a result, lift vector 311 of FIG. 47 is provided. In addition, the short sides 309 can be rounded at corners 309a. The ratio of width W to thickness T of the strap 293' is preferably as previously stated, greater that 1.1:1 and preferably in a range of 2:1 to 10:1 but can be as large as 1.1:1 to 50:1.

Figure 48:
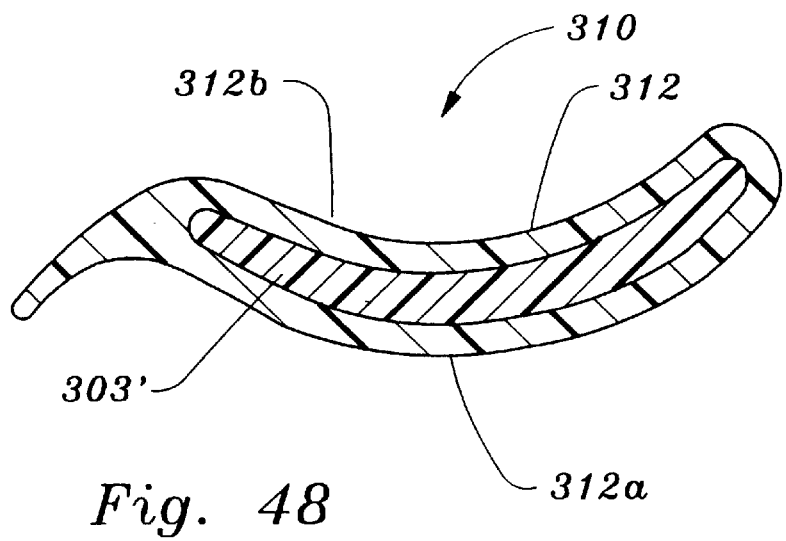
FIG. 48 is a section taken along line 48—48 of FIG. 46.

FIG. 48 shows the support sleeve 310 in more detail.

Each sleeve 310 is preferably of plastic (but metals can be substituted) and includes a cavity 312 having common cambered long side surfaces 312a and short side surfaces 312b built to accept each strap 303' even though the latter is of a rectangular cross section, and reform the cross section of the latter to match the cross sectional shape of the cavity 312. As a result, the lift vector 311 is provided in a direction away from the central axis of the trawl. Leading and trailing edges 313 thereof are as depicted.

Figure 49:
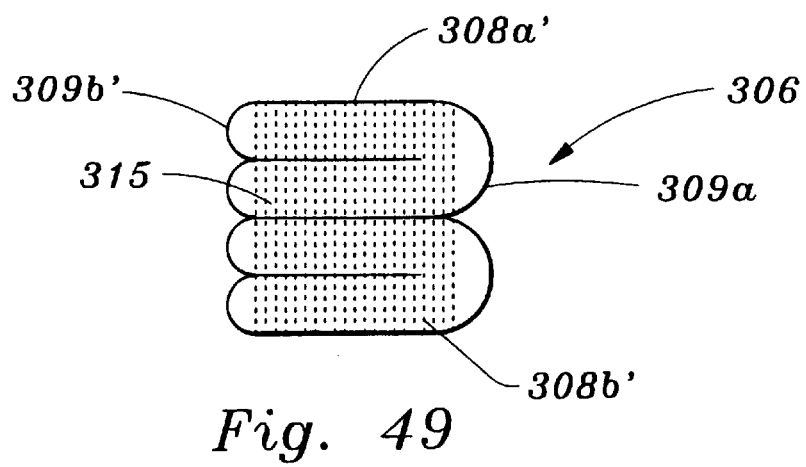
FIG. 49 is a section taken along line 49—49 of FIG. 46.

FIG. 49 shows one of the connections 306 in more detail.

As shown, the connection 306 has its long sides 308 of adjacent X-ed straps 303' are attached together after each of the long sides 308a', 308b' have been folded into two plies. A series of seams 315 provide for such attachment. The seams 315 are parallel to short sides 309a', 309b'.

Attributes are provided by the quasi-rectangular cross sectional straps 303, 303' that, in operations, relate primarily to reducing the noise and drag of the trawl system 264 of FIG. 39 whether such straps 303, 303' are used in FIG. 39 in the construction of the trawl 263, main tow lines 268, towing bridles 270 and/or frontropes 271 that include breastlines, footropes, headropes, minibridles, etc., as explained below. Suffice it to say, experiments have shown a rather large reduction in noise using the cell design of the present invention when compared to conventional cell designs.

Figure 50:
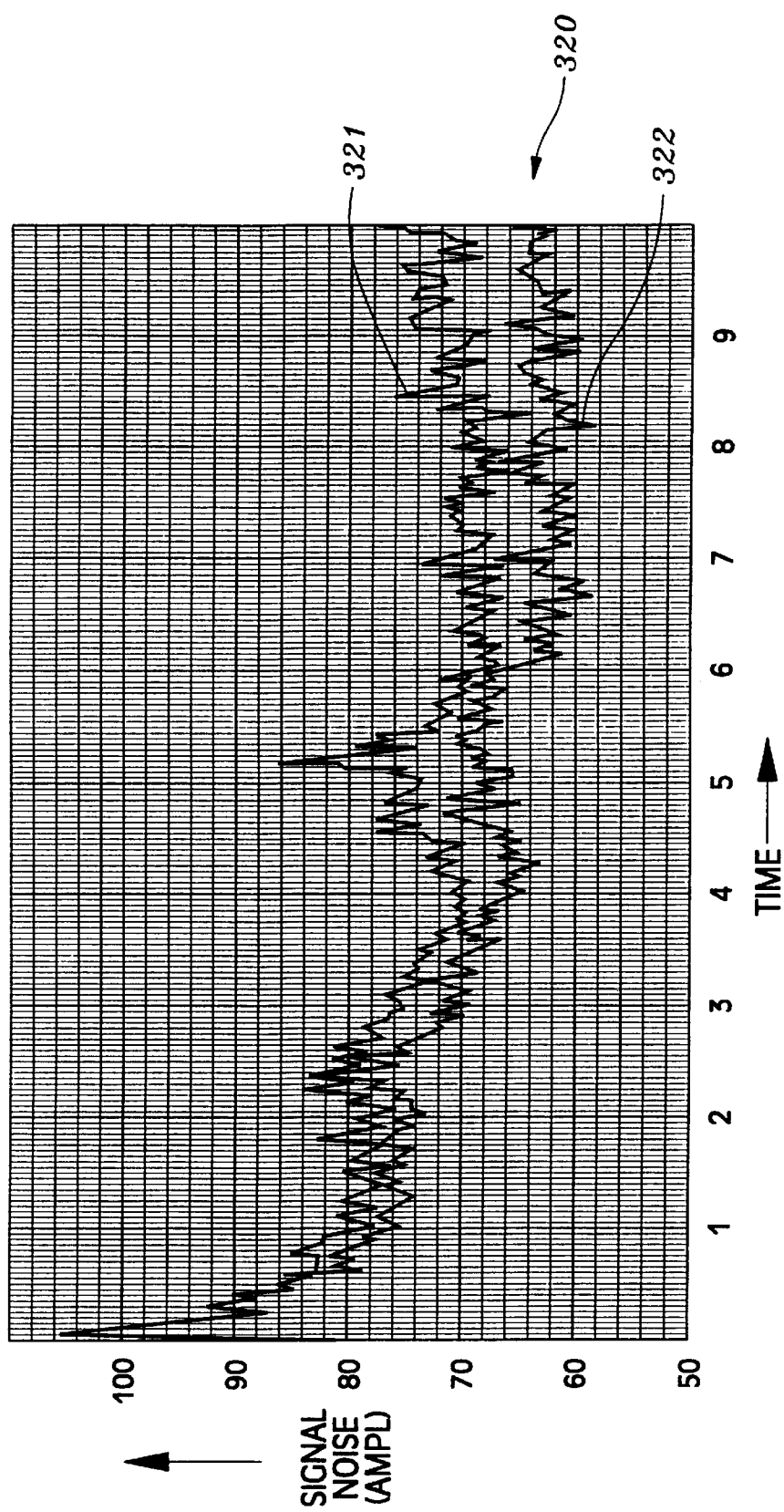
FIG. 50 is a graph of signal noise versus time of a twisted stranded mesh cell based on experimental evidence as compared with a conventional uni-twisted cell of the prior art.

With reference to FIG. 50, graph 320 shows the relationship between generated noise in dB versus time for two separate, independent cell bar designs—curve 321 for a conventional uni-twisted cell bars presently used in construction of the trawls and the like, and curve 322 associated with bi-directional twisted strands construction in accordance with the teachings of the invention. Note over the time interval 6–10, there is a 20 dB improvement in the cell construction in accordance with the invention.

FIG. 51 shows an alternate layout for the straps.

As shown, the straps 330 include clockwise lay segments 331 and counterclockwise segments 332 lain in an x-pattern so that midpoints 333 are coincident with and make intersection with each other at connections 334. Each segment 331 is positioned so that its end 331a (that aids in defining the resulting cell 334) is offset a distance D1 above axis of symmetry 335 while end 331b is offset a distance D1 below the axis of symmetry 335. The segments 332 are positioned (relative to the cell 334) so that an end 332a is offset a distance D1 below axis of symmetry 335 while end 332b is offset a distance D1 above the axis of symmetry 335. Thereafter additional pairs of segments (akin to the segments 331, 332) are similar constructed and positioned along the lines previously described, supra.

FIG. 52a and 52b show alternate details of a connection 334' in which the long sides 338a of adjacent X-ed straps 330 are attached together. A series of seams 339 provide for such attachment. The seams 339 are parallel to short sides 338b.

FIGS. 53, 54, 55 and 56 show the cell design of the invention used in the construction a tow line assembly 348.

Figure 53:
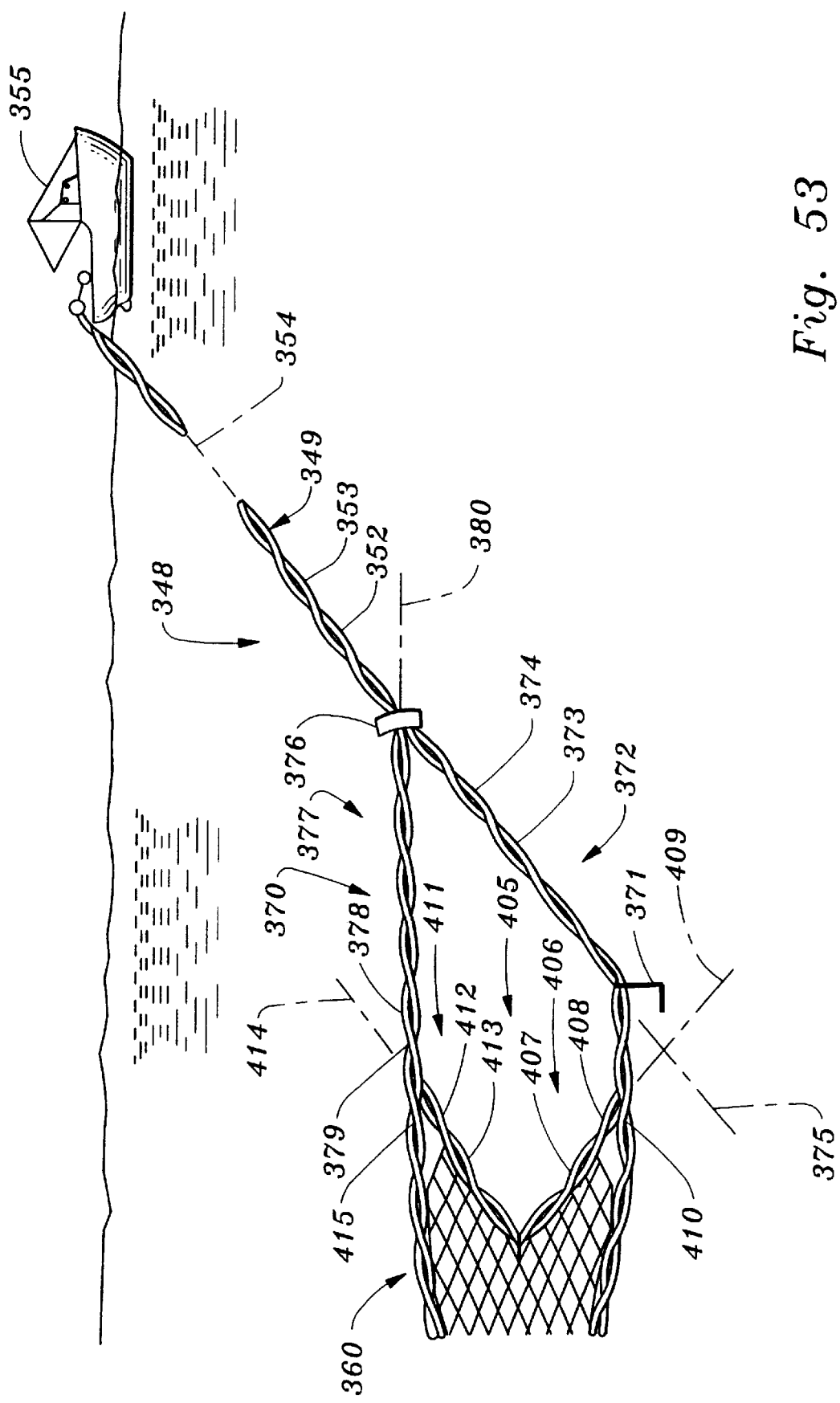
FIG. 53 is right side view of the trawl system of the invention showing one embodiment of the starboard tow line of the trawl system of the invention in towing contact with a starboard frontropes of the trawl.
Figure 54:
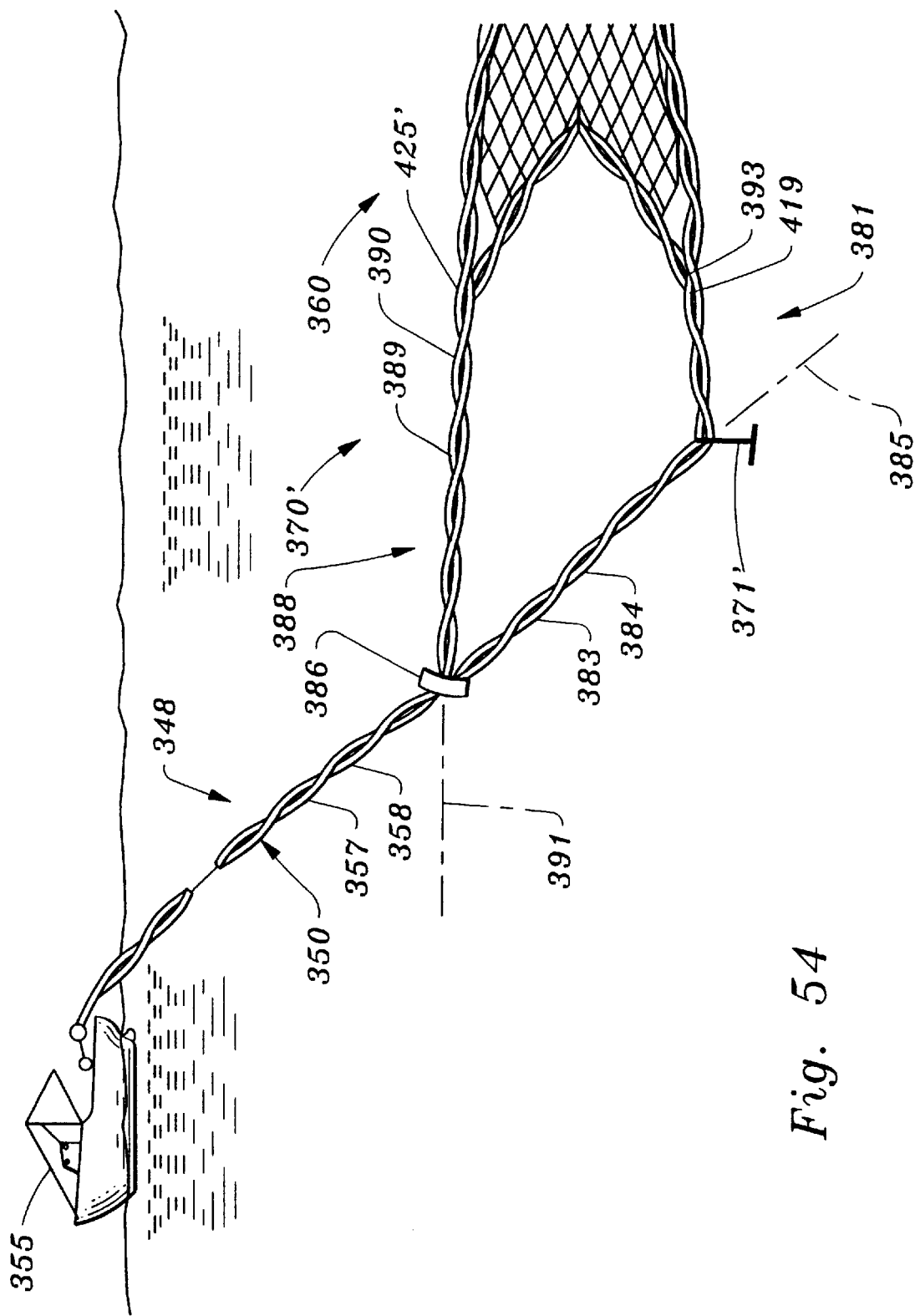
FIG. 54 is left side view of the trawl system of the invention showing the embodiment of FIG. 53 in which the port tow line of the trawl system of the invention in towing contact with port frontropes of the trawl, is depicted.

In detail, the FIG. 53 shows starboard tow line 349 and FIG. 54 shows a port tow line 350. Both are offset from central axis 351, see FIGS. 55 and 56 midway between them. In FIG. 53, note that the starboard tow line 349 comprises first and second product strands 352, 353 and is twisted about axis of symmetry 354 in a right-hand or clockwise direction normalized to vessel 355. In FIG. 54 the port tow line 350 is shown to included first and second product strands 357, 358 twisted about its axis of symmetry 359 in a left-hand or counterclockwise direction normalized to vessel 355.

Result of the action of FIGS. 53–56: force vectors are generated which spread the towlines 349, 350 relative to the central axis 351 midway between them and increase the volume of the trawl 360.

Figure 55:
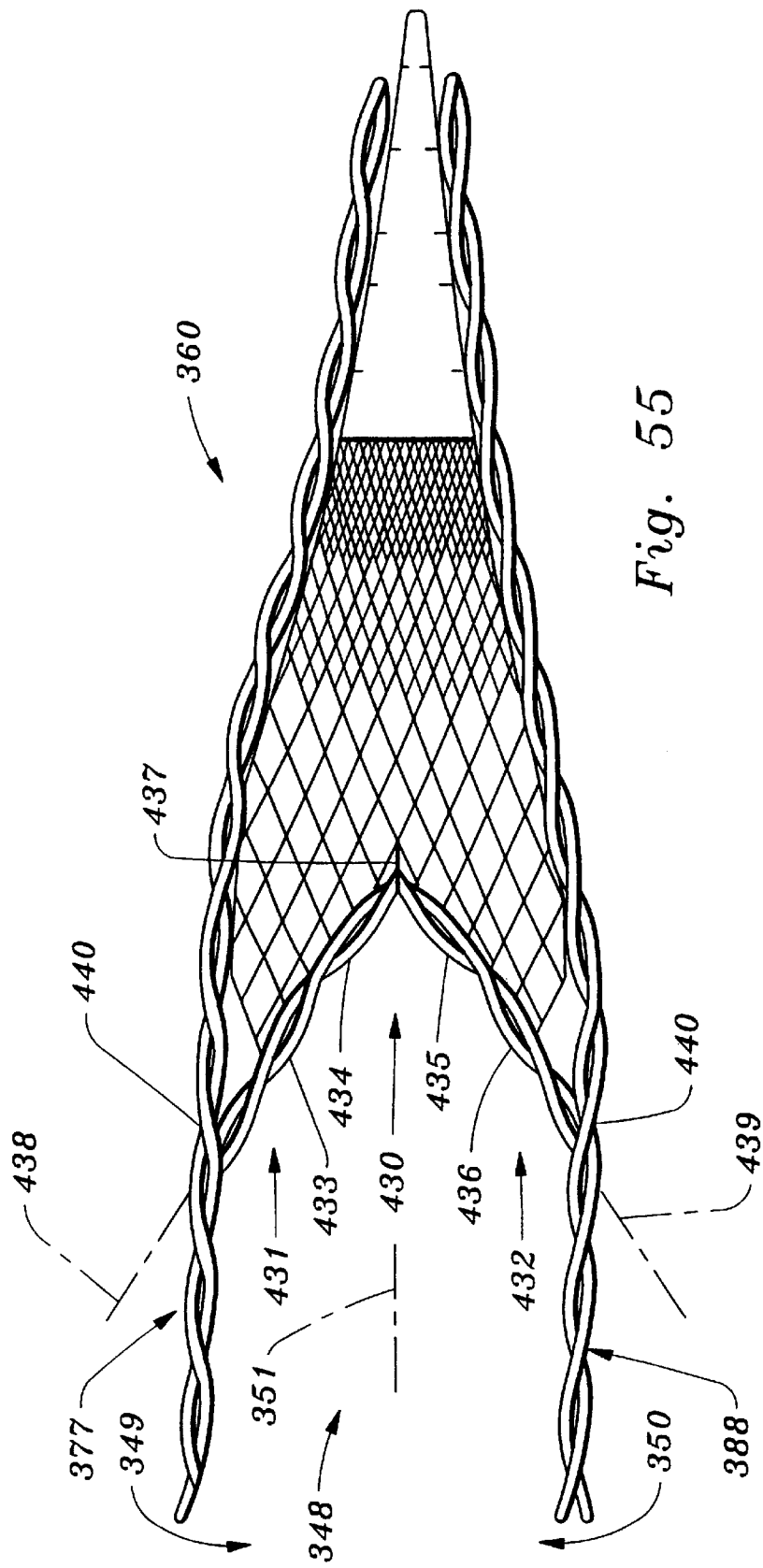
FIG. 55 is a fragmentary side view of the embodiment of FIGS. 53, 54.
Figure 56:
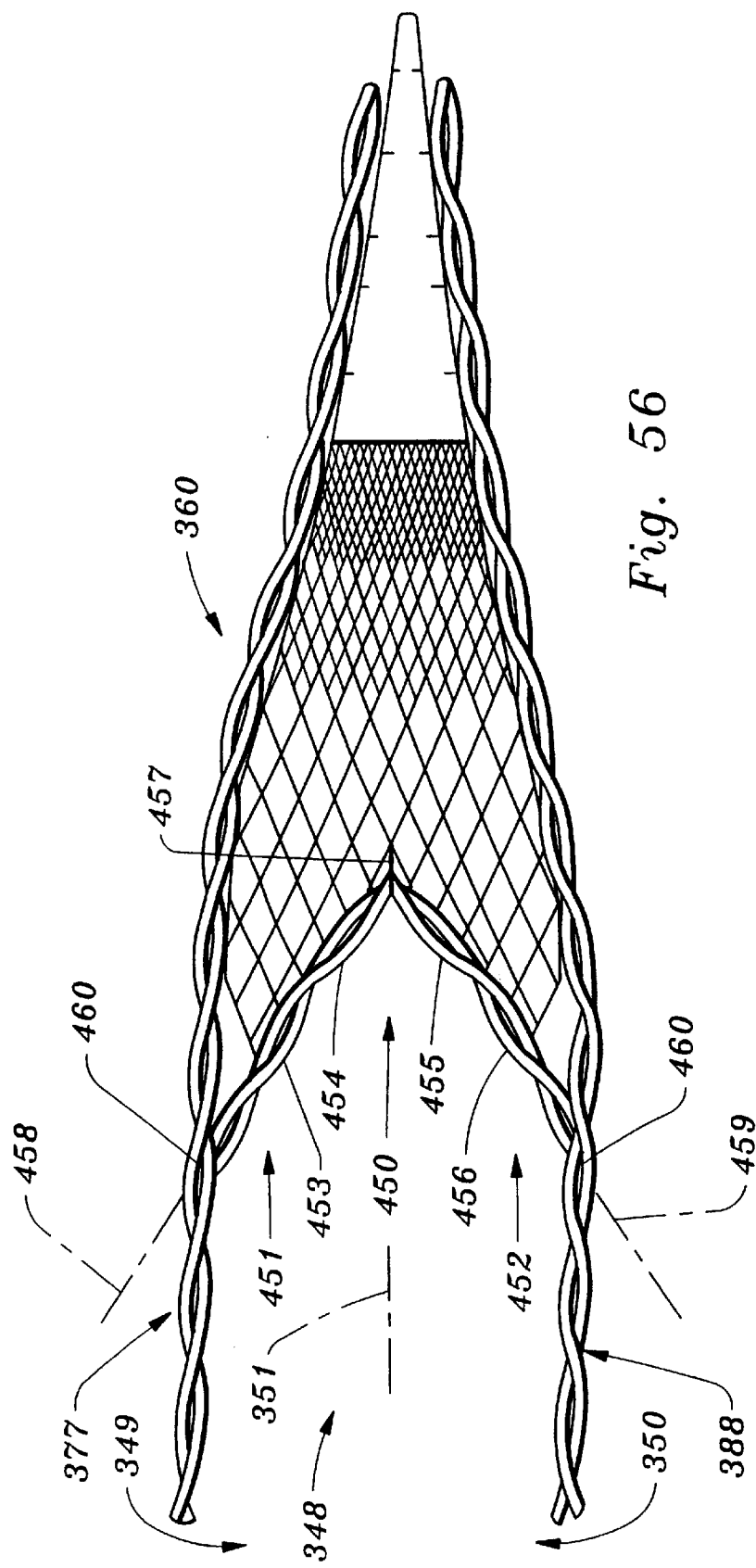
FIG. 56 is a fragmentary top view of the embodiment of FIGS. 53, 54.
Figure 57:
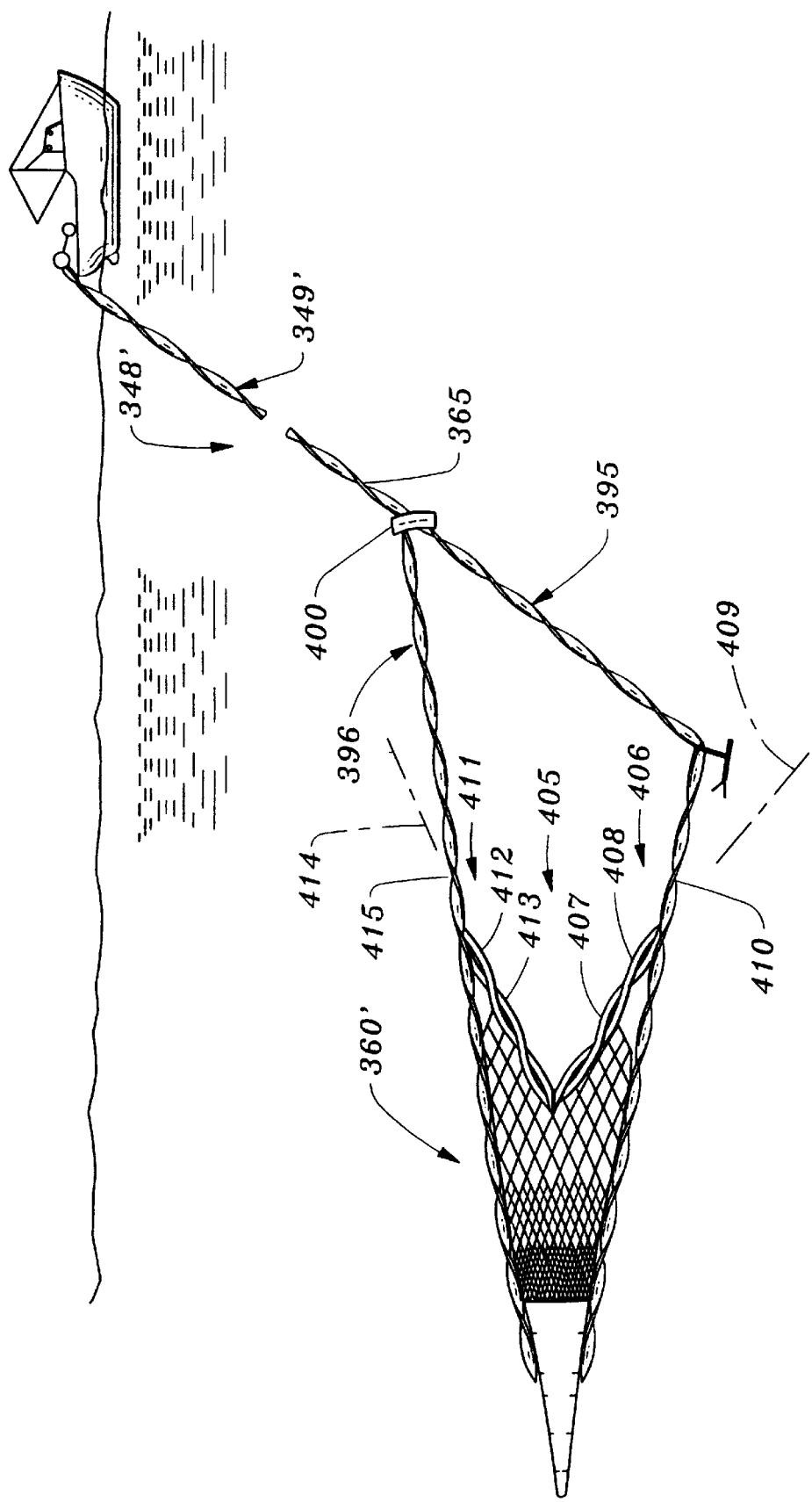
FIG. 57 is right side view of the trawl system of the invention showing another embodiment of the starboard tow line of the trawl system of the invention in towing contact with a starboard frontropes of the trawl.
Figure 58:
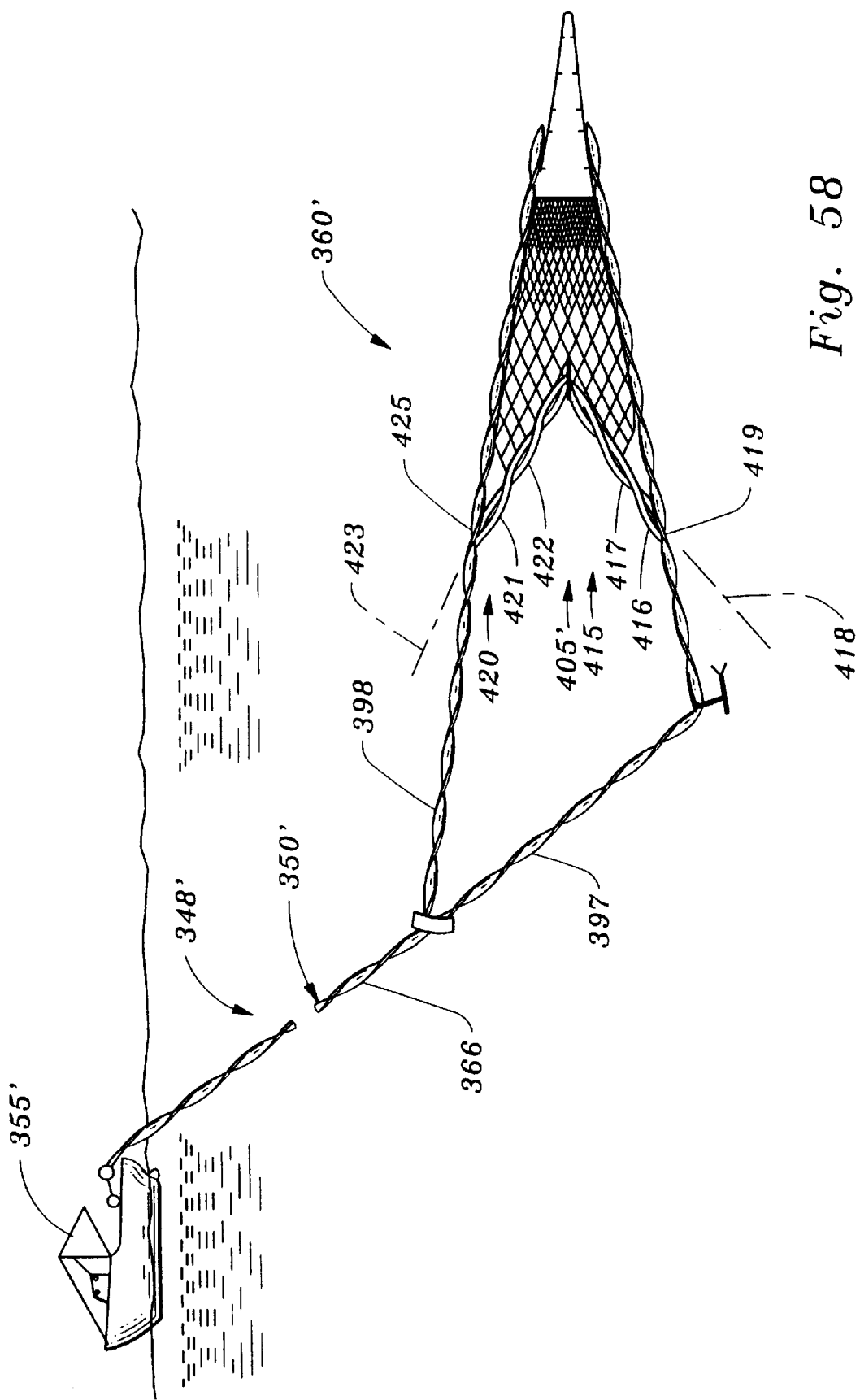
FIG. 58 is left side view of the trawl system of the invention showing the embodiment of FIG. 57 in which the port tow line of the trawl system of the invention in towing contact with port frontropes of the trawl, is depicted.

FIGS. 57, 58, 59 and 60 are similar depictions in regard to tow line assembly 348' to those shown in FIG. 53–56 except for the most part, twisted straps 365, 366 are substituted for the strand pairs 352, 353, and 357, 358, respectively used in the tow line assembly 348. In detail, the FIG. 57 shows starboard strap tow line 349' and FIG. 58 shows a port tow line 350'. Both are offset from an central axis 351' midway between them. Twist directions are also similar. In more detail, the starboard strap 365 related to the starboard tow line 349', is twisted in a right-handed or clockwise direction normalized to the vessel 355' and wherein strap 366 associated with the port tow line 350', is twisted in a left-handed or counterclockwise direction, as viewed.

Results of FIGS. 57–60: force vectors are generated which spread the towlines 349', 350' relative to the central axis 351' and increase the volume of the trawl 360'.

Still further, FIGS. 53–56 also illustrate the cell design of the invention, say when used in the constructing and using bridle assemblies generally indicated at 370, 370' offset from the central axis 351 of the trawl 360 which causes spreading of the trawl and an increase in volume.

FIG. 53 shows the starboard bridle assembly at 370. It includes a lower starboard bridle 372 composed of a pair of strands 373, 374 twisted about axis of symmetry 375 in a right-handed or clockwise direction offset from central axis 351. Connection with the starboard tow line 349 is at connector 376. A weight 371 along the bridle 372 positions the same correctly. On the other hand, upper starboard bridle 377 comprises a pair of strands 378, 379, twisted about axis of symmetry 380 in a left-handed or counterclockwise direction and also connects to the starboard tow line 349 at the connector 376.

In FIG. 54 showing the port bridle assembly 370', note that the same includes lower port bridle 381 composed of a pair of strands 383, 384 twisted about axis of symmetry 385 in a left-handed or counterclockwise direction. Connection with the port tow line 350 is at connector 386. A weight 371' along the bridle 381 correctly positions the same. On the other hand, upper port bridle 388 comprising a pair of strands 389, 390, is twisted about its axis of symmetry 391 in a right-handed or clockwise direction. It also connects to the port tow line 350 via the connector 386. Result: force vectors are generated at mouth 393 of the trawl 360 resulting in an increase in its volume relative of central axis 351.

With further regard to bridle construction, note that FIGS. 57 and 58 are similar depictions to those shown in FIG. 53 and 54 except that pairs of starboard and port straps, viz., starboard strap pair 395, 396 and port strap pair 397, 398, respectively are substituted for the stranded pairs of starboard and port bridles viz., for starboard strand pairs 373, 374 and 378, 379, and for port strand pairs 383, 384 and 389 and 390 also respectively. Twist directions remain the same. In more detail, the lower starboard strap 395 associated with the starboard towline 349' via connector 400, is twisted in a right-handed or clockwise direction normalized to the vessel 355' and wherein upper starboard strap 396 associated with the starboard tow line 349', is twisted in a left-handed or counterclockwise direction, as viewed. And in FIG. 58, the lower port strap 397 associated with the port tow line 350' via connector 401, is twisted in a left-handed or counterclockwise direction normalized to the vessel 355' and wherein upper port strap 398 also associated with the port tow line 350', is twisted in a right-handed or clockwise direction, as viewed.

Figure 59:
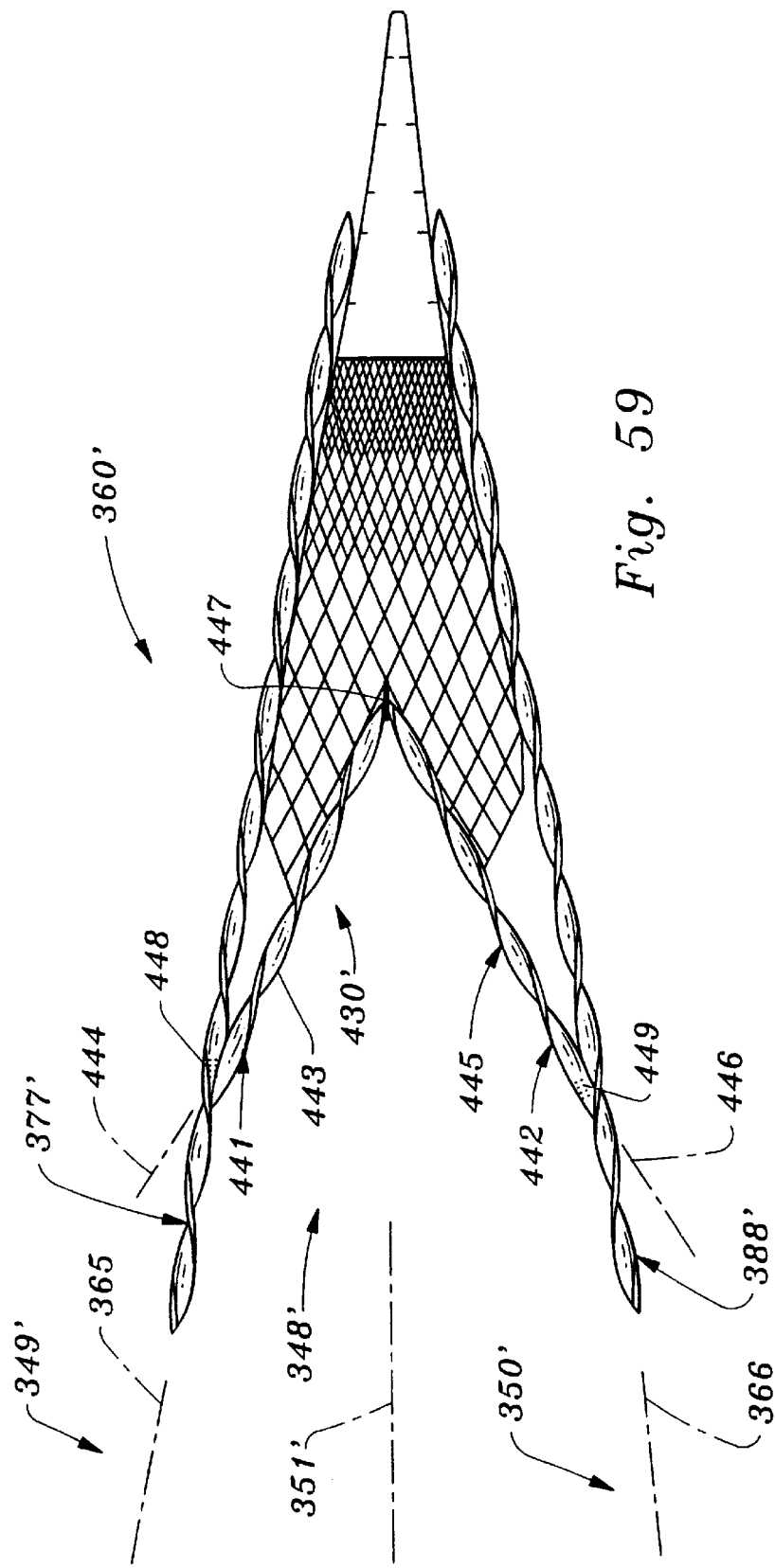
FIG. 59 is a fragmentary side view of the embodiment of FIGS. 57, 58.
Figure 60:
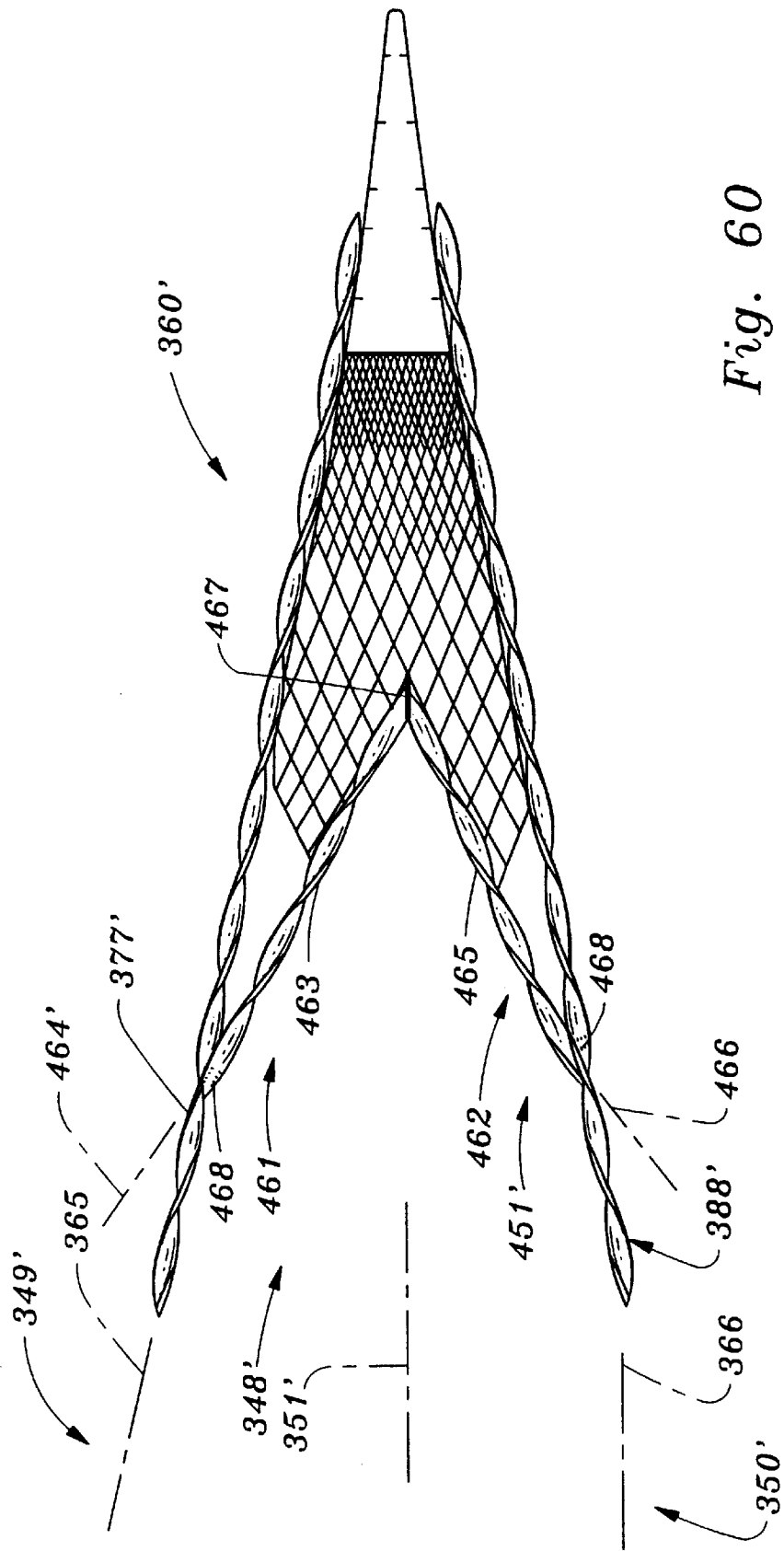
FIG. 60 is a fragmentary top view of the embodiment of FIGS. 57, 58.

Results of FIGS. 57 and 58 with regard to bridle construction: force vectors are generated which spread the trawl 360' and increase its volume relative to its central axis of symmetry 351' (FIGS. 59 and 60).

Still further, FIGS. 53, 54 and FIGS. 57, 58 also illustrate the cell design of the invention, say when used in the constructing and using a frontrope assembly such as breast line assemblies generally indicated at 405, 405' offset from the central axis 351, 351' of the trawl 360, 360', respectively (FIGS. 55, 56, 59, 60) which result in spreading of the trawl and an increase in volume.

FIGS. 53 and FIG. 57 show the starboard breast line assembly 405. It includes a lower starboard breast line 406 (FIGS. 53 and 57) composed of a pair of strands 407, 408 and twisted about axis of symmetry 409 in a left-handed or counterclockwise direction offset from the central axis 351, 351'. Connection with the lower starboard stranded bridle 372 (FIG. 53) or with the lower starboard strapped bridle 395 (FIG. 57) is at connection 410. On the other hand, upper starboard breast line 411 (FIGS. 53 and 57) comprises a pair of strands 412, 413, twisted about axis of symmetry 414 in a right-handed or clockwise direction and also connects to the upper stranded starboard bridle 377 (FIG. 53) or with the upper strapped starboard bridle 396 (FIG. 57) at the connection 415.

In FIG. 54 and FIG. 58 show the port breast line assembly 405' which has a similar construction as starboard breast line assembly 405, such port breast line assembly 405' being best shown in FIG. 58 and including a lower port breast line 415 composed of a pair of strands 416, 417 and twisted about axis of symmetry 418 in a right-handed or clockwise direction offset from the central axis 369, 351, 351'. Connection with lower strapped port bridle 397 (FIG. 58) is at connection 419 or with the lower stranded port bridle 381 (FIG. 54) at a similar connection 419. On the other hand, upper port breast line 420 comprises a pair of strands 421, 422, twisted about axis of symmetry 423 in a left-handed or counterclockwise direction and also connects to the upper strapped port bridle 398 (FIG. 5 8) at the connector 425 or with the upper stranded port bridle 388 (FIG. 54) at a similar positioned connection 425.

Results of FIGS. 53, 54 and FIGS. 57, 58 with regard to breast line construction: force vectors are generated which spread the trawl 360, 360' and increase its volume relative to its central axis of symmetry 351, 351'.

Still further, FIGS. 55 and 59 also illustrate the cell design of the invention in another aspect, say when used in the constructing and using a frontrope assembly such as a headrope assemblies generally indicated at 430, 430' offset from the central axis 351, 351' which result in spreading of the trawl and an increase in volume.

FIG. 55 shows headrope assembly 430 in more detail. It includes a starboard headrope subassembly 431 and a port headrope subassembly 432 each composed of a pair of strands: subassembly 431 including strands 433, 434 and subassembly 432 comprising strands 435, 436. The subassemblies 431, 432 meet at connection 437 in a vertical plane through the central axis 351. In detail, the strands 433, 434 are twisted about axis of symmetry 438 in a left-handed or counterclockwise direction. On the other hand, the strands 435, 436 are twisted about axis of symmetry 439 in a right-handed or clockwise direction. Connection of the subassemblies 431, 432 with the upper starboard bridle 377 and upper port bridle 388 is at connector 440 or equivalent.

FIG. 59 shows headrope assembly 430' which includes a starboard subassembly 441 and a port headrope subassembly 442. The former is composed of a single strap 443 twisted about axis of symmetry 444 in a left-handed or counterclockwise direction, while the port headrope subassembly 442 comprises a single strap 445 twisted about axis of symmetry 446 in a right-handed or clockwise direction. Connection of the strap 443 with strap 445 is at connection 447 in a vertical plane through the central axis 351'. But the strap 443 connects with the upper starboard strapped bridle 377' at connection point 448, while the strap 445 connects with the upper port strapped bridle 388' at connector 449 or equivalent.

Results of FIGS. 55 and 59 with regard to footrope construction: force vectors are generated which spread the trawl 360, 360' and increase its volume relative to its central axis of symmetry 351, 351', respectively.

Still further, FIGS. 56 and 60 also illustrate the cell design of the invention in another aspect, say when used in the constructing and using a frontrope assembly such as footrope assemblies generally indicated at 450, 450' offset from the central axis 351, 351' which result in spreading of the trawl and an increase in volume.

FIG. 56 shows footrope assembly 450 in more detail. It includes a starboard footrope subassembly 451 and a port footrope subassembly 452 each composed of a pair of strands: subassembly 451 including strands 453, 454 and subassembly 452 comprising strands 455, 456. The subassemblies 451, 452 meet at connection 457 in a vertical plane through the central axis 351. In detail, the strands 453, 454 are twisted about axis of symmetry 458 in a right-handed or clockwise direction. On the other hand, the strands 455, 456 are twisted about axis of symmetry 459 in a left-handed or counterclockwise direction. Connection of the subassemblies 451, 452 with the upper starboard bridle 377 and upper port bridle 388 is at connector 460 or equivalent.

FIG. 60 shows headrope assembly 450' which includes a starboard subassembly 461 and a port headrope subassembly 462. The former is composed of a single strap 463 twisted about axis of symmetry 464 in a right-handed or clockwise direction, while the port headrope subassembly 462 comprises a single strap 465 twisted about axis of symmetry 466 in a left-handed or counterclockwise direction. Connection of the strap 463 with strap 465 is at connection 467 in a vertical plane through the central axis 351'. But the strap 463 connects with the upper starboard strapped bridle at connection point 468, while the strap 465 connects with the upper port strapped bridle 388' at like connector 468 or equivalent.

Results of FIGS. 56 and 60 with regard to footrope construction: force vectors are generated which spread the trawl 360, 360' and increase its volume relative to its central axis of symmetry.

FINAL OPERATION ASPECTS

In order to use the cell constructed in accordance with the invention, note that use in the field is particularized as to where the cell is used within the trawl system of the invention, viz., with a towline, a trawl, or frontrope in the shape of a breastlines, bridles, headrope or footrope.

That is, the method of field use includes the steps of:

(i) from a vessel positioned at the surface of a body of water, deploying first and second cell bars of a trawl system below the surface of the body of water wherein a central axis offset from the first and second cell bar means is established and the first and second cell bar means have at least one interconnecting connection therebetween, (ii) establishing positional and directional integrity between the shaped hydrofoil means associated with the first and second cell bars relative to the central axis, and (ii) propelling the shaped hydrofoil means of the first and second cell bars whereby leading and trailing edges are established therefor along with separate pressure differentials that provide lift vectors relative to the central axis to increase cell performance wherein said leading edge for the first cell bar when normalized to a receding direction relative to the central axis, always resides at a right side of the first cell bar as viewed in the receding direction and wherein the leading edge of the second cell bar when normalized to the same receding direction, reside along a left side thereof as viewed.

Then with particular usage in association with a tow line, the steps (i)–(iii) are modified as follows: Step (i) is further characterized by the first and second cell bars being associated with a tow line selected from one of a port and starboard tow line and the at least one interconnecting connection therebetween is established at the vessel itself, Step (ii) includes positioning first and second strands comprising the hydrofoil means of the first cell bar so that at least one strand thereof is positioned along a first axis of symmetry offset from the central axis wherein at least one of which is of a left-hand, loosely wound lay relative to a receding direction established relative to the central axis and positioning third and fourth strands comprising the said shaped hydrofoil means of said second cell bar along a second axis of symmetry so that at least one of which is of a right-hand, loosely wound lay relative to the receding direction and the central axis; and step (iii) includes the substep of increasing spread between the port and starboard tow lines relative to the central axis to gain increased cell performance. Instead of strands, straps can be substituted as previously discussed.

Further, with particular usage in association with a trawl, the steps (i)–(iii) are modified as follows: Step (i) is further characterized by the central axis being longitudinally symmetrical of the trawl and the at least one interconnecting connection being established below the surface of the body of water; step (ii) includes positioning first and second strands comprising the hydrofoil means of the first cell bar so that at least one strand thereof is positioned along a first axis of symmetry offset from the central axis wherein at least one of which is of a left-hand, loosely wound lay relative to a receding direction established relative to the central axis, as well as positioning third and fourth strands comprising the shaped hydrofoil means of said second cell bar along a second axis of symmetry so that at least one of which is of a right-hand, loosely wound lay relative to the receding direction and the central axis; and in which step (iii) includes the substep of increasing volume of the trawl relative the central axis by the creation of the lift vectors to gain increased cell performance. Instead of strands, straps can be substituted as previously discussed.

Still further, with particular usage in association with a frontrope, the steps (i)–(iii) are modified as follows: Step (i) is further characterized by the central axis being longitudinally symmetrical of a trawl to which the frontrope attaches and the at least one interconnecting connection therebetween being established below the surface of the body of water; in which step (ii) includes positioning first and second strands comprising the hydrofoil means of the first cell bar so that at least one strand thereof is positioned along a first axis of symmetry offset from the central axis wherein at least one of which is of a left-hand, loosely wound lay relative to a receding direction established relative to the central axis, as well as positioning third and fourth strands comprising the shaped hydrofoil means of said second cell bar along a second axis of symmetry so that at least one of which is of a right-hand, loosely wound lay relative to the receding direction and the central axis; and in which step (iii) includes the substep of increasing volume of the trawl relative the central axis by the creation of the lift vectors due to the frontrope to gain increased cell performance. Instead of strands, straps can be substituted as previously discussed.

Yet still further, with particular usage in association with one of a pair of port and starboard bridles, the steps (i)–(iii) are modified as follows: Step (i) is further characterized by the central axis being longitudinally symmetrical of a trawl to which the bridles attach and the at least one interconnecting connection therebetween being established below the surface of the body of water; in which step (ii) includes positioning first and second strands comprising the hydrofoil means of the first cell bar so that at least one strand thereof is positioned along a first axis of symmetry offset from the central axis wherein at least one of which is of a left-hand, loosely wound lay relative to a receding direction established relative to the central axis, as well as positioning third and fourth strands comprising the shaped hydrofoil means of the second cell bar along a second axis of symmetry so that at least one of which is of a right-hand, loosely wound lay relative to the receding direction and the central axis; and in which step (iii) includes the substep of increasing volume of the trawl relative the central axis by the creation of the lift vectors due to the selected pair of bridles to gain increased cell performance. Instead of strands, straps can be substituted as previously discussed.

Still further, with particular usage in association with a headrope, the steps (i)–(iii) are modified as follows: Step (i) is further characterized by the central axis being longitudinally symmetrical of a trawl to which the headrope attaches and the at least one interconnecting connection therebetween being established below the surface of the body of water; in which step (ii) includes positioning first and second strands comprising the hydrofoil means of the first cell bar means so that at least one strand thereof is positioned along a first axis of symmetry offset from the central axis wherein at least one of which is of a left-hand, loosely wound lay relative to a receding direction established relative to the central axis, as well as positioning third and fourth strands comprising the shaped hydrofoil means of said second cell bar means along a second axis of symmetry so that at least one of which is of a right-hand, loosely wound lay relative to the receding direction and the central axis; and in which step (iii) includes the substep of increasing volume of the trawl relative the central axis by the creation of the lift vectors due to the headrope to gain increased cell performance. Instead of strands, straps can be substituted as previously discussed.

Yet still further, with particular usage in association with a footrope, the steps (i)–(iii) are modified as follows: Step (i) is further characterized by the central axis being longitudinally symmetrical of a trawl to which the footrope attaches and the at least one interconnecting connection therebetween being established below the surface of the body of water; in which step (ii) includes positioning first and second strands comprising the hydrofoil means of the first cell bar means so that at least one strand thereof is positioned along a first axis of symmetry offset from the central axis wherein at least one of which is of a left-hand, loosely wound lay relative to a receding direction established relative to the central axis, as well as positioning third and fourth strands comprising the shaped hydrofoil means of said second cell bar means along a second axis of symmetry so that at least one of which is of a right-hand, loosely wound lay relative to the receding direction and the central axis, and in which step (iii) includes the substep of increasing volume of the trawl relative the central axis by the creation of the lift vectors due to the footrope to gain increased cell performance. Instead of strands, straps can be substituted as previously discussed.

From the foregoing, it will be appreciated that one skilled in the art can make various modifications and changes to the embodiments and methods within the spirit and scope of the claimed invention as set forth below. For example, in retrofitting trawls with the mesh cell of the invention, it should be appreciated that the tensile strength of the mesh cell construction of the invention, should be at least equal in strength to that of the cells undergoing replacement. That means that if the mesh cell of the invention is a composed of two product strands each manufactured in accordance with conventional manufacturing processes having a tensile strength S, the 2×S must be at least equal to the tensile strength of the single strand that is being replaced. In addition, the lengths of bridles and minibridles used to tow upon the upper mouth edge and lower mouth edge of the trawl, should be lengthened in order to maintain the proper angle of attack of the trawl during operations, i.e., as there is an incremental change in volume of the trawl, the bridles and minibridles must be increased to maintain the proper angle of attack.

Yet further, referring to FIG. 1, it is seen that intermediate portion 28 of trawl 13 is made up of smaller size mesh which may continue to decrease in size toward the aft of the trawl 13. Result: high drag components. It has been discovered that drag can be significantly reduced using mesh cells comprising rather loosely (not tightly) wound strands in a common direction. The pitch of the turns in the aforementioned range 3 d to 70 d but preferably are within a pitch range that results in a series of cambered sections parallel (or closely parallel) to the axis of symmetry of the trawl 13 being formed. Result: vibration and drag are substantially reduced. Experiments show a reduction in drag in a range of 30 to 50%. Further advantages: such mesh cells can be constructed by conventional mesh making machines.

Additionally, to manufacture the cells, a process similar to one associated with processing two-stand netting, can be used, with modification as indicated below. E.g., a hook for handling the pair of strands for knotting, is modified to after pick up, but before knotting, the paired strands can be spun a certain number of revolutions to provide the desired pitch of the mesh bar. The direction of rotation is controlled so that the direction of twist normalized to the hook, is opposite. There is also an equal distance along the mesh bars measured from the knot. Hence the pitch of each mesh bar will be essentially equal and the direction of twist is opposite.

Further, machine produced mesh cells can be modified to produce seines that have the following field capabilities. The mesh cells of the invention are reproduced in full or intermediate sections or areas throughout the seine. Such a construction in whole or in part, permits the creation of composite forces say, during pursing of the seine, causes diametrically opposite sections of the seine to dive, lift and/or otherwise expand relative to remaining sections or areas. Result: the volume of the seine is surprisingly increased during such pursing operations in the field, and the occurrence of excess billowing of the seine during such operations, is significantly reduced.

The pitch of the bridle lines and the forward sections of the frontropes may be longer than the pitch of the middle sections of the frontropes and those cells making up meshes aft of the forward sections of the frontropes.

What is claimed is:

1. A trawl-system component selected from a group consisting of a trawl, upper bridles and frontropes adapted for use in a trawl system for bettering a performance characteristic of the trawl system, the trawl-system component comprising:
    a plurality of mesh cells, each mesh cell including a plurality of cell bars, at least portions of said cell bars exhibiting a hydrofoil-like effect during operation of the trawl system in a water environment that aids in bettering a performance characteristic of the trawl system, the cell bars having grooves arranged in a left-hand lay or a right-hand lay;
    that portion of the cell bars that exhibit the hydrofoil-like effect being oriented to establish leading and trailing edges, the leading edge of that portion of cell bars that exhibit the hydrofoil-like effect, when viewed in a receding direction:
        being on the right side of said cell bar when the cell bar grooves have a left-hand lay; and
        being on the left side of said cell bar when the cell bar grooves have a right-hand lay; and
    the movement of the cell bar through the water environment relative to a water flow vector creating a pressure differential across that portion of said cell bar that produces the hydrofoil-like effect thereby establishing a lift vector, the cell bars being oriented neither parallel nor perpendicular to the water flow vector.

2. The trawl-system component of claim 1 wherein said component is a trawl that includes a plurality of mesh cells, said mesh cells including a plurality of cell bars at least portions of which exhibit the hydrofoil-like effect during operation of the trawl in the water environment for generating hydrodynamic lift that is mainly directed outwardly from an axis of the trawl.

3. The trawl-system component of claim 2 wherein mesh cells forming particular portions of the trawl have differing sizes.

4. The trawl of claim 2 wherein portions of cell bars that exhibit the hydrofoil-like effect are formed by at least two product strands.

5. The trawl of claim 4 wherein at least one of the product strands is selected from a group consisting of braided product strands and twisted strands.

6. The trawl of claim 4 wherein product strands forming cell bars have differing diameters and twist about an axis of symmetry.

7. The trawl of claim 4 wherein portions of cell bars exhibiting the hydrofoil-like effect have minimum residual torque.

8. The trawl of claim 4 wherein portions of cell bars exhibiting the hydrofoil-like effect are formed by individual segments of product strands.

9. The trawl of claim 4 wherein portions of cell bars exhibiting the hydrofoil-like effect are formed by three (3) equal diameter product strands.

10. The trawl of claim 2 wherein the portion of the cell bars that exhibit the hydrofoil-like effect are formed by straps.

11. The trawl of claim 10 wherein the straps have a corkscrew shape having a pitch, the pitch having a pitch range selected from a group consisting of 3 d to 70 d where d is the mean width of the straps and a pitch range of 5 d to 40 d where d is the mean width of the straps.

12. The trawl of claim 10 wherein the straps have an aspect ratio of width W to thickness T that is between 2:1 and 10:1.

13. The trawl of claim 10 wherein the straps have a solid cross-section.

14. The trawl of claim 10 wherein the straps are formed from a woven material.

15. The trawl of claim 2 wherein the trawl includes:
    (a) a top panel including mesh cells for which lift vectors resulting from movement of cell bars of the top panel through the water entrained environment have:
        (i) a magnitude;
        (ii) a component directed outwardly away from the axis of the trawl; and
    (b) a bottom panel including mesh cells which exhibit lift vectors due to movement of cell bars of the bottom panel through the water entrained environment having a magnitude less than the magnitude of the lift vectors of the top panel.

16. The trawl of claim 3 wherein portions of cell bars exhibiting the hydrofoil-like effect have minimum residual torque.

17. The trawl of claim 2 wherein that portion of the grooved cell bars that exhibit the hydrofoil-like effect are formed with a corkscrew-shaped pitch that makes at least two (2) revolutions.

18. The trawl of claim 17 wherein portions of cell bars which exhibit the hydrofoil-like effect are formed by at least two product strands.

19. The trawl of claim 18 wherein the product strands have an internal lay, the product strands twisting with respect to each other in a direction identical to that of the internal lay of the product strands.

20. The trawl of claim 18 wherein the mesh cells forming the trawl have differing sizes.

21. The trawl of claim 18 wherein at least one of the product strands is selected from a group consisting of braided product strand and twisted product strand.

22. The trawl of claim 18 wherein product strands forming cell bars that are located in differing portions of the trawl have unequal diameters.

23. The trawl of claim 17 wherein portions of cell bars exhibiting the hydrofoil-like effect have minimum residual torque.

24. The trawl of claim 17 wherein cell bars of mesh cells are formed by segments.

25. The trawl of claim 17 wherein those portions of cell bars which exhibit the hydrofoil-like effect are formed by at least three (3) product strands one of which product strands has a diameter that differs from a diameter of another of the product strands.

26. The trawl of claim 17 wherein portions of cell bars which exhibit the hydrofoil-like effect includes at least a pair of product strands arranged to establish openings to the water entrained environment between immediately adjacent but noncontacting portions of the product strands.

27. The trawl of claim 17 wherein portions of cell bars which exhibit the hydrofoil-like effect are formed by straps.

28. The trawl of claim 27 wherein the corkscrew-shaped pitch for straps forming portions of cell bars that exhibit the hydrofoil-like effect has a pitch range of 3 d to 70 d where d is a mean width of the straps, or a pitch range of 5 d to 40 d where d is a mean width of the straps.

29. The trawl of claim 27 wherein straps forming portions of cell bars that exhibit the hydrofoil-like effect have an aspect ratio of width W to thickness T for the straps that is between 2:1 to 10:1.

30. The trawl of claim 27 wherein straps have a solid cross-section.

31. The trawl-system component of claim 1 wherein the selected trawl-system component is the trawl, the trawl including a plurality of panels, each panel respectively including a plurality of mesh cells, the mesh cells of at least two panels having lift vectors resulting from movement of the cell bars through the water environment, the lift vector for the mesh cells of each panel having a magnitude and a component directed outwardly away from the axis of the trawl.

32. The trawl of claim 31 wherein straps have a hydrofoil-shaped cross-section.

33. The trawl of claim 2 wherein the trawl includes a top panel and a bottom panel in which are respectively located cell bars that produce outwardly directed hydrodynamic lift.

34. The trawl of claim 2 wherein cell bars which exhibit hydrodynamic lift:
   (a) are formed by at least two product strands; and
   (b) pairs of product strands included in hydrodynamic lift producing cell bars that are located in differing portions of the trawl have different diameters.

35. The trawl of claim 2 wherein the trawl includes a plurality of panels each panel respectively including a plurality of mesh cells, the mesh cells of at least two panels having lift vectors resulting from movement of cell bars through the water entrained environment, the lift vector for the mesh cells of each panel having a magnitude and a component directed outwardly away from the axis of the trawl.

36. The trawl of claim 2:
   (a) wherein mesh cells of wings of a trawl include cell bars that exhibit the hydrofoil-like effect;
   (b) wherein a lift vector for each wing having mainly cell bars that exhibit the hydrofoil-like effect has a magnitude and a component directed outwardly away from the axis of the trawl; and
   (c) wherein the wings form a portion of the trawl that is greater than a portion of a trawl forming the mid-portion jacket whereby the trawl is a mid-water trawl.

37. The trawl of claim 36 wherein residual torque has been substantially relieved from turns in portions of cell bars that exhibit the hydrofoil-like effect and that are made from product strands.

38. The trawl of claim 36 further comprising doors that are respectively disposed between a main towing line and towing bridles whereby during normal field operations when the trawl is disposed in the water environment said doors are predominantly disposed above the axis of the trawl.

39. The trawl of claim 2:
   (a) wherein mesh cells of wings of the trawl include cell bars that exhibit the hydrofoil-like effect; and
   (b) wherein a lift vector for each wing having cell bars that exhibit the hydrofoil-like effect has a magnitude and a component directed outwardly away from the axis of the trawl.

40. The trawl of claim 39 wherein residual torque has been substantially relieved from turns in portions of cell bars that exhibit the hydrofoil-like effect and that are made from product strands.

41. The trawl of claim 2:
   (a) wherein a mid-portion jacket of the trawl forms a portion of the trawl that is located between wings of the trawl and an intermediate portion jacket of the trawl;
   (b) wherein mesh cells of the mid-portion jacket include cell bars that exhibit the hydrofoil-like effect; and
   (c) wherein lift vectors for mesh cells of the mid-portion jacket that have cell bars which exhibit the hydrofoil-like effect mainly have a magnitude and a component directed outwardly away from the axis of the trawl.

42. The trawl-system component of claim 1 wherein the selected trawl-system component is the trawl, the trawl including a plurality of mesh cells, each mesh cell including a plurality of cell bars, at least one of said cell bars exhibiting reduced drag during operations of the trawl in the water environment, the reduced drag bettering a performance characteristic of the trawl system, the portion of the cell bar that exhibits reduced drag being formed by at least two product strands.

43. The trawl-system component of claim 1 wherein the selected trawl-system component is the trawl, the trawl including a plurality of mesh cells, each mesh cell including a plurality of cell bars, those cell bars that exhibit hydrodynamic lift having minimum residual torque.

44. The trawl-system component of claim 1 wherein the selected trawl-system component is the trawl, the trawl including mesh cells having cell bars respectively formed with a plurality of cambered sections that are oriented and configured so that movement of the cell bars through the water environment relative to the water flow vector creates a pressure differential across the cambered sections thereby establishing a lift vector in a predetermined direction, the cambered sections being arranged so that lift vectors resulting from movement of the cell bars through the water environment are mainly directed away from an axis of the trawl, the trawl including mesh cells of differing sizes.

45. The trawl-system component of claim 1 wherein the selected trawl-system component is the trawl, the trawl including a plurality of mesh cells, each mesh cell including a plurality of cell bars,
   those cell bars that exhibit hydrodynamic lift having minimum residual torque, and
   at least one of said cell bars exhibiting reduced drag during operations of the trawl in the water environment, the reduced drag bettering a performance characteristic of the trawl system, the portion of the cell bar that exhibits reduced drag being formed by at least two product strands, the product strands having an internal lay and twisting with respect to each other in a direction identical to that of the internal lay of the product strands.

46. The trawl of claim 42 wherein the product strands include a pair of product strands that have a diameter ratio between 2:1 and 4:1.

47. The trawl of claim 43 wherein the product strands twist about an axis of symmetry.

48. The trawl of claim 43 wherein ends of cell bars are formed with mini loops that are joined together to establish mesh cells of the trawl.

49. The trawl of claim 42 wherein portions of cell bars exhibiting reduced drag are formed by individual segments of product strands.

50. The trawl-system component of claim 1 wherein the selected trawl-system component is the trawl, the trawl including a plurality of mesh cells, each mesh cell including a plurality of cell bars, at least one of said cell bars exhibiting reduced drag during operations of the trawl in the water environment, the reduced drag bettering a performance characteristic of the trawl system, the portion of the cell bar that exhibits reduced drag being formed by at least two product strands, the product strands being corkscrew-shaped and having a pitch, the pitch having a range selected from a group consisting of:
- 3 d to 70 d where d is a diameter of at least a smaller of the product strands; and
- 5 d to 40 d where d is a diameter of at least a smaller of the product strands.

51. The trawl-system component of claim 1 wherein the selected trawl-system component is the trawl, the trawl including a plurality of mesh cells, each mesh cell including a plurality of cell bars, at least one of said cell bars exhibiting reduced drag during operations of the trawl in the water environment, the portion of the cell bar that exhibits reduced drag being formed by at least a pair of product strands that includes a pair of unequal diameter product strands.

52. The trawl of claim 51 wherein the product strands twist about an axis of symmetry.

53. The trawl of claim 51 wherein one product strand winds in a helix around another product strand.

54. The trawl-system component of claim 1 wherein the selected trawl-system component is the trawl, the trawl including a plurality of mesh cells, each mesh cell including a plurality of cell bars, at least one of said cell bars exhibiting reduced drag during operations of the trawl in the water environment, the portion of the cell bar that exhibits reduced drag being formed by a strap.

55. The trawl of claim 54 wherein the straps have a corkscrew-shape having a pitch, the pitch having a range selected from a group consisting of:
- 3 d to 70 d where d is a mean width of the straps; and
- 5 d to 40 d where d is a mean width of the straps.

56. The trawl of claim 54 wherein straps have an aspect ratio of width W to thickness T for the straps that is between 2:1 to 10:1.

57. The trawl of claim 54 wherein straps have a solid cross-section.

58. The trawl of claim 54 wherein straps are formed from a woven material.

59. The trawl-system component of claim 1 wherein the selected trawl-system component is the trawl, the trawl including mesh cells having cell bars respectively formed with a plurality of cambered sections that are oriented and configured so that movement of the cell bars through the water environment relative to the water flow vector creates a pressure differential across the cambered sections thereby establishing a lift vector in a predetermined direction, the cambered sections being arranged so that lift vectors resulting from movement of the cell bars through the water environment are mainly directed away from an axis of the trawl, the trawl including mesh cells of differing sizes that are assembled by joining together mini loops located at ends of cell bars.

60. An improved method for catching fish with a trawl system comprising the steps of:
- a. assembling the trawl system by combining trawl-system components, said trawl-system components being selected from a group consisting of a trawl, upper bridles and frontropes, the trawl including a plurality of mesh cells, each mesh cell including a plurality of cell bars, at least one of said cell bars included in the assembled trawl-system components exhibiting a hydrofoil-like effect that betters a performance characteristic of the trawl system during operation of the trawl system in a water environment, that portion of the cell bar which exhibits the hydrofoil-like effect being formed with a corkscrew-shaped pitch establishing a groove that makes at least two (2) revolutions;
- b. from a vessel disposed on a surface of a body of water:
  - i. deploying into the body of water as part of the trawl system the cell bar which generates hydrodynamic lift during operation of the trawl-system component in the water environment; and
  - ii. propelling at least the cell bar that generates the hydrofoil-like effect through the water environment relative to a water flow vector that is neither parallel nor perpendicular to the cell bar.

61. The improved method for catching fish with the trawl of claim 60 wherein the performance characteristic is one or more of increased trawl volume, improved trawl shape, reduced vibration, reduced noise, and reduced drag.

62. The improved method for catching fish with the trawl of claim 60 wherein the cell bar generates hydrodynamic lift that is directed outwardly from an axis of the trawl.

63. The improved method for catching fish of claim 60 wherein the portions of the trawl-system component which exhibit the hydrofoil-like effect upon being deployed into the body of water are formed by product strands that include a braided product strand.

64. The improved method for catching fish of claim 60 wherein the portions of the trawl-system component which exhibit the hydrofoil-like effect upon being deployed into the body of water are formed by product strands that include a twisted product strand.

65. The improved method for catching fish with the trawl system of claim 60 wherein one of the trawl-system components selected is the trawl, the trawl including a plurality of mesh cells, each mesh cell including a plurality of cell bars, at least one of said cell bars exhibiting the hydrofoil-like effect during operation of the trawl in the water environment that aids in bettering a performance characteristic of the trawl system, that portion of cell bars that exhibit the hydrofoil-like effect being formed with a series of cambered sections oriented and configured so that movement of cell bars through the water environment relative to a water flow vector creates a pressure differential across the cambered sections, thereby establishing a lift vector in a predetermined direction, the water flow vector being neither parallel nor perpendicular to the cell bar.

66. The method of claim 65, wherein the cambered sections are arranged so that lift vectors resulting from movement of cell bars through the water environment are mainly directed away from an axis of the trawl.

67. An improved method for catching fish with a trawl system comprising the steps of:
- a. assembling the trawl system by combining trawl-system components, said trawl-system components being selected from a group consisting of a trawl, upper bridles and frontropes, the trawl including a plurality of mesh cells, each mesh cell including a plurality of cell bars, at least portions of said cell bars being formed by product strands exhibiting a hydrofoil-like effect during operation of the trawl in a water environment that aids in bettering a performance characteristic of the trawl system, that portion of the cell bars that exhibit the hydrofoil-like effect being oriented to establish leading and trailing edges, the leading edge of that portion of cell bars that exhibit the hydrofoil-like effect, when viewed in a receding direction:
  - being on the right side of said cell bar when the cell bar has a left-hand lay; and
  - being on the left side of said cell bar when the cell bar has a right-hand lay, and
  the movement of the cell bars through the water environment relative to a water flow vector creating a pressure differential across that portion of the cell bars that produces the hydrofoil-like effect thereby establishing a lift vector; and b. propelling at least that portion of the cell bars that generates the hydrofoil-like effect through the water environment relative to a water flow vector that is neither parallel nor perpendicular to the cell bars, movement of that portion of the cell bars that generates the hydrofoil-like effect through the water environment creating a pressure differential thereacross thereby establishing a lift vector relative to an axis of the trawl system.

68. An improved method for catching fish with a trawl system comprising the steps of:

a. assembling the trawl system by combining trawl-system components, said trawl-system components being selected from a group consisting of a trawl, upper bridles and frontropes, the trawl including a plurality of mesh cells, each mesh cell including a plurality of cell bars, at least one of said cell bars exhibiting a hydrofoil-like effect during operation of the trawl system in a water environment that aids in bettering a performance characteristic of the trawl system, that portion of the cell bar that exhibits the hydrofoil-like effect being formed from a strap having at least two long sides and at least one short side, the short side forming a leading edge of that portion of cell bars that exhibit the hydrofoil-like effect so that movement of the cell bars through the water environment relative to a water flow vector creates a pressure differential across that portion of the cell bar that exhibits the hydrofoil-like effect thereby establishing a lift vector, the cell bar intersecting with at least one other cell bar; and b. propelling at least that portion of the cell bar that generates the hydrofoil-like effect through the water environment relative to a water flow vector that is neither parallel nor perpendicular to the cell bar, the movement of that portion of the cell bar that generates the hydrofoil-like effect through the water environment creating a pressure differential thereacross thereby establishing a lift vector relative to an axis of the trawl, the lift vector bettering the performance characteristic of the trawl system for bettering fish catching capability of the trawl.

69. The improved method for catching fish with the trawl of claim 60 wherein the trawl-system components deployed into the body of water also include port and starboard towlines, a portion of the port and starboard towlines exhibiting a hydrofoil-like effect being respectively formed by at least a pair of product strands having a corkscrew shape, and wherein:

the method further includes positioning that portion of the two selected towlines which generate the hydrofoil-like effect, so that:

i. the portion of the port towline that generates the hydrofoil-like effect is offset from a central axis of the trawl system, and the corkscrew-shape of the pair of product strands forming the port towline has a left-hand lay; and ii. the portion of the starboard towline that generates the hydrofoil-like effect is offset from the central axis of the trawl system, and the corkscrew-shaped pitch of the pair of product strands forming the starboard towline has a right-hand lay;

the performance characteristic being bettered by propelling the towlines through the water environment is at least one of increased spreading distance between the port and starboard towlines relative to the central axis of the trawl system, decreased diving vectors of the trawl system to aid during field operations conducted, especially in shallow water, reduced vibration, reduced noise, and reduced drag.

* * * * *